US008799117B2

(12) United States Patent
Stuart et al.

(10) Patent No.: US 8,799,117 B2
(45) Date of Patent: Aug. 5, 2014

(54) RECORD RETENTION AND POST-ISSUANCE COMPLIANCE SYSTEM AND METHOD FOR MUNICIPAL BONDS

(76) Inventors: Paula Stuart, Orlando, FL (US); William Mark Scott, Washington, DC (US); Sharda Hebbar, Longwood, FL (US)

( * ) Notice: Subject to any disclaimer, the term of this patent is extended or adjusted under 35 U.S.C. 154(b) by 724 days.

(21) Appl. No.: 12/265,512

(22) Filed: Nov. 5, 2008

(65) Prior Publication Data

US 2009/0119191 A1 May 7, 2009

Related U.S. Application Data

(60) Provisional application No. 60/996,173, filed on Nov. 5, 2007.

(51) Int. Cl.
*G07F 19/00* (2006.01)
*G06Q 40/00* (2012.01)

(52) U.S. Cl.
USPC .............................................. 705/30; 705/35

(58) Field of Classification Search
None
See application file for complete search history.

(56) References Cited

U.S. PATENT DOCUMENTS

| | | | | |
|---|---|---|---|---|
| 5,809,483 A * | 9/1998 | Broka et al. | 705/37 |
| 5,893,079 A * | 4/1999 | Cwenar | 705/36 R |
| 5,915,209 A * | 6/1999 | Lawrence | 340/3.7 |
| 6,161,099 A * | 12/2000 | Harrington et al. | 705/36 R |
| 6,381,585 B1 * | 4/2002 | Maples et al. | 705/36 R |
| 6,446,047 B1 * | 9/2002 | Brier et al. | 705/35 |
| 6,557,009 B1 * | 4/2003 | Singer et al. | 715/740 |
| 7,155,408 B2 | 12/2006 | Hebbar et al. | 705/35 |
| 7,191,148 B1 * | 3/2007 | Butcher | 705/35 |
| 7,376,604 B1 * | 5/2008 | Butcher | 705/35 |
| 7,801,791 B2 | 9/2010 | Hebbar et al. | 705/36 R |
| 7,966,248 B2 * | 6/2011 | O'Connor et al. | 705/37 |
| 8,010,439 B1 * | 8/2011 | Davis | 705/37 |
| 2001/0051935 A1 * | 12/2001 | Sugiura | 706/12 |
| 2002/0016758 A1 * | 2/2002 | Grigsby | 705/36 |
| 2002/0099646 A1 * | 7/2002 | Agarwal et al. | 705/37 |
| 2002/0128954 A1 * | 9/2002 | Evans | 705/37 |
| 2002/0156719 A1 * | 10/2002 | Finebaum et al. | 705/37 |
| 2003/0040941 A1 * | 2/2003 | Whitworth | 705/4 |
| 2003/0046205 A1 * | 3/2003 | Brier et al. | 705/35 |
| 2003/0046206 A1 * | 3/2003 | Sato | 705/35 |
| 2003/0050879 A1 * | 3/2003 | Rosen et al. | 705/35 |
| 2003/0110106 A1 * | 6/2003 | Deshpande et al. | 705/35 |
| 2003/0120578 A1 * | 6/2003 | Newman | 705/36 |
| 2003/0126055 A1 * | 7/2003 | Thal et al. | 705/36 |
| 2003/0149654 A1 * | 8/2003 | Harrington et al. | 705/37 |
| 2003/0167221 A1 * | 9/2003 | Kochansky | 705/36 |
| 2003/0225655 A1 * | 12/2003 | Hughes et al. | 705/36 |
| 2004/0199451 A1 * | 10/2004 | Benning et al. | 705/37 |
| 2006/0271459 A1 * | 11/2006 | Lange | 705/35 |
| 2011/0184928 A1 * | 7/2011 | Vadon et al. | 707/706 |

* cited by examiner

*Primary Examiner* — Mussa A Shaawat
(74) *Attorney, Agent, or Firm* — Pillsbury Winthrop Shaw Pittman LLP

(57) ABSTRACT

Systems and methods to facilitate record retention and compliance requirements mandated by law, rules or regulations, company policy, or other guidance for maintaining records using electronic storage systems is herein described. The systems and methods may facilitate tracking and documenting of relevant municipal bond activities (e.g., use of proceeds of the bond, use of bond financed facilities, etc.) by bond issue; determining when compliance-related calculations need to be made over the life of the bond; making the necessary calculations in a timely manner; collecting, organizing and maintaining information to support the calculations; storing documents to support the information and calculations; determining if the calculated results indicate that the use of proceeds are in compliance; making filings; and generating alerts and/or notices and/or taking other actions relating to compliance requirements.

30 Claims, 28 Drawing Sheets

| Bond Issue Information | Cost of Issuance | Debt Service Payments | Investment Earnings |

— 281    — 285    — 287    — 289

IRS POST ISSUANCE COMPLIANCE BOND ISSUE SETUP

| Field | Input | Marker |
|---|---|---|
| DATE OF ISSUE | | 280 / 318 |
| ISSUE PRICE | | 282 |
| ORIGINAL PRINCIPAL AMOUNT | | 283 |
| ISSUER'S NAME | | 284 |
| ISSUER'S T.I.N. | | 286 |
| PROCEEDS FROM SALE | | 288 |
| PURPOSE | | 290 |
| REFUNDING BONDS? | | 292 / 320 |
| RESERVE FUND | | 296 / 320 |
| MATURITY DATE | | 299 / 318 |
| TEMPORARY PERIOD? | | 300 / 320 |
| DATE FORM 8038 FILED | | 302 / 318 |
| FORM 8038 | | 304 / UPLOAD 324 |
| DOCUMENTS FILED WITH IRS | | 306 / 320 |
| DATE FILED | | 308 / UPLOAD 324 |
| MISCELLANEOUS DOCUMENT(S) | | 312 / UPLOAD 324 |

314 — SUBMIT     CANCEL — 316

ADD NEW FACILITY/PROJECT

| | |
|---|---|
| FACILITY NAME | ⌐402 |
| PLACED IN SERVICE DATE | ⌐404 ☐⌐406 |
| EXPECTED PLACED IN SERVICE DATE | ⌐408 ☐⌐406 |
| PERCENTAGE OF PRIVATE USE ( # OF YRS) | ⌐410 ▽⌐412 |
| YEAR 1 | ⌐414 |
| TYPE OF PERCENTAGE | ⌐416 ▽⌐412 |
| YEAR 2 | ⌐418 |
| TYPE OF PERCENTAGE | ⌐420 ▽⌐412 |

422 — [ SUBMIT ]  [ CANCEL ] — 424

| BOND ISSUE INFORMATION ⌐428 | | |
|---|---|---|
| DETAILS ⌐429 | | ADD ⌐438 |
| ASSET NUMBER | ASSET DESCRIPTION | ACTIONS ⌐434 |
| ASSET 1 | DESCRIPTION 1 | DELETE/EDIT |
| ASSET 2 | DESCRIPTION 2 | DELETE/EDIT |

ADD NEW EXPENDITURE/ASSET

FACILITY/PROJECT NAME — 442, 443

ASSET DESCRIPTION — 444

ASSET NUMBER — 446

EXPENDITURE TYPE — 448, 449

VENDOR — 452

EXPENDITURE DATE — 454, 456

COST FINANCED WITH BOND PROCEEDS — 458

ASSET LIFE — 460

UPLOAD DOCUMENT — 462, 464 UPLOAD

CHANGE IN USE/SALE DATE — 468, 456

SALE PRICE — 470

REMEDIATED? — 472, 450

474 — SUBMIT    CANCEL — 476

ARBITRAGE REBATE NOTIFICATION DATES

ISSUE DATE [ ] 451 [ ] 465

FIRST COMPUTATION DATE [ ] 453 [ ] 465

COMPUTATION INTERVAL [ ] 455 [▼] 463

NEXT COMPUTATION DATE(S) [ ] 457 [ ] 465

NEXT PAYMENT DUE DATE(S) [ ] 461 [ ] 465

475 — [SUBMIT]   [CANCEL] — 477

CONTRACTS AND AGREEMENTS

FACILITY/PROJECT NAME ⟋ 480

TYPE OF DOCUMENT [_____⟋ 482] ☒ ⟋ 484

MANAGEMENT CONTRACT

FACILITY/PROJECT NAME — 487

DOCUMENT NAME — 488

DOCUMENT DATE — 490, 492

DESCRIPTION — 494

TYPE OF DOCUMENT — 496, 498

CONTRACT PARTY/SPONSOR/LESSEE — 500

STRUCTURE OF COMPENSATION — 502, 501

PENALTY TO TERMINATE — 504, 503

CONTRACT MEETS SAFE HARBOR? — 505, 506

CONTRACT TERMINATION DATE — 507

FACILITY MANAGED — 508, 509

DOES CONTRACT CONSTITUTE PRIVATE BUSINESS USE OF FACILITY? — 510, 511

UPLOAD DOCUMENT — 512

UPLOAD — 514

516 — SUBMIT    CANCEL — 518

RESEARCH AGREEMENT

FACILITY/PROJECT NAME — 522

DOCUMENT NAME — 524

DOCUMENT DATE — 526, 528

DESCRIPTION — 530

SPONSOR OF RESEARCH — 532

TYPE OF SPONSOR — 534, 536

SUBMIT — 538    CANCEL — 540

LEASE AGREEMENT

FACILITY/PROJECT NAME — 544

DOCUMENT NAME — 546

DOCUMENT DATE — 548, 550

DESCRIPTION — 552

NAMING OF LEASING PARTY — 554

SQUARE FOOTAGE SUBJECT TO LEASE — 556

SQUARE FOOTAGE OF COMMON SPACE BENEFITING LEASE — 558

SQUARE FOOTAGE OF PROPERTY FINANCED WITH BONDS — 560

SQUARE FOOTAGE OF COMMON SPACE ALLOCATED TO LEASE — 562

PERCENTAGE OF PROPERTY ALLOCATED TO LEASE — 564

BASIC RESEARCH (Y/N) — 568, 570

UPLOAD DOCUMENT — 572, UPLOAD — 574

576 — SUBMIT    CANCEL — 578

SALES AGREEMENT

FACILITY/PROJECT NAME —582

DOCUMENT NAME [ ] —584

DOCUMENT DATE [ ] —586 □—588

DESCRIPTION [ ] —590

PURCHASER'S NAME [ ] —592

SALES PRICE [ ] —594

REMEDIAL ACTION TAKEN? [ ] —596 ⊠—598

UPLOAD DOCUMENT [ ] —600 [UPLOAD]—602

604—[SUBMIT]   [CANCEL]—606

FACILITY/PROJECT NAME — 630

CONTRACT NUMBER [ ] — 634

CONTRACT NAME [ ] — 636

RECEIPT INPUT — 632

TYPE OF ACTIVITY [ ] — 638

NAME [ ] — 640

AMOUNT [ ] — 642

DATE RECEIVED [ ] — 644 [ ] — 646

M&O INPUT — 648

DATE PAID [ ] — 670 [ ] — 672

AMOUNT PAID [ ] — 674

PURPOSE OF EXPENSE [ ] — 676

RECIPIENT [ ] — 678

UPLOAD DOCUMENT [ ] — 684 [UPLOAD] — 686

688 — [SUBMIT]  [CANCEL] — 690

RECORD RETENTION AND POST-ISSUANCE COMPLIANCE SYSTEM AND METHOD FOR MUNICIPAL BONDS

REFERENCE TO RELATED APPLICATIONS

This application claims priority to U.S. Provisional Patent Application No. 60/996,173 filed Nov. 5, 2007, which is hereby incorporated herein by reference in its entirety.

FIELD OF THE INVENTION

The invention relates to systems and methods for facilitating record retention and post-issuance compliance for municipal bonds.

BACKGROUND OF THE INVENTION

Many municipal bonds are exempt from certain taxes, provided certain requirements (e.g., certain Internal Revenue Service ("IRS") requirements) are met. If these requirements are not met (or cease to be met), a bond may lose its tax exempt status. Determining compliance with these IRS requirements requires the maintenance of certain information relating to the investment and expenditure of bond proceeds, performing certain calculations regarding such investment and expenditure at different times over the life of the bond, taking certain action depending on the results of the calculations (e.g., making certain filings), and/or other actions. Additionally, it is necessary to maintain certain documents to support the information used to make such calculations.

Due to the number and variety of municipal bonds outstanding and issued each year and the complexity of the regulations regarding municipal bonds, it is often difficult for issuers or obligors (persons who benefit from the tax-exempt status of the bonds and are obligated to make payments of principal and interest on the bonds) to meet all of these requirements. These difficulties are compounded by the application of these requirements throughout the life of the bond and for several years thereafter (typical bond maturities can run 30 years or longer) and the fact that the traditional role of bond professionals typically ends shortly after the bonds are initially sold to the public. To further complicate matters, some issuers regularly go to market with separate issuances of bonds, and some obligors, such as charitable organizations, receive benefits from many separate bond issuances. Each separate issuance of bonds has, typically, independent needs for information, documents, and computations. Thus, those issuers and obligors must further determine and track which records of information and/or documents relate to which bond issuances.

Certain requirements necessitate calculations at certain times over the life of the bond. If these calculations are not timely performed, issuers and obligors may face the prospect of remitting penalties, interest, or other amounts to the IRS in order to maintain the tax-exempt nature of the obligations. These and other factors, therefore, place significant burdens and risks on issuers and obligors who fail to maintain documents and monitor compliance.

Many other requirements are imposed on municipal bond issuers. For example, pursuant to Securities and Exchange Commission ("SEC") Rule 15c2-12, issuers must agree to make certain secondary market disclosure filings (discussed herein). Failure to timely make filings under SEC Rule 15c2-12 can lead to adverse ramifications, including ramifications with respect to the secondary market for issued securities or bonds. Additionally, when an issuer seeks to issue a new bond, there will be a five year look back with respect to that issuer's compliance history with respect to SEC Rule 15c2-12. Failure to timely make SEC Rule 15c2-12 filings can adversely impact an issuers' ability to issue new bonds.

Other requirements may exist based on rules, regulations or other requirements from the SEC, IRS and/or other regulatory authorities (or other entities) that impact the need to maintain information and supporting documents, timely make calculations, make filings and/or take other actions. Historically, many of these tasks have been performed manually. Some limited portion of these tasks may be performed electronically. However, there is no integrated tool that enables all of these functions to be performed, and that enables each unique item of data to be entered only once but also be reused for various functions. Nor does a system exist that enables all of this and the ability to store documents for each bond issue, e.g., to support the necessary calculations.

To further explain certain Federal tax requirements, by way of example, the Internal Revenue Code ("Code") and Income Tax Regulations exclude from gross income interest paid on certain municipal bonds. Tax-free bonds described by the Code and regulations can be classified into, generally, three separate categories: governmental bonds, qualified 501(c)(3) bonds, and other forms of private activity bonds. The Code and regulations provide a plethora of rules governing the issuance, investment and expenditure of tax-free bond proceeds, and the use of the bond financed facilities.

By way of example, certain limits exist on how bond proceeds may be invested. Some of these requirements are referred to as arbitrage yield and arbitrage rebate requirements (detailed herein). Certain limits also exist on the use and expenditure of bond proceeds. For example, certain limits exist on the use of proceeds of governmental and qualified 501(c)(3) bonds for private business use, on the use of such proceeds to fund private loans, and on the use of qualified 501(c)(3) bond proceeds to pay for the costs of issuing the bonds. These are just but a few examples. Many others exist.

In many cases municipal issuers and obligors are prohibited from earning and retaining arbitrage (e.g., earning and retaining the profit from investing lower-cost tax-exempt bond proceeds into higher-yielding taxable securities). Thus, an issuer is periodically required to determine the amount of arbitrage earnings on bond proceeds and in many instances, to remit arbitrage rebate to the U.S. Treasury. The amount of arbitrage required to be rebated to the U.S. Treasury is generally determined once every five years during the lifetime of a bond per the requirements in section 148(f) of the Internal Revenue Code and regulations issued thereunder.

As a further example of a restriction on the expenditure of bond proceeds found in the Code, to avoid the treatment of governmental obligations as private activity bonds and the loss of tax exempt status, issuers must, generally, reasonably expect to (and actually) use less than some percent (e.g., 5% or 10% depending on the type of financing) of the proceeds, over the life of the bond, for private business use. Private business use in excess of the permitted percent may cause the bonds to be treated as private activity bonds and, generally, as obligations paying taxable interest. The private business use tests are imposed by section 141 and 145 of the Code and discussed in regulations issued thereunder.

To further explain, compliance is generally tested over the life of the bonds. For instance, the private business use tests are calculated over the life of the bonds. Therefore, as an example, excessive private business use in one year may be blended with less than the maximum permitted private business use in another year. Thus, an issuer or obligor may test compliance by making calculations periodically over the life of the bonds. An issuer or obligor may wish to perform a private business use calculation on multiple occasions during the life of a bond to, for instance, confirm compliance for reporting or management purposes, determine whether an additional proposed private business use of bond proceeds will fit under the compliance threshold, determine the impact of potential or actual sales of bond financed properties to nonqualified private users, manage compliance with the private business use limitations through re-allocation of expenditures (as permitted within certain time constraints under Internal Revenue regulations), and/or for other purposes. Optionally, substitutions may be made if allowed amounts are exceeded. For example, projects may be removed from a bond issue. If removed, allocations may be used for the substitute projects.

Historically, the private use and private payment tests, among others, were tested only on the date of issue based on certain reasonable expectations of the issuer and obligor as to how they expected to spend the proceeds of its bonds. The traditional role of bond counsel has been to perform diligence to assure that the issuer's and obligor's reasonable expectations relating to private business use and payment, and other matters, are reasonable as of the date of issue, and to provide an opinion that interest paid on the bonds is excludable from gross income based on these expectations. Bond counsel's role traditionally ends shortly after the bonds are initially sold to the public and its opinion is issued.

Beginning in the 1980's, Congress began to impose restrictions on municipal financing based on the actual expenditure and investment of the bond proceeds after the date of issue. Until the 1990's, the IRS rarely reviewed the actual investment and expenditure of bond proceeds or the actual use of bond financed facilities. In the mid-90's, the IRS unveiled a new bond examination program, which has been strengthened considerably since it was unveiled. The IRS is now investing significant resources on examinations relating to the actual investment and expenditure of bond proceeds, and the actual use of the bond financed facilities.

Notwithstanding the imposition of additional post-issuance compliance requirements relating to the actual investment and expenditure of the bond proceeds and the actual use of bond financed facilities, as well as the more active role of the IRS, the roles of the various transaction participants have not significantly changed from their historical roles. Therefore, although certain post-issuance requirements are required to be calculated and documented throughout the life of the bond for the bonds to retain their tax-exempt status, bond counsel's role typically ends shortly after the bonds are initially sold to the public. The issuer and/or obligor are, therefore, typically left with the responsibility to insure all post-issuance compliance requirements are met. Thus, the need to collect and maintain information and documents for very long periods, which can be extremely costly and burdensome, and to perform calculations, which can be complicated, traditionally falls on the issuer of the bonds or the obligor who may be unsophisticated or ill-prepared to handle such matters. The lack of a comprehensive tool to facilitate this compliance exacerbates the problems.

In the case of an IRS or other audit of the bond financing (or other examination activity), the issuer or obligor may be requested to show that its investment and expenditure of bond proceeds, and its use of bond financed facilities, conforms with the provisions of the Code, regulations, and/or other laws, rules, or regulations from the date of issue of the bonds to the date of the examination (or examination period). By way of example, the IRS may request information to show that any private business use of bond proceeds is less than the maximum percentage permitted over the life of the bonds from the date of issuance to the date of the examination. To meet this request, among others, the issuer or obligor will have to retain records of information and/or documents relating to the investment and expenditure of bond proceeds, and the use of bond-financed facilities over the entire life of the bond, plus those additional years in which an examination could be instituted within the statutory limitations period applicable to bondholders, which is generally a period ending approximately three years after the last bond of the issuance is fully retired. Other periods may apply. The above example illustrates the synergies provided by the features and functions of the systems and methods of the invention in that the ability to retain crucial documents and perform complex calculations relating to those documents under any one of a number of different, sometimes shifting, and as of yet undetermined requests by a regulatory authority cannot be accomplished by any current system or combination thereof. Other synergies and advantages also exist.

The same Code and regulatory requirements discussed above that can threaten the tax-exempt status of a bond if not met may also be cited by the IRS in its challenge of an obligor's interest deduction relating to the interest paid on the bonds or, in the case of a charitable institution, to assert additional taxes relating to unrelated trade or business income. To avoid these sorts of results, the issuer and/or obligor will generally have to retain records of information and/or documents relating to the investment and expenditure of bond proceeds, as well as information and/or documents relating to the use of bond-financed facilities, for the entire life of the bond, plus those additional years in which an examination of the obligor's tax returns could be instituted.

Additional reasons exist to retain records of information and/or documents in a systematic manner. The IRS recently released a proposed revision of its Form 990, which included a proposed Schedule K, "Supplemental Information on Tax Exempt Bonds." Schedule K requests charitable organizations, which are subject to certain reporting requirements and with outstanding tax-exempt bonds, to state, for the pertinent taxable year, the "highest percentage of the [tax-exempt financed] project that was subject to a management contract or research agreement," and to report the "highest percentage" of nonqualified use of any project financed by tax-exempt bonds. To perform these calculations, obligors will need records of information and/or documents from both current and prior periods. By way of example, information and/or documents relating to the nonqualified, private business use of bond financed property for a current reporting cycle may, by necessity, include contracts executed or other information from prior periods.

IRS Revenue Procedure 97-22 ("Rev. Proc. 97-22"), 1997-1 C.B. 652, provides guidance to taxpayers that maintain books and information and/or documents by using an electronic storage system that either images their hardcopy books and records or transfers their computerized books and records to an electronic storage media. This guidance provides general requirements for electronic storage systems utilized by taxpayers in order for such stored information to constitute "records" within the meaning of the Internal Revenue Code. The results of certain calculations relating to post-issuance investment and expenditures of bond proceeds, and the use of bond financed properties, may be included in forms and other items filed with the IRS and may require secondary market disclosure. For example, the results of calculations relating to the investment of bond proceeds may be included on the Form 8038-T, "Arbitrage Rebate and Penalty in Lieu of Arbitrage Rebate," when a payment of arbitrage rebate is remitted to the U.S. Treasury. The results of similar calculations may be included on the same form when "yield reduction payments" are remitted. By way of example, the results of calculations for all prior rebate payments may be included in the Form 8038-R, "Recovery of Overpayment Under Arbitrage Rebate Provisions." The results of calculations relating to the expenditure of bond proceeds and the use of bond financed facilities may be reported on the proposed Form 990, Schedule K. The results of certain tax calculations may indicate a need to post a material event as a secondary market disclosure (e.g., if such calculations show that the tax-exempt status of a bond is in jeopardy). These secondary market disclosure requirements typically arise as a result of SEC Rule 15c2-12.

Thus, some of the problems that issuers and obligors face in complying with post-issuance compliance requirements include: knowing and remembering when to make certain calculations; knowing all events or other facts (e.g., expenditures) that are relevant to the calculations; knowing the time limits applicable to the allocation of bond proceeds to expenditures; understanding the legal implications of certain post-issuance events; collecting, organizing and maintaining documents to support the calculations and allocations in compliance with post-issuance filing and other requirements; maintaining all such records of information and/or documents and/or calculations in a long-term storage system; making filings (IRS, SEC, and/or other filings), and/or taking other necessary or desirable actions. Additionally, when records are organized or maintained electronically, issuers and obligors may need to fulfill the minimum requirements relating to the proper storage of such records as determined by federal procedures, such as those specified in Rev. Proc. 97-22.

Various other post-issuance compliance obligations are imposed on issuers as well. For example, SEC Rule 15c2-12 mandates, in part, that brokers and dealers transacting in municipal bonds have reliable access to material information concerning the bond issuer's financial condition and/or ability to repair bond obligations. This necessitates that bond issuers (or their agents) make certain disclosures over the lifetime of the bond. For example, the issuer must make certain periodic filings (e.g., annual) and must disclose certain material events as they occur.

A limited number of tools exist to facilitate issuers' compliance with Rule 15c2-12. A leading tool to facilitate compliance with this rule is offered by Digital Assurance Certification LLC ("DAC"), the assignee of this patent application. That tool is an internet-based system that offers many features to facilitate compliance with Rule (the "DAC System"). Additional information relating to aspects of the DAC system may be found, for example, in U.S. Pat. No. 7,155,408 ("the '408 patent"), entitled "Method and Apparatus for Managing information and Communications Related to Municipal Bonds and Other Securities," which is assigned to DAC and is hereby incorporated herein by reference in its entirety. The DAC system facilitates compliance with Rule 15c2-12. However, it was not originally designed to fully enable issuers to facilitate compliance and documentation of compliance with certain other post-issuance requirements.

Another challenge facing issuers relates to regulations that relate to certain funds, such as those addressed in SEC Rule 2a-7, 17 C.F.R. §270.2a-7, ("Rule 2a-7"). Rule 2a-7 regulates money market funds and specifies the characteristics of investments to be purchased and held by money market funds. Regulating funds that may invest in issues that are unregulated has the effect of indirectly regulating the issues, as an issue may not be able to attract investors unless it enables potential investors to comply with the relevant regulations (e.g., Rule 2a-7).

Some of the information needed to comply with Rule 2a-7 is generally not publicly available and some of the interested parties want to minimize certain types of information that becomes public (e.g. terms of guarantees, etc). Thus, the original DAC system, which was designed primarily to comply with SEC Rule 15c2-12 and to make such information available to the public, did not provide all of the information needed for funds governed by Rule 2a-7 (e.g., information that could not and/or should not be disseminated generally to the public) related to specific issuers and/or securities or bonds. Nor did it provide a tool to enable issuers to easily deal with this. Accordingly, in its original configuration, the DAC system would, in some instances, notify funds regulated by Rule 2a-7 that an event of interest had occurred with respect to a security or bond (e.g., the substitution of an insurer or guarantor, as is discussed herein), but did not enable these funds to securely and conveniently access all of the information that would dictate whether the event of interest would necessitate a liquidation, and/or prevent the purchase, of the corresponding security or bond.

DAC has recently introduced a tool, as part of the DAC system, to help address this challenge. Various aspects of this tool are described in U.S. patent application Ser. No. 11/669,642, filed Jan. 31, 2007, entitled, "System and Method for Managing Information Related to Securities and Securities Issuers," which is assigned to DAC and is hereby incorporated herein by reference in its entirety. For example, this tool can enable filing of supplemental disclosures that include information that enables financial institutions managing money market funds to meet the requirements of Rule 2a-7, where at least some of the supplemental disclosures are subject to restricted access. The restricted access may be granted only to those limited number of entities who need such information (e.g., money market funds). The restricted access features provided by the system disclosed herein may facilitate ownership of bond issues (e.g., regulated by Rule 2a-7) by investors that, otherwise, may be unable to own the securities, due to the inefficiency, costliness, etc. of obtaining information and documents for bond issues (which the disclosed system herein provides via restricted access).

Although existing tools, including the DAC system, have addressed some aspects of the challenges facing issuers, various other challenges (including various post-issuance compliance and record retention requirements described above, and others) have not been adequately addressed by tools that existed prior to the invention. Additionally, while various ways of storing documents electronically exist, these electronic storage tools are often stand-alone applications. This presents various difficulties when trying to efficiently comply with the various requirements imposed on issuers. Discrete systems often require re-entry of the same information. This can be time-consuming and error prone. Additionally, in some circumstances, even if the discrete tools could perform various function described herein, it would be necessary to switch back and forth between different applications to comply with both SEC and IRS requirements. These and other drawbacks exist with existing tools.

SUMMARY OF THE INVENTION

The invention addressing these and other drawbacks relates to systems and methods for facilitating record retention and post-issuance compliance for municipal bonds. In some implementations, the systems and methods of the invention may facilitate record retention and compliance requirements mandated by law, rules or regulations (e.g., according to Rev. Proc. 97-22), company policy, or other guidance for maintaining records using electronic storage systems. In some implementations, the invention may facilitate tracking and documenting of relevant municipal bond activities (e.g., use of proceeds of the bond, use of bond financed facilities, or other activities) by bond issue. In some implementations, the invention may also determine when compliance-related calculations need to be made over the life of the bond; make the necessary calculations in a timely manner; collect, organize and maintain information to support the calculations; store documents to support the information and calculations; and determine if the calculated results indicate that the use of proceeds are in compliance. In some implementations, the invention may make filings, generate alerts, and/or take other actions relating to compliance requirements. For convenience, the collection of features recited above (and related features discussed herein) will sometimes be referred to herein as "record retention and post issuance compliance" and may be enabled, performed, and/or assisted by a "record retention and post issuance compliance module." The record retention and post issuance compliance module need not be limited to exactly these functions. Additional or fewer functions may be included in this module. Some or all of the specified functions may be performed by one or more other modules. Some functions may be omitted, and others added.

According to various aspects of the invention, the record retention and post issuance compliance module may be or include a computer software application that may itself include one or more of the following modules: an issuer information module, an issue module, an identification and authorization module, a disclosure documents module, a compliance calculation module, one or more storage modules, an alerts module, a reminders module, a communications module, a filings module, a rules module, an user interface module, an upload module, and/or other modules.

In some implementations, one or more of the modules and/or features of the invention may be enabled and/or accessed via the Internet and may include one or more web interfaces through which a user may interact with the systems and methods described herein. In some implementations, one or more of the interfaces described herein may be web interfaces accessed by a client device via the Internet or other computer network.

In some implementations, the issuer information module may be used, for example, to receive, manage, store and/or retrieve information relating to an issuer. Issuer information or bond issue information may be entered once for each issuer and stored in the issuer module. Issuer information may be used by various other modules and/or functions, including those described herein, to avoid the need for repetitive entry of the same information.

In some implementations, the issue module may be used, for example, to receive, manage, store and/or retrieve information relating to a particular bond issue. For example, in some instances an issuer may interact with the issue module to enter, view and or modify bond issue information and/or upload documents relevant to a new or existing bond issue. The bond issue information may include information necessary to determine post-issuance compliance or to provide, complete, and/or file the forms required for compliance.

In some implementations, the identification and authorization module may be used, for example, to identify a user and the user's level of authorization to access or take actions with respect to a particular bond issue and/or to access information or documents associated with a bond issue.

In some implementations, the disclosure documents module may be used, for example, to manage information within the system related to public disclosures of bond issuers to one or more regulatory agencies. In some implementations, the disclosure documents module may also be used to facilitate the management of documents and/or other files relating to an issuer and/or one or more bond issues.

In some implementations, the compliance calculation module may be used, for example, to determine when to make compliance calculations related to a bond issue. The compliance calculation module may also make the necessary compliance calculations and determine, based on the results of the compliance calculation, whether compliance requirements (e.g., IRS and/or SEC post-issuance compliance requirements) are met. In some implementations, the compliance calculation module may receive information from the issue module, the upload module and/or other modules and may calculate compliance calculations related to a bond for various purposes. These calculations may be initiated manually by a user and/or automatically by the system.

In some implementations, one or more storage modules may be used, for example, to store information and/or documents associated with one or more bond issues or associated with other features or functions described herein. In some implementations, separate storage modules may be utilized for separate storage purposes. For example, in some implementations, a user storage module may be used for electronically storing information input by a user, a document storage module may be used for electronically storing uploaded documents, a rules storage module may be used for storing rules to assist in determining post issuance compliance, and/or other storage modules may be used for other purposes. In some embodiments, one or more storage modules may be used for multiple or mixed purposes.

In some implementations, an alerts module may be used, for example, to generate, manage and/or monitor alerts relating to post-issuance compliance. For example, alerts may be generated to notify a user of non-compliance for a bond issue. In some instances, alerts may be generated when calculations are performed, when calculations are determined not to be in compliance for a bond issue, when information has not been submitted in a timely fashion, when information is incorrect or incomplete, when it is determined that a bond issue has expenditures over applicable private use percentages, when expenditures are over the designated percentage limitation on issuance costs, and/or when other notifications relating to post-issuance compliance are appropriate. In some instances, a user or the system may create and/or edit alert(s) for a bond issue. In some instances, the system may create an alert automatically. For example, an alert may be created when calculations are performed.

In some implementations, a reminders module may be used, for example, to generate, manage and/or monitor reminders relating to post-issuance compliance. For example, reminders may be generated for deadlines and/or dates relating to post issuance compliance for a selected bond issue. In some instances, reminders may be created and/or issued to a user when bond issue information is due, when due dates for entering information and/or filing forms are approaching or have approached (e.g., allocation, reporting, payment, or compliance due dates), when tasks need to be completed (e.g., calculations need to be made) over the life of the bond, when calculation(s) is(are) due, and/or when other reminders relating to post-issuance compliance are appropriate. In some instances, a user or the system may create and/or edit a reminder(s) for a bond issue. In some instances, the system may create a reminder automatically.

In some implementations, a communications module may be used to, for example, enable selective, and if desired, secure dissemination of bond compliance and/or other information (e.g., post-issuance compliance information) to the public and/or designated recipients. In some implementations, the communications module may be used to create and manage dissemination lists for a bond issue and/or certain activities relating to the bond issue. The communication module may be used to communicate relevant information (e.g., such as the calculations provided by the calculation module or other information associated with a bond issue) to selected individuals. In some instances, the communication module may be used to send alert(s) and/or reminder(s) to users and/or other parties. In some implementations, the communications module may enable a user, such as a user associated with an issuer, to transmit files that have been uploaded to a processor and/or storage modules to one or more other users. For instance, the communications module may be configured to generate electronic messages (e.g., emails, SMS messages, instant messenger messages, electronic voice messages, or other messages) that provide information included in one or more files that have been uploaded to the system. In some embodiments, copies of the one or more files may be included in the generated electronic messages. In some embodiments, the communications module may manage manual downloads of the files by the one or more users. For example, the communications module may manage an FTP site, or other manual download format/interface.

In some implementations, a filings module may be used, for example, to facilitate the preparation and storage of documents and other information for a particular bond issue which need to be (and/or have been) filed with the IRS and/or other agencies or other entities.

In some implementations, a rules module may be used, for example, to create, edit, manage and apply rules that relate to post-issuance compliance issues. For example, the rules may include one or more "date determining rules" that relate to when calculations, filings and/or other activities may be due pursuant to SEC, IRS and/or other rules, regulations, or requirements. The rules module may also provide the substantive "calculation rules" necessary to make certain calculations pursuant to SEC, IRS and/or other rules, regulations or requirements. In some implementations, the rules module may receive rules from the rules database, for example.

In some implementations, an interface module may be used by the system to support one or more user interfaces that enable interaction with the system. In some embodiments, the interface module may support one or more user interfaces that enable one or more users to input information into and receive information from the system. In some implementations, the one or more user interfaces supported by the interface module may include one or more graphical user interfaces.

In some implementations the interface module may be used with the record retention and post issuance compliance module and/or other aspects of the systems of the invention to provide an interface that may enable a user to enter, manage, store and/or retrieve bond information, documents, alerts, reminders and/or other information, and/or to otherwise interact with the system to utilize the features described herein, and/or other features. The interface module may enable the exchange of bond issue information with the system via an application (e.g., a browser) executed on a client device. For example, an issuer may interact with the issuer information module (e.g., via the interface module) to manage or view files that are associated with the issuer and stored by a storage module. In another example, an issuer may interact with the issue module (e.g., via the interface module) to enter, view and/or modify information relevant to a bond issue. The interface module may be used to enter initial information about a bond issue and subsequent use of proceeds (among other things) and/or other information needed to make required calculations over the life of the bond or other compliance requirements.

In some implementations, an upload module may be used in conjunction with the issue module (and/or other modules) to upload documents and/or other information to support the entered bond issue information. The information and/or uploaded documents may be associated with the one or more bonds to which they relate, and the event (e.g., expenditure, facility/project) or other activity to which they relate. The documents may be stored via a storage module (or other storage mechanism). This and/or other bond issue information may be used by the calculation module to make any necessary or desired calculations, including post-issuance compliance calculations.

For example, Internal Revenue Code provides, generally, that if over 10 percent of the proceeds of the bonds (5 percent in the case of charitable financings) are expended on facilities used in the trade or business of a nongovernmental person, the bonds will lose their tax-exempt status. This "use" test is calculated over the life of the bonds; therefore, excessive private use in one year can be blended with less than the maximum permitted private use in another year. In the case of an examination of the issuer by the IRS (or other authority), the issuer will be requested to show that its private use is less than the maximum percentage permitted over the life of the bonds from the date of issuance to the date of the examination, or that it has a plan to reduce any excessive private use as of the date of the examination. For the issuer to meet this request, it will have to retain records relating to the use of the facilities for the entire life of the obligations, plus those additional years in which an examination could be instituted within the statutory limitations period applicable to bondholders, which is generally a period ending within four years after the bonds are fully retired. The systems and methods provided by the invention enable this record retention, such that any request can be anticipated and met with relative ease. For example, the ability of the systems and methods of the invention to receive and retain information and documents relating to a bond issue, to provide one or more users with role-based or selective access to those information and documents, to perform one or more operations on the data in the information and document, enables a robust mechanism for compliance with a myriad of regulatory requirements.

According to various aspects of the invention, the record retention and post issuance compliance module may further include or be used in conjunction with one or more other modules. For example, the record retention and post issuance compliance module may include or be used with one or more of a secondary market disclosure filing module (for example, to address Rule 15c2-12); a restricted access module (for example, to address Rule 2a-7); a trade data feed module (for example, to provide data regarding municipal bond trades and which may be used to obtain the data necessary for certain calculations); a systems administration module (for example, to maintain a list of approved users to access record retention and post issuance compliance module); 0a Rule 2a-7 compliance module; an IRS compliance module; a final transcripts module; a remarketing module, and/or other modules. Some or all of the functions of one or more of these modules may be included within the record retention and post issuance compliance module or vice versa.

In some implementations, the secondary market disclosure filing module, if used, may include features relevant to making secondary market disclosure filings such as, for example, filings pursuant to current Rule 15c2-12, which may be amended from time to time, and/or other secondary market disclosure requirements that may exist now or in the future. Examples of such features may be found in U.S. Pat. No. 7,155,408, entitled "Method and Apparatus for Managing Information and Communications Related to Municipal Bonds and Other Securities," which is hereby incorporated herein by reference in its entirety.

In some implementations, the restricted access module may include features relevant to situations wherein a system includes some documents that are to be made available to the public, and others that are desired (or required) to be accessed by a limited class of entities, for example, documents relevant to Rule 2a-7. Examples of such features may be found in U.S. patent application Ser. No. 11/669,642, filed Jan. 31, 2007, entitled, "System and Method for Managing Information Related to Securities and Securities Issuers," which is hereby incorporated by reference herein in its entirety. Certain aspects of the record retention and post-issuance compliance system may be publicly available. Other aspects may be restricted to use by certain users and/or entities. The restricted access module may be used to restrict access as appropriate as discussed further herein.

In some implementations, a final transcripts module may be used to facilitate the storage and use of a bond issue's final transcript. This document may need to be accessed at various times and for various reasons after the issuance of the bond.

In some implementations, a remarketing module may used to facilitate the collection and use of information relating to remarketing of the various bond issues.

Additional modules may also be used with the record retention and post issuance compliance module and/or other elements provided by the systems of the invention.

As indicated above, the record retention and post issuance compliance module and/or its associated modules may be a part of an integrated post-issuance compliance system (e.g., the DAC system described above or other system). Some advantages of using the record retention and post issuance compliance module with one or more of the other modules include the ability to avoid the need for redundant and/or manual entry of data, as well as the provision of a single tool that enables the determination of the status of an individual bond issue and/or a portfolio of bond issues, a single tool that facilitates compliance with the various rules and regulations from different agencies (e.g., SEC, IRS, MSRB and/or other agencies or entities), and a single tool that enables information and documents related a bond issue to be stored in a common system over the life of the bond and easily retrieved if necessary for audit, investigation and/or other purposes. Other synergies exist from such a system. For example, if an IRS tax calculation results in the need to make an IRS filing and/or an SEC Rule 15c2-12 filing, the information from the calculation (and/or other information from the system) can be used to make both filings. For instance, a change in the guarantor or a change in the terms of the credit facility for the bonds may provide data or information that is necessary for both the secondary market disclosure filing module (e.g., due to a material change in the credit enhancement on the bonds) and the calculations module (e.g., due to the impact, if any, that a change in the payments on the credit enhancement might have on the calculation of the private business use tests), as any change may effect the payments and/or the calculations for private use business tests. Additionally, the modules in the system may use a common alert system, calendar system, tasks system, or reminder system.

In some implementations, operation the record retention and post issuance compliance module or it associated system may include a user may creating an account with the system, if this has not already been done. Once an account is created, the user may be able to interact with the system. In some implementations, the user may be an agent of or an "authorized user" representing an entity that is an issuer or obligor. For simplicity the term "issuer" will be used generally throughout most of this application. However, it is to be understood that, in general, the same principles apply to other obligors. The system may facilitate the creation of entries regarding Individual bond issues which may then be associated with the issuer. Information related to each bond issue may be stored in a suitable storage module. For convenience, this storage device will be referred to as a "bond issue storage module."

When the record retention and post issuance compliance module of the system is accessed by a registered user (e.g., a user accessing the system through an authorized account), the user may be first identified by the system using one or more known security and authentication techniques (e.g., username, password, and/or other security protocols). The system may also determine the level of access to be afforded to the user such as, for example, whether a user is authorized to setup a bond issue or access other parts of the system. In some instances, one or more bond issues may be associated with or accessible by the user. These bond issues may be identified upon the user initially accessing the system. In some implementations, the user may then be presented with a customized user interface or role-based menu that provides customized interaction with the system based on the role or level of access associated with the user.

A role-based menu may provide a user with a number of viewing and/or editing options related to the identified bond issues associated with the user. In some instances, the menu may display a summary of information and options related to the associated bond issues. In some instances, the user may be provided with options relating to functions of the system such as, for example, adding a new bond issue, accessing existing bond issues, accessing the secondary market disclosure modules, accessing the restricted access module, and/or performing other tasks. The role based menu may also present the user with a summary of displayed information regarding bond issues associated with the user. For example, the role based menu may provide the user with a list of generated alerts, a list of generated reminders, a list of documents filed, and/or other information.

In some implementations, the user may utilize the record retention and post issuance compliance system in order to view the records of one or more existing bond issues. When the user attempts to access one or more existing bond issues, a determination may be made as to whether the user is authorized to access this feature of the system. If the user is not authorized to access the system in this manner, the user may be directed back to the role-based menu. In some instances, if access is not be granted, the system may flag the attempted entry and prohibit further access to the selected bond issue information until an administrator or other high-level user permits further access (presumably after resolving any security-related matters). If the user is authorized to access the system in this manner, the user may be provided with further role-based options, as determined by the record retention and post issuance compliance module, restricted access module, or other portion of the system.

The further role-based options presented to the user may be based on the identification of the user and/or the determined authorizations associated with such a user. For example, the options provided to the user may include accessing records of the bond issues associated with the user. For example, a list of bond issues may be provided to a user. The user may then choose to select a particular bond issue from the list of bond issues to access records, create records, and/or edit records of a particular bond issue (e.g., information and/or documents relating to post issuance compliance). If the user is not authorized to access the selected bond issue, the user may be directed back to the further role-based options, for example. If a user is authorized to access the records of the selected bond issue, the user may be directed to a personalized home page or customized dash board that is designed to display a summary of information related to the selected bond issue.

In some implementations, the customized dash board may include a plurality of sections that provide a review of information regarding the selected bond issue. The dash board may include an alerts section, a reminders section, a documents filed section, a spreadsheets section, a saved documents button, a document retention section, and/or any other section reporting information related to the selected bond issue.

In some implementations, the system may be used to access stored information and perform compliance calculations related to bond issues. For example, the system may apply applicable Code and regulatory tests as determined by the IRS to information relating to a particular bond issue to perform necessary or desired compliance calculations. The system may perform the compliance calculations upon manual initiation by a user (e.g., when prompted by a user such as an issuer or obligor) and/or may perform the calculations automatically upon the occurrence of a specified condition or passage of a time interval. Once prompted (either manually or automatically), the system may perform calculations related to the reporting requirements and/or compliance calculations (further described herein). The system may also perform calculations related to one or more alerts, rules, or other regulatory standards (e.g., the private business use test). In some implementations, the system may also extract bond issue information previously entered and stored in the system, and determine one or more measurements or other calculations (e.g., percentages, ratios) for compliance. In some implementations, the system may provide one or more templates for entering the required calculation information for calculating compliance requirements. For example, the template(s) may include fields for entering the initial bond issue information, issuance costs information, expenditures/assets, and other bond issue information.

In some implementations, the compliance calculations may be analyzed in order to determine if compliance requirements for a bond issue are met. For example, the system may track compliance with IRS rules on private use of tax-exempt financed facilities. Other examples of compliance calculations may include determining the highest percentage of private business use of bond financed assets for each bond year, determining the amount of unexpended bond proceeds, determining the percentage of bond proceeds used to finance costs of issuance, determining the average life of the financed facilities, and/or other compliance computations relating to the bond issue.

In some implementations, if requirements for a bond issue are not met, the system may generate alert(s)/reminder(s) for the user, generate one or more spreadsheet(s) depicting the scope of the concern, or provide notifications concerning other alternatives for non-compliant issues.

In some implementations, the system may track the investment and expenditure of bond proceeds and the use of the financed facilities, for the purpose of generating information for filing, as well as alert(s)/reminder(s) relating to specific timeframes for action. For example, the system may prepare and/or facilitate the preparation of forms for filing that are required for compliance with respect to the use of the bond issue proceeds. In some implementations, the system may prepare and/or facilitate the preparation of Schedule K forms for filing with the IRS. The system may also prepare and/or facilitate the preparation of defeasance notice(s) relating to changes in use of the bond proceeds, or other documents relevant or necessary to the compliance calculations and record retention. In some implementations, the system may provide an alert when certain dates for allocating bond proceeds are nearing.

In some implementations, the system may present compliance calculations or the distribution of bond issue proceeds to an issuer and/or obligor after entry or extraction of the required calculation information. For example, the system may output these results (e.g., compliance calculations) to one or more devices. In some implementations, the system may output the results to a display screen, a handheld device, or other device such as a client device for accessing the system. The system may present the compliance calculations and/or distribution of bond issue proceeds and other related bond issue information electronically. For example, the system may present the bond issue information and calculations in the form of spreadsheets or documents. In this or other ways, the system may provide the results to one or more individuals, entities, users, companies, issuers, or obligors.

In some implementations, a list of users may be defined that may access or receive bond issue information, calculations, and other related input information for a selected bond issue. For example, the system may allow for specified users to access bond issue information related to specified bond. In some implementations, the system may transmit bond issue information from the files being managed by the system to a list of users. At the election of the issuer or obligor, the system may also enable uploading or posting to a website (or other accessible locations), certain bond issue information that would provide assurance to investors of post-issuance monitoring and compliance by an issuer or obligor.

By way of example, the system may allow for the management of user access. The system may also allow for the management of a mailing list. For example, the system may allow for the addition, editing, or deletion of mailing list contacts that receive updates or calculations related to input bond issue information.

In addition to storing, uploading, and calculating bond issue information related to bond issues, the system may also establish alerts and/or reminders. The system may be used to create alerts and/or reminders regarding information that needs to be input over the life of the bond. Alerts relating to post-issuance compliance may be presented to a user. For example, alerts may be provided or generated when post-issuance compliance calculations are determined to be in non-compliance for a bond issue. In some implementations, alerts may be generated for bond issues when it is determined that a bond issue(s) has expenditures over applicable private use percentages or expenditures over the designated percentage limitation on issuance costs. In some instances, a user or the system may create and/or edit an alert(s) for a selected bond issue. In some instances, the system may create an alert automatically, such as when calculations are performed. In some implementations, one or more reminders may be generated, for example, for deadlines and/or dates relating to post-issuance compliance for a bond issue(s) or for other purposes. For example, reminders may be created to enter bond issue information relating to a bond that may be required by a due date. Reminders may be generated, for example, when pending deadlines or dates relating to a bond issue are approaching or have approached. For example, the reminder(s) may remind a user of upcoming dates (e.g., allocation, reporting, payment, or compliance dates) related to a bond issue. Additionally, a user or system may create or edit a reminder(s) for a selected bond issue. In some instances, the system may create a reminder automatically.

Other objects, features, and advantages of the present invention will become apparent from the following detailed description, the accompanying drawings, and the appended claims.

BRIEF DESCRIPTION OF THE DRAWINGS

FIG. 13 is an exemplary illustration of a user interface that enables a user to set up or add post issuance compliance bond issue information and/or documents associated with a bond issue, according to various implementations of the invention.

FIG. 18 is an exemplary illustration of a user interface that enables a user to add and/or edit a facility or project associated with data entry options associated with a bond issue, according to various implementations of the invention.

FIG. 19 is an exemplary illustration of a user interface that enables a user to view expenditures and/or assets associated with a bond issue, according to various implementations of the invention.

FIG. 20 is an exemplary illustration of a user interface that enables a user to add and/or edit expenditures and/or asset information and/or documents associated with a bond issue, according to various implementations of the invention.

FIG. 21 is an exemplary illustration of a user interface that enables a user to add arbitrage rebate notification date information associated with a bond issue, according to various implementations of the invention.

FIG. 22 is an exemplary illustration of a user interface that enables a user to add a contract or agreement associated with a bond issue, according to various implementations of the invention.

FIG. 23 is an exemplary illustration of a user interface that enables a user to enter information and/or upload documents related to a bond issue for a management contract or agreement, according to various implementations of the invention.

FIG. 24 is an exemplary illustration of a user interface that enables a user to enter information and/or upload documents related to a bond issue for a research agreement, according to various implementations of the invention.

FIG. 25 is an exemplary illustration of a user interface that enables a user to enter information and/or upload documents related to a bond issue for a lease agreement, according to various implementations of the invention.

FIG. 26 is an exemplary illustration of a user interface that enables a user to enter information and/or upload documents related to a bond issue for a sales agreement, according to various implementations of the invention.

FIG. 28 is an exemplary illustration of a user interface that enables a user to input receipt and/or maintenance and operations information and/or upload documents associated with a bond issue, according to various implementations of the invention.

DETAILED DESCRIPTION OF THE INVENTION

One aspect of the invention relates to systems and methods for facilitating record retention and post-issuance compliance for municipal bonds. For example, in one implementation, the invention may provide a system that enables record retention and meeting compliance requirements mandated by law, rules, or regulations (e.g., regulations according to Rev. Proc. 97-22 and/or other codes, rules, and/or regulations that may exist now or in the future), company policy, or other guidance for maintaining records using (electronic) storage systems. This aspect of the invention may facilitate tracking of relevant municipal bond activities (e.g., use of proceeds of the bond, use of bond financed facilities, etc.) by bond issue; determining when compliance-related calculations need to be made over the life of the bond; making the necessary calculations in a timely manner; collecting, organizing and maintaining information to support the calculations; storing documents to support the information and calculations; determining if the calculated results indicate that the use of proceeds are in compliance; making filings; generating alerts and/or reminders and/or taken other actions relating to compliance requirements. For convenience, this collection of features will sometimes be referred to herein as the "record retention and post issuance compliance" module 12.

Figure 1:
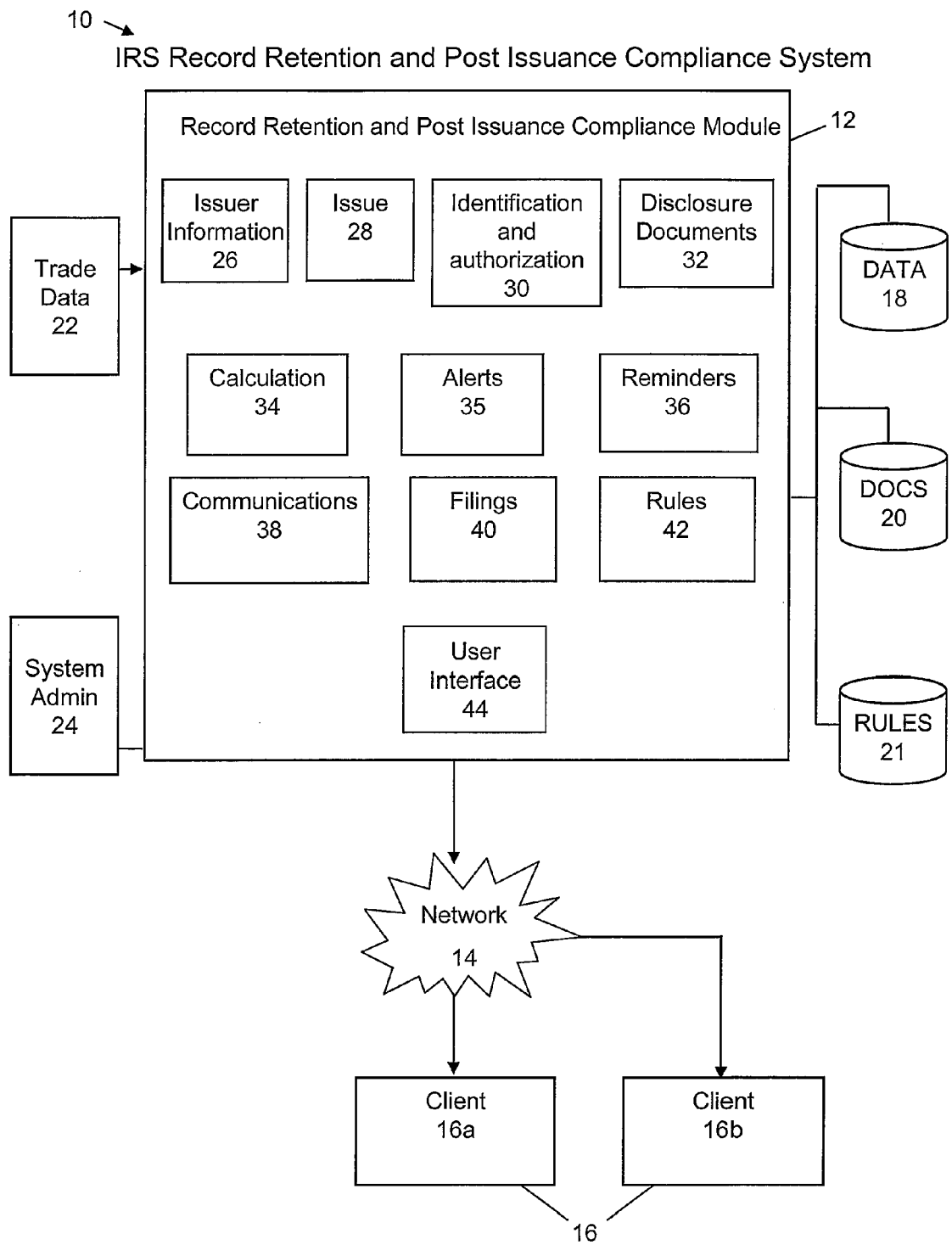
FIG. 1 is an exemplary illustration of a record retention and post issuance compliance system, according to various implementations of the invention.

FIG. 1 illustrates an example of a record retention and post issuance compliance system 10. The record retention and post issuance compliance system 10 may manage information and/or receive and store documents, make calculations and facilitate compliance actions related to bonds, securities, notes, and/or other financial instruments issued by issuers or obligors (e.g., municipalities, agencies, corporations, etc.). For convenience, the systems and method of the invention are illustrated and described herein using the municipal bonds as an example. However, the invention is not so limited and other financial instruments or arrangements may be supported by the system.

As will be further described, the management of information related to municipal bonds by record retention and post issuance compliance system 10 and record retention and post issuance compliance module 12 may include receiving information from users and/or documents related to the bonds, maintaining information and documents related to issuer accounts, securely distributing information to interested users, allowing authorized users to take action, for example, to access, edit, and/or delete information, prompting issuers to submit or enter information when information is due, issuing alerts about information that has not been submitted in a timely fashion, issuing alerts about information that is incorrect or incomplete, securely storing information, providing secure access to information, and/or otherwise managing information related to issued bonds and/or users. Record retention and post issuance compliance module 12 is not limited to these functions. Additional or fewer functions may be included in this module. Some or all of the specified functions may be performed by one or more other modules. Some functions may be omitted and others added.

As shown in FIG. 1, record retention and post issuance compliance system 10 may include a record retention and post issuance compliance module 12. In some implementations, record retention and post issuance compliance module 12 may include one or more additional modules. For example, as shown in FIG. 1, record retention and post issuance compliance module 12 may include an issuer information module 26, issue module 28, an identification and authorization module 30, a disclosure documents module 32, a compliance calculations module 34, an alerts module 35, a reminders module 36, a communications module 38, a filings module 40, a rules module 42, and/or other modules. The various modules described herein and the associated functionality may be implemented in software; hardware; firmware; some combination of software, hardware, and/or firmware; and/or otherwise implemented. In some implementations, the one or more of the various modules disclosed herein and/or the various features and functions they perform or other features or functions described herein may be carried our or otherwise supported by one or more processing devices configured to perform such features and functions, computer readable media including computer readable instructions (including any memory device or data storage media) for causing one or more processing devices to perform the features and functions described herein. Furthermore, the various systems described herein may include any necessary computer hardware or devices, such as, for example, any input devices, display devices, data communication devices, or other devices.

It should be appreciated that although modules 26-42 may be illustrated in FIG. 1 as associated with a single processing unit or processing devices, implementations may exist in which multiple processing units or processing devices may located remotely from one another and modules 26-42 may be likewise located remotely from one another. In these "distributed" implementations, operative communication between the modules may be achieved via one or more operative communication links. In some implementations, additional or fewer modules may be implemented to provide the functionality of modules 26-42 without departing from the scope of this disclosure. Various subcomponents and/or hardware may also be used therewith.

According to an aspect of the invention, one or more client devices 16 (illustrated as client devices 16a-16b) may access a system 10 directly, or over a network 14, via a communication link. Client devices 16 may include one or more of a personal computer, laptop computer, a personal digital assistant, a handheld computing device, a mobile telephone, a smart phone, a pager, or other client device. The communications link may comprise a wired connection, a wireless connection, a discrete connection, a connection established via a network (e.g., the Internet, a WAN, a LAN, a MAN, etc.), or other operative communication links. In some implementations, client devices 16 may provide some or all of the functionality of the customer computers discussed in the '408 patent.

One or more computer microprocessors may be suitably programmed to perform the functions of the various modules described herein. For example, one or more processors may enable the management of information within system 10 and other functionalities. This includes managing the storage of information in one or more storage modules 18, 20 (described herein) and the transfer of information to, and receiving and processing information from, client devices 16. In some implementations, a computer microprocessor associated with system 10 may provide, among other things, some or all of the functionality provided by the web server and workstation described in U.S. Pat. No. 7,155,408.

In some embodiments, one or more storage modules may be used with system 10, for example, to store information and/or documents associated with one or more bond issues. For example, a data storage module 18 (for electronically storing information input by a user), a document storage module 20 (for electronically storing uploaded documents), and/or rules storage module 21 (for storing rules to assist in determining post issuance compliance) may be used with system 10 and/or module 12.

As used herein a data storage module may include one or more data storage devices or systems including associated hardware (e.g., memory devices), software and or one or more associated databases. A database, as used herein may include, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Language Query), a SAN (storage area network), Microsoft Access™ or others may also be used, incorporated, or accessed into the invention.

In some embodiments, system 10 may include, be associated with, or otherwise communicate with a municipal bond trade data feed module 22, which may provide data regarding municipal bond trades record retention and post issuance compliance module 12. For example, the trade data feed module 22 may be used to obtain certain data needed to make certain calculations. In some embodiments, the data may be available from one or more commercially available sources. Advantageously, the trade data may also be displayed by a display component of system 10 in real-time, as a scrolling ticker, or in a chart or table format, or otherwise. Thus, data may be used to automatically provide data needed to perform various calculations (e.g., such as providing information relating to the percentage of bonds of a certain issue have been traded when such information is necessary or useful).

In some embodiments, system 10 may include, be associated with, or otherwise communicate with a systems administration module 24 that maintains, among other things, a list of users who are permitted to access record retention and post issuance compliance module 12. In some instances, system 10 may utilize systems administration module 24 to provide authorized users such as, for example, a systems administrator, with access to information that may only be created and/or edited by specific authorized users (e.g., create/edit system alerts or reminders related to post issuance compliance for a bond issue).

In some embodiments, issuer information module 26 of record retention and post issuance compliance module 12 may be used, for example, to receive, manage, store and/or retrieve information relating to a bond issuer or user. In such implementations, issuer information module 26 may enable the management of information related to the issuer. For instance, issuer information module 26 may manage information and/or one or more files that are (1) associated with the issuer, and (2) stored by storage modules 18, 20. Issuer information module 26 may be used, for example, to receive, manage, store, and/or retrieve information relating to a particular bond issuer. The types of information and/or documents that may be managed by issuer information module 26 may include information related to financial information of the issuer, information related to a payment default, information related to a credit downgrade (or upgrade), information related to an insolvency or bankruptcy event, and/or other information. The management of information by issuer information module 26 may include entering/receiving information to be managed, restricting access to the information to a predetermined list of users, transmitting the information to a list of users (including a predefined list of users and/or a list of users defined by the issuer), deleting information, uploading documents, and/or other management functions.

In some implementations, issuer information module 26 may enable a bond issuer to enter and/or store information to storage modules 18 such that the information will be received by system 10 and stored in storage modules 18 and managed by issuer module 26.

In some implementations, system 10 may enable management of information and documents related to one or more bonds issued by an issuer. In some implementations, issue module 28 of record retention and post issuance compliance module 12 may manage the information related to the specific bonds issued by the issuer. The issue module 28 may be used to receive, manage, store and/or retrieve information and/or documents relating to a particular bond issue. In some embodiments, issue module 28 may manage information and/or one or more documents that are: (1) associated with the bonds issued by the issuer, and (2) stored by storage modules (e.g., data storage module 18 or document storage module 20). The types of information and/or documents associated with the bonds issued by the issuer that may be managed by issue module 28 may include information related to the bond issuer (e.g., some or all of the information entered into issuer information module 26), information related to a secondary bond associated with the bond issued by the issuer, and/or other information related to the bond. Information related to the secondary security may include information related to the issuer(s) of the secondary security, the terms of the secondary bond (e.g., the conditions that impact a purchaser/holder's ability to exercise the secondary options), information related to conditions that may impact a purchaser/holder's ability to exercise the secondary security (e.g., a credit downgrade, a payment default, an insolvency or bankruptcy event, etc.), documents associated with the secondary security (e.g., letters of credit, bond insurance documents, etc.), and/or other information related to the secondary security. The management of information by issue module 28 may include entering/receiving information to be managed, associating the entered information with the appropriate one of the bonds issued by the issuer, restricting access to the information to a list of users (including a predefined list of users and/or a list of users defined by the issuer), transmitting the information to a list of users (including a predefined list of users and/or a list of users defined by the issuer), deleting information, and/or other management functions.

Identification and authorization module 30 of record retention and post issuance compliance module 12 may be used, for example, to identify a user and the user's level of authorization to access information and/or documents associated with a particular bond issue, and/or to take actions with respect to a particular bond issue. As used herein, the term "user" is not limited to a single person. Instead, "user" may refer to one or more people associated with a single entity. For example, in some instances a group of people associated with a household, a brokerage, a company, a financial institution, an insurer, a regulatory agency, or another entity may be considered to be a single entity. Alternatively, one ore more people associated with an issuer or an obligor may also be considered a single entity. For simplicity the term "user" will be generally used through most of this application. However, it is to be understood that in general the same principles apply to those entities listed above and other entities with access to the systems described herein.

In some instances, identification and authorization module 30 may identify a user based on identification information provided by user. Any suitable user identification technique may be used. In some implementations, the user may provide identification information to the system during a "log-in" procedure that enables the user to log-in to system 10. In one implementation, the identification information may include one or both of a user name and a password. Other types of identification information may include an email address, a registration number, a verification file, and/or other information. Identification and authorization module 30 may identify the user by comparing identification information entered by the user with stored identification information associated with a plurality of users to determine a match between the entered identification information and the stored identification information. In some implementations, the stored identification information may be stored by storage module 18.

In some implementations, identification and authorization module 30 may determine a level of authorization for a particular user. For example, a user may be authorized to view files, information, and/or documents associated with a bond issue but may not be authorized to add and/or edit information and/or upload documents for a bond issue. In some instances, any of the features or functions described herein may be included in a given "level" of access such that the features or function in a set of predetermined levels of access may be customized as desired. In some implementations, identification and authorization module 30 may determine a user's authorization level upon identification of the user. In some implementations, identification and authorization module 30 may determine a user's authorization level upon entering a password, code, or other information. In some implementations, identification and authorization module 30 may determine a user's authorization level at other times such as, for example, when a user desires to take certain actions or access certain information and/or documents.

In some implementations, disclosure document module 32 of record retention and post issuance compliance module 12 may be used to facilitate the management of documents and/or other files relating to an issuer and/or one or more bond issues. Disclosure document module 32 may enable a user to upload files to storage module 20, for example. The uploaded files may be stored in storage module 20. In some implementations, the uploaded files may be organized according to an issuer, a bond issue, and/or otherwise organized. Disclosure document module 32 may enable the user to upload files by enabling selection of one or more files stored on a client device 16 and receiving a transmission of the selected one or more files from the client device 16.

In some implementations, disclosure documents module 32 may manage information within system 10 related to public disclosures (of bond issuers) to one or more regulatory agencies. The management of information related to public disclosures may include performing some or all of the functionality of the workstation and web server in providing the web site described in U.S. Pat. No. 7,155,408. For example, disclosure documents module 32 may store and/or provide access to information and documents related to future required disclosures that must be filed by bond issuers (e.g., disclosures to be filed with MDRs), may coordinate dissemination of disclosure materials to brokers and/or dealers, may evaluate disclosure materials for completeness and/or correctness, may inform interested parties (e.g., MDRs, brokers, dealers, holder, etc.) of unsatisfactory disclosure (e.g., failure to make disclosure, incomplete disclosure, etc.) by users, may inform interested parties of relatively recent disclosures by users, may archive and/or index disclosure materials for the lifespan of the corresponding securities, and/or may otherwise manage information related to public disclosures, including further management of information related to public disclosures described in U.S. Pat. No. 7,155,408. In some implementations, the stored document and identification information may be stored by storage module 20.

In one example, disclosure documents module 32 may manage information related to an extension of a guarantee or a substitution of a guarantor. Generally, a guarantee is issued on a given security by a guarantor for a predetermined period of time. Disclosure documents module 32 may use information related to an expiration date of the guarantee on the given bond to remind the user of the given bond that the expiration date is approaching. On or before the expiration date, the user must secure either an extension of the existing guarantee by the current guarantor, or a substitution of a new guarantor in place of the previous one. Both an extension and a substitution qualify as a material event that must be disclosed by the user in accordance with Rule 15c2-12. Accordingly, when either an extension or a substitution is obtained by the user, disclosure documents module 32 may manage the disclosure of the event via the mechanism(s) discussed in U.S. Pat. No. 7,155,408. Further, disclosure documents module 32 may prompt a user (e.g., using alerts module 35) and/or other modules of system 10 (e.g., issuer module 26, issue module 28, etc.) to make a supplemental disclosure of information related to the extension or substitution to purchasers/holders that are regulated by Rule 2a-7. The prompt or alert may result in an automated release of information that is subject to restricted access, a request to the user for the requisite information, etc.

In some implementations, compliance calculation module 34 of record retention and post issuance compliance module 12 may be used, for example, to determine when to make compliance calculations related to a bond issue, to make the necessary calculations and to determine, based on the results of the calculation, whether compliance requirements (e.g., IRS and/or SEC post issuance compliance requirements) are met. As information is received and stored by the system 10 for a bond issue, the system 10 may evaluate the information relating to the bond issue. The information may be used by the system 10 to calculate compliance calculations, for example. More specifically, compliance calculation module 34 may calculate compliance and reporting requirements (e.g., post-issuance compliance requirements) using information stored in the storage module 18. Compliance calculation module 34 may use information that is entered or originates from uploaded files or documents (from storage modules 18 and 20) associated with a bond issue. In some instances, compliance calculation module 34 may perform compliance calculations to assist a user in preparing Schedule K for filing with the IRS. In some instances, compliance calculations may include determining the amount of unexpended bond proceeds, the percentage of private use of bond proceeds, or other calculations. In some implementations, other compliance calculations relating to a bond issue may be performed. In some implementations, the system may deliver the compliance calculations to the client device, users, or others with access to the system 10 for each bond issue.

In addition to tracking amounts and percentages, in some implementations, the systems and methods of the invention may highlight questions for counsel to interpret, provide notifications to alert issuers and borrowers about upcoming allocation dates, keep records of allocations made, produce printable reports for review, notify issuers and borrowers when expenditures are over applicable private use percentage as a reminder to blend down private use, notify issuers and borrowers regarding upcoming dates for arbitrage rebate compliance, notify issuers and borrowers about the need for a voluntary closing agreement request, and/or provide other features.

In some instances, compliance calculation module 34 may perform compliance calculations using the following formulas, which in some implementations may be stored as rules by a rules storage module (e.g., module 21) and may be derived from or otherwise utilize rules module 42 or 78.

I. General Bond Calculations:
  Calculation of Issuance Costs Limitation (Section 147(g))

Issue Price×2%=Issuance Costs Cap  a.

Issuance Costs Cap−(ongoing total of expenditures for Costs of Issuance)=Remaining Cost of Issuance Permitted.  b.

Calculation of Amount of Proceeds Expended/Unexpended

Sales Proceeds−Proceeds Placed in Reserve Fund=Net Sales Proceeds  c.

Net Sales Proceeds+Net Investment Income During Construction Period=Net Proceeds  d.

Net Proceeds−Expenditures=Unexpended Net Proceeds.  e.

Net Sales Proceeds−Unexpended Net Proceeds=Expended Net Sales Proceeds  f.

II. Private Business Use Test
  For each separate Facility and Bond Year: Based on Non-Qualified Lease:
    aa) Total Square Footage of Facility.
    bb) Square Footage of Common Space.
    cc) aa−bb=Total Square Footage of Leasable Space.
    dd) Total Square Footage Leased to Private Person.

$dd/(aa-bb)$=Private Use Percentage.  1)

For each separate Facility Based on Expenditures:
  ff) Private Use Expenditures (Bad Costs).
  gg) Qualified Costs.
  hh) Common Costs.
  ii) [ff/(ff+gg)]×hh=Allocatable Bad Common Costs.

$ii+ff/(ff+gg+hh)$=Private Use Percentage.  1)

III. Private Use Percentage (Expectations Basis).
  aa) Net Sales Proceeds.
  bb) Total Neutral Costs (Not including Amounts in Reserve)
  cc) aa−bb=Net Sales Proceeds to be Allocated to Facilities and Working Capital
  dd) Total Private Use Allocated to Non-Facility Costs.
  ee) Total Private Use of Facilities (Expectations Basis).
  ff) Private Use Proceeds before Neutral Costs.
  gg) (dd+ee+ff)/cc=Private Use Percentage
  hh) gg×bb=Total Neutral Costs (other than reserve)×Private Use Percentage $(cc \times gg)+hh$=Total Private Use Proceeds Amount Other formulas and/or data may be used. In some implementations, any information relating to a bond issue that relates to a bond issue prior to or at the time of issuance and that is used to perform calculations relating to that bond issue may be considered "bond issuance information." In some implementations, any information relating to a bond issue after issuance, including information regarding use of proceeds of the bond, may be considered "post issuance information."

In some implementations, calculations may include tasking received data relating to a bond issue and applying applicable Code and regulatory tests to generate one or more outputs, which in some implementations may be in the form of spreadsheets. In some implementations the outputs may include: the total amount of bond proceeds, plus construction period receipts, less construction period rebate liability; the amount of private use percentage of the total amount of bond proceeds expended for each year of the bond issue, and the total private use over the life of the bonds divided by the total years in the measurement period to arrive at the average private business use percentage, including the amount of proceeds spent on working capital and issuance costs; and the reallocation of private use and payments during certain stated periods with dates of allocation. In some implementations, the one or more outputs may also include the present value (back to the date of issue) of private payments received for each year of the bond issue, with a comparison of this result with the present value of the debt service payments on the bonds multiplied by the private use percentage determined above. In some implementations, the lesser of these values to determine actual private use payments. In some implementations, the present value may be based on the yield on the bonds. Other outputs may also be produced.

In some embodiments, compliance calculation module 34 may perform other calculations (and/or use other formulas) other than those listed above. In some implementations, the system may be designed to assist users in tracking "actual facts" regarding a bond issuance to ensure that post-issuance compliance requirements are met. Thus, any compliance calculations or formulas which assist a user in maintaining reporting requirements may be used by compliance calculation module 34. In some instances, compliance calculation module 34 may apply rules from rules module 42 of record retention and post issuance compliance module 12 to determine when to perform calculations, and/or what action(s) to take when it is determined that calculations are not in compliance.

In some implementations, alerts module 35 of record retention and post issuance compliance module 12 may be used, for example, to create, manage and monitor alerts relating to post-issuance compliance. In some implementations, alerts may be generated to notify a user of non-compliance for a bond issue. In some instances, alerts may be generated when calculations are performed, when calculations are determined to not be in compliance for a bond issue, when information has not been submitted in a timely fashion, when information is incorrect or incomplete, when it is determined that a bond issue has expenditures over applicable private use percentages, when expenditures over the designated percentage limitation on issuance costs, and/or when other notifications relating to post-issuance compliance are appropriate. In some instances, a user or the system 10 may create and/or edit an alert(s) for a bond issue. In some instances, the system 10 may generate an alert automatically. For example, an alert may be generated when calculations are performed.

In some implementations, reminders module 36 of record retention and post issuance compliance module 12 may be used, for example, to create, manage and monitor reminders relating to post-issuance compliance. For example, reminders may be generated for deadlines and/or dates relating to post issuance compliance for a selected bond issue. In some instances, reminders may be created and/or issued to a user when bond issue information is due, when due dates for entering information and/or filing forms are approaching or have approached (e.g., allocation, reporting, payment, or compliance due dates), when tasks need to be completed (e.g., calculations need to be made) over the life of the bond, when calculation(s) is(are) due, and/or when other reminders relating to post-issuance compliance are appropriate. In some instances, a user or the system 10 may create and/or edit reminder(s) for a bond issue. In some instances, the system 10 may create a reminder automatically.

In some implementations, communications module 38 of record retention and post issuance compliance module 12 may be used, for example, to enable selective, and if desired, secure dissemination of bond compliance and/or other information (e.g., post-issuance compliance information) to the public and/or designated recipients, and to create and manage dissemination lists for the issue and/or certain activities relating to the issue. Communications module 38 may be used to communicate relevant information (e.g., such as the calculations provided by the calculation module or other information associated with a bond issue) to selected individuals or users. In some instances, alert(s) and/or reminder(s) may be sent to a user via communications module 38, for example. Communications module 38 may enable a user, such as a user associated with an issuer, to transmit information and/or files that have been uploaded to storage modules 18 or 20 to one or more users. For instance, communications module 38 may be configured to generate electronic messages (e.g., emails, SMS messages, instant messenger messages, electronic voice messages, etc.) that provide information included in one or more files that have been uploaded to the system. In some implementations, this may include including copies of the one or more files in the generated electronic messages. In some implementations, communications module 38 may manage manual downloads of the files by one or more users. For example, communications module 38 may manage an FTP site, or other manual download format/interface. As discussed in greater detail further herein, users that receive the transmission of files from communications module 38 may include users that are approved by the issuer. In some implementations, communications module 38 may enable one or more users to receive information from system 10 through one or more clients 16.

In some implementations, filings module 40 of record retention and post issuance compliance module 12 may be used to facilitate the preparation and storage of documents and other information for a particular bond issue which needs to be (and/or have been) filed with the IRS and/or other agencies or other entities. In some embodiments, system 10 may enable these documents to be transmitted to one or more destinations (e.g., regulatory entities), such that filing or disclosure requirements may be met.

In some implementations, rules module 42 of record retention and post issuance compliance module 12 may be used to create, edit, manage and apply rules that relate to post-issuance compliance issues. For example, the rules may include one or more "date determining rules" relate to when calculations, filings and/or other activities may be due pursuant to SEC, IRS and/or other rules, regulations or requirements. The rules module 42 may also provide substantive "calculation rules" necessary to make certain calculations pursuant to SEC, IRS and/or other rules, regulations or requirements. In some instances, the rules module 42 may determine when to perform calculations and/or what action(s) to take when it is determined that calculations are not in compliance. The rules module 42 may receive rules from the rules storage module 21, for example. Calculation module 34 may utilize the stored ruled from rules module 24 to derive formulas for or otherwise perform any necessary or desired calculations In some implementations, user interface module 44 of record retention and post issuance compliance module 12 may provide one or more interfaces (including one or more graphical user interfaces) that enable a user to receive, manage, store and/or retrieve bond and other information, and/or otherwise interact with some or all of the components of record retention and post issuance compliance system 10. User interface module 44 may also be used with the record retention and post issuance compliance module and/or other aspects of the system to provide one or more user interfaces that may be used to enable a user to enter, manage, store and/or retrieve bond information, documents, alerts, reminders, calculations, filings, and/or other information, and/or to otherwise interact with the system 10 to utilize the features described herein and/or other features. In some implementations, user interface module 44 enables a user to exchange information with system 10 via network 14 and an application (e.g., a browser) being executed on client device 16. In some instances, user interface module 44 provides one or more templates to a user via client device 16 for entering information and/or uploading documents associated with a bond issue(s). FIGS. 10A-31, as will be further described herein, illustrate examples of user interfaces that may be accessed or presented to a user through the system 10.

The various features and functions enabled by the various modules described herein will be apparent with reference to the various exemplary interfaces as illustrated in FIGS. 10-31. It should be understood that the interfaces described in detail herein, and illustrated in the accompanying figures, are exemplary and may differ in appearance, content, and configuration. Further, and as may be described herein, the terms "button," "pull-down or drop-down menu," "tab," "click-box," "check-box," "hypertext link," and "hot link," are each particular examples of a generic "selection portion" which may comprise any known navigational tool that enables users to select, access, display, or navigate through the various interfaces, portions, or modules of the invention. The selection portions may be accessed using any known input device associated with client devices 16 such as, for example, a keyboard, computer mouse, light stylus instrument, or finger or other body part in a touch-screen implementation. While a selection portion may be described and illustrated as a button in one implementation, it could comprise a different selection portion (e.g., a check box or other selection portion) in an alternative implementation. These selection portions may be present in addition to the various navigational tools that may be unique to, or associated with, a particular web browser or other application through which the features and functionality of the invention may be accessed.

Some advantages of system 10 and record and post issuance compliance module 12 include the ability to keep track of filings and compliance activities for bond issues. System 10 may assist in reducing the time and expense associated with IRS, SEC, and/or other audits, and/or other examinations, and may further assist in maximizing an allocation of permitted non-qualified bond proceeds. For example, the record retention and post issuance compliance module 12 may provide a user-friendly interface for storing information and/or documents relating to a bond before, upon, and/or after issuance that allows for tracking bonds, information related to the bonds, and compliance calculations in an organized fashion. The record retention and post issuance compliance module 12 may be designed to electronically store pertinent information and/or documents that support the tax-exempt status of the obligation through the life of the bond(s) (e.g., private business use records). In some instances, the system 10 may store information and/or documents related to bonds after issuance for the entire lifetime of the bond issue plus several years after the final maturity of the last bond of the issue. For example, the record retention and post issuance compliance module 12 may electronically store pertinent bond issue information and/or documents for three years after the final maturity of the bond(s), as per IRS instructions. In some instances, record retention and post issuance compliance module 12 may electronically store bond information and/or documents for other periods of time, as necessary or desired.

System 10 may assist issuers and obligors to track actual facts related to the bond issue to insure post-issuance compliance requirements. For example, system 10 may assist in storing data entry related to the bond issue information, such as the investment and expenditure of bond proceeds, the use of the bond financed facilities, and other bond issue information.

System 10 may also assist users by reducing the costs of building and managing in-house a record retention system. By electronically entering information and uploading documents, paper, storage, handling, and distribution costs for maintaining records may also be reduced. The system allows for quick and easy record retrieval. In some instances, users may rely on a Secure Socket Layer (SSL) using 128-bit encryption to secure records. Other configurations may be implemented.

In addition, system 10 may highlight questions for counsel to interpret, email notifications to remind users about upcoming allocation dates, keep information and/or documents of allocations made, produce printable reports for review, notify users when expenditures are over applicable private business use percentage as a reminder to blend down private business use, notify users regarding upcoming dates for arbitrage rebate compliance, or notify users about the need for a voluntary closing agreement request, among other things.

In addition to storing, uploading, and calculating bond issue information related to bond issues, system 10 may also establish alerts and/or reminders. System 10 may provide alerts and/or reminders relating to the bond issue information that is required for a bond. For example, system 10 may alert users of pending deadlines or non-compliance relating to private use allocations and rebate payment calculations, notify users when certain legal issues need to be reviewed by counsel, and warn users if various limitations that apply to the expenditure of bond proceeds appear to be exceeded (as will be further described herein). System 10 may send a notification in the form of a reminder about upcoming dates or compliance calculations that are not in compliance. The system may also develop reports regarding the information in each of the bond storage modules.

In some implementations, record retention and post issuance compliance module 12 may be used with one or more other modules. For example, as discussed above, record retention and post issuance compliance module 12 may be used with trade data feed module 22 (for example, to provide data regarding municipal bond trades and which may be used, for example, to obtain the data necessary for certain calculations) and/or other modules. In some implementations, the functions of one or more of these other modules may be part of or included within the record retention and post issuance compliance module 12.

In some implementations, system 10 may comprise a stand-alone system, or may be used in conjunction with (or as a part of) an integrated post-issuance municipal bond compliance system. The integrated post-issuance municipal bond compliance system may include functionality to enable IRS, SEC, Rule 2a-7, and/or other compliance. In some implementations, some or all of the components and/or functionality of system 10 may be provided in conjunction with some or all of the components and/or functionality of a secondary market disclosure filing system and/or system at "www.dacbond.com." Further details of the synergies of this combination are set forth herein.

Figure 2:
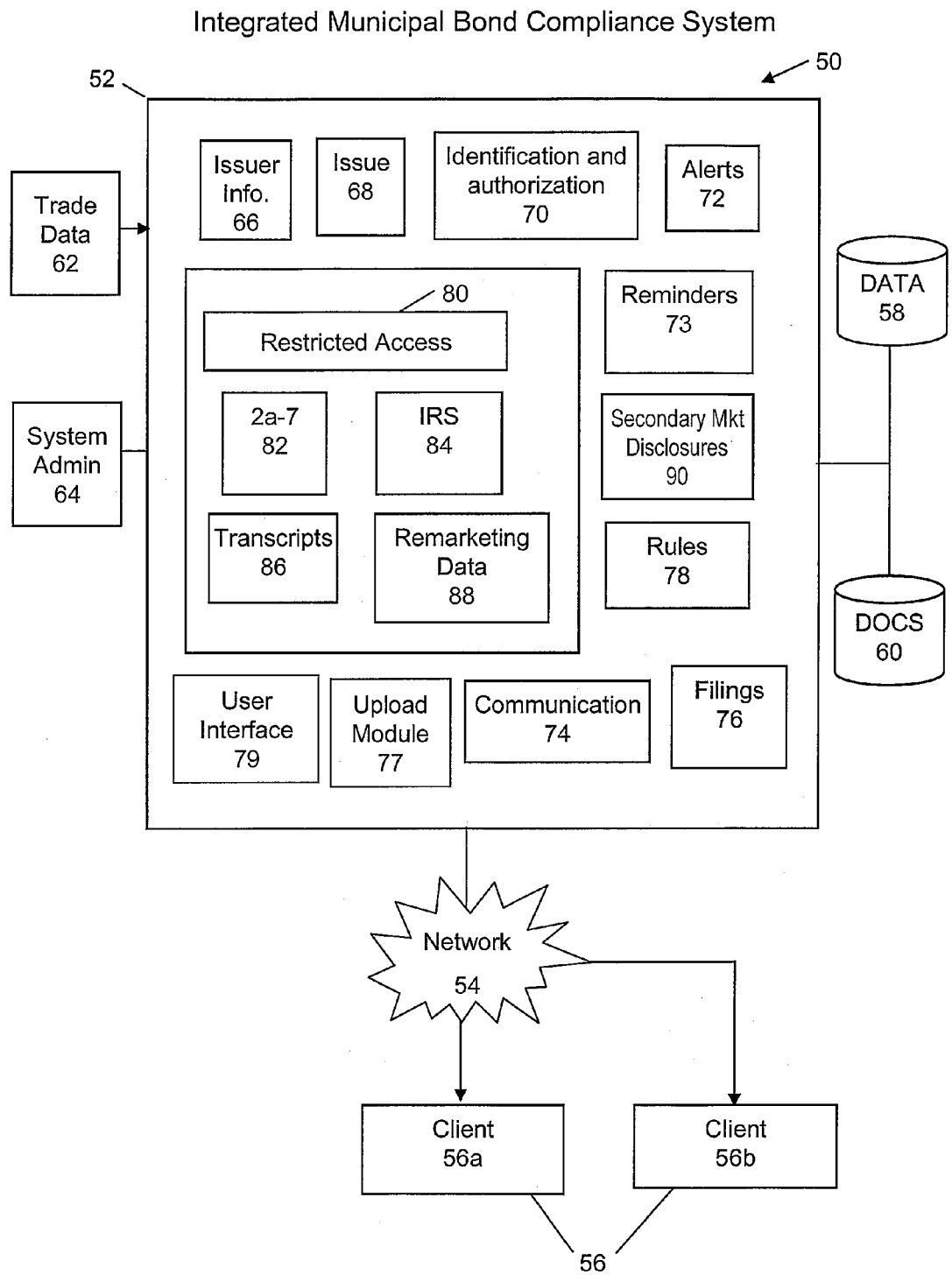
FIG. 2 is an exemplary illustration of a municipal bond compliance system, according to various implementations of the invention.

For example, FIG. 2 illustrates an example of an integrated municipal bond compliance system 50. Integrated municipal bond compliance system 50 may be used with a record retention and post issuance compliance system 10 and/or record retention and post issuance compliance module 12 such as, for example, system 10 and module 12 illustrated in FIG. 1.

In some implementations, integrated municipal bond compliance system 50 may include a record retention and post issuance compliance module 52. In some implementations, record retention and post issuance compliance module 52 may include an issuer information module 66, an issue module 68, an identification and authorization module 70, an alerts module 72, a reminders module 73, a communications module 74, a filings module 76, a rules module 78, an interface module 79, and/or other modules. Modules 66, 68, 70, 72, 73, 74, 76, 78 and 79 may provide the same or similar function as modules 26, 28, 30, 32, 34, 35, 36, 38, 40, 42, and 44 illustrated and described with reference to FIG. 1 having similar names.

In some implementations, an upload module 77 may also be included in record retention and post issuance compliance module 52 or elsewhere in system 50 (or system 10 of FIG. 1). Upload module 77 may be used in conjunction with the issue module 28, 68 (and/or other modules) to upload documents and/or enter other information to support the entered bond issue information. This information and/or documents may be associated with the one or more bond issues to which they relate, and the event (e.g., expenditure, facility/project) or other activity to which they relate. In some implementations, upload module 77 may enable information relating to one or more bond issues to be "extracted" from the one or more documents. The information and/or documents may be stored via the storage modules 58, 60 (or database, memory, or other storage device). This and/or other bond issue information may be used by the calculation module to make any necessary or desired calculations, including post-issuance compliance calculations, for example.

Modules 66-79 may be implemented in software; hardware; firmware; some combination of software, hardware, and/or firmware; and/or otherwise implemented. It should be appreciated that although modules 66-79 are illustrated in FIG. 2 as associated with a single processing unit or processing device, implementations may exist wherein multiple processing units or processing devices located remotely from each other are used. In these "distributed implementations" modules 66-79 may be located remotely from each other and operative communication between the modules may be achieved via one or more operative links. In some implementations, more or fewer modules may be implemented to provide the functionality of modules 66-79 without departing from the scope of this disclosure. Various subcomponents and/or hardware may be used therewith.

In some implementations, record retention and post issuance compliance module 52 may include or be used in conjunction with one or more other modules such as, for example, a secondary market disclosure filing module 90 (for example, to address Rule 15c2-12); a restricted access module 80 (for example, to address Rule 2a-7); a trade data feed module 62 (for example, to provide data regarding municipal bond trades); a systems administration module 64 and/or other modules. Additionally, in some implementations, a Rule 2a-7 compliance module 82, an IRS compliance module 84, a final transcripts module 86, remarketing module 88, and/or other modules may also be provided in correlation with restricted access module 80, or otherwise associated with system 50. In some implementations, some or all of the functions of one or more of these other modules may be included with the record retention and post issuance compliance module 52, or vice versa.

Secondary market disclosure filing module 90, if used, may enable the making of secondary market disclosure filings, for example, filings pursuant to Rule 15c2-12, which may be amended from time to time, and/or other secondary market disclosure requirements that may exist now or in the future. Examples of such features may be found in U.S. Pat. No. 7,155,408, entitled "Method and Apparatus for Managing Information and Communications Related to Municipal Bonds and Other Securities." In some implementations, secondary market disclosure filing module 90 may receiving information regarding a secondary market for one or more municipal bond issues. This information may be received from a user imputing the information into the system, uploading one or more documents to the system or may be otherwise received. Secondary market disclosure filing module 90 may then prepare one or more regulatory filings base at least in part on the received information. In some implementations, other information (e.g., bond issuance information, post issuance information, or other information) may be used to prepare the one or more regulatory filings. As used herein, a "filing" may include one or more documents, forms or set of information required by a regulatory agency or other entity. In some implementations secondary market disclosure filings module may utilize one or more portions of the system to file the one or more regulatory filings with one or more regulatory agencies.

Restricted access module 80 may include features relevant to situations wherein a system includes some documents that are to be made available to the public and other are desired or required to be accessed by a limited class of entities, for example, documents relevant to Rule 2a-7. Examples of such features may be found in U.S. patent application Ser. No. 11/669,642, filed Jan. 31, 2007, entitled, "System and Method for Managing Information Related to Securities and Securities Issuers," which is hereby incorporated by reference herein in its entirety. Restricted access module 80 or a separate module may be used to allow restricted access to the record retention and post issuance compliance module 52, for example. In some implementations a subset of the total users to system 50 may be granted access to certain information stored in system 50. In some implementations, this access may be restricted based on the role of the user and/or other permissions associated with the user. Certain aspects of a post-issuance compliance system such as the integrated municipal bond compliance system 50 may be publicly available. Other aspects may be restricted to use by certain users and/or entities. The restricted access module 80 may enable restricted access as appropriate.

Trade data feed module 62 may provide data regarding municipal bond trades. For example, the trade data feed module 62 may be used to obtain certain data needed to make certain calculations. The data may be available from one or more commercially available sources. Advantageously, the trade data may also be displayed in real-time, as a scrolling ticker, or in a chart or table format, or otherwise. Thus data may be used to automatically provide data needed to perform various calculations (e.g., when 10 percent of a bond issue, or other threshold, have been traded).

Rule 2a-7 compliance module 82 may be used to provide restricted access to information and/or documents related to a bond issue. IRS compliance module 84 may be used, for example, to make compliance calculations related to a bond in order to determine whether compliance requirements (e.g., IRS post-issuance compliance requirements or other requirements) are met.

Final transcripts module 86 may be used to facilitate the storage and use of a bond issue's final transcript. This document may need to be accessed at various times and for various reasons after the issuance of the bond. Remarketing module 88 may be used to facilitate the collection and use of information relating to the remarketing of the various issues.

In some implementations, systems administration module 24 may maintain, among other things, a list of users who are permitted to access record retention and post issuance compliance module 52. In some instances, system 50 may utilize systems administration module 64 to provide authorized users such as, for example, a systems administrator, with access to information that may only be created and/or edited by specific authorized users (e.g., create/edit system alerts or reminders related to post issuance compliance for a bond issue).

As noted above, the use of the record retention and post issuance compliance module 52 and/or other modules with a post-issuance compliance system (such as integrated municipal bond compliance system 50) may alleviate the need for redundant and/or manual entry of data, provide a single tool that enables the determination of the status of an individual bond issue and/or portfolio of bond issues, provide a single tool that facilitates compliance with the various rules and regulations from different agencies (e.g., SEC, IRS, MSRB [Municipal Securities Rulemaking Board], and/or other agencies or entities), and provide a single tool that enables information and documents related to a bond issue to be stored in a common system over the life of the bond and easily retrieved if necessary for audit, investigation, and/or other purposes. Other synergies exist from such a system. For example, if an IRS tax calculation results in the need to make an IRS filing and/or an SEC Rule 15c2-12 filing, the same information from the calculations and/or other information from the system can be used to make both filings (e.g., via IRS module 84 or secondary market disclosures module 90). For instance, a change in the guarantor or a change in the terms of the credit facility for the bonds may provide data or information that is necessary for both the secondary market disclosure filing module (e.g., due to a material change in the credit enhancement on the bonds) and the calculations module (e.g., due to the impact, if any, that a change in the payments on the credit enhancement might have on the calculation of the private business use tests), as any change may effect the payments and/or the calculations for private use business tests. Some additional advantages of using a record retention module with one or more other modules includes the ability to keep track of filings and compliance activities for bond issues. Additionally, the modules in the system may use a common alert system, calendar system, tasks system, or reminder system.

System 50 may also include one or more client devices 56. FIG. 2 illustrates two client devices 56a and 56b. In some implementations, one or more client devices 56 may be connected to system 50 by a network 54. In some instances, one or more client devices may be directly connected to system 50. In some implementations, system 50 may include one or more storage modules 58, 60 or other storage modules or devices. Storage modules 58, 60 and/or other storage module may store bond issue information, user information, documents, rules, and/or other data.

To use system 10, a user may first create an account with system 10. In some implementations, an authorized user (e.g., an administrative user or other entity) also may set up an account for a user. In some implementations, the user may be an authorized individual associated with an issuer or obligor (e.g., the entity actually issuing a bond or instrument). In some implementations, the user may be an agent of an issuing entity (e.g., an attorney, an accountant, etc.).

Figure 3:
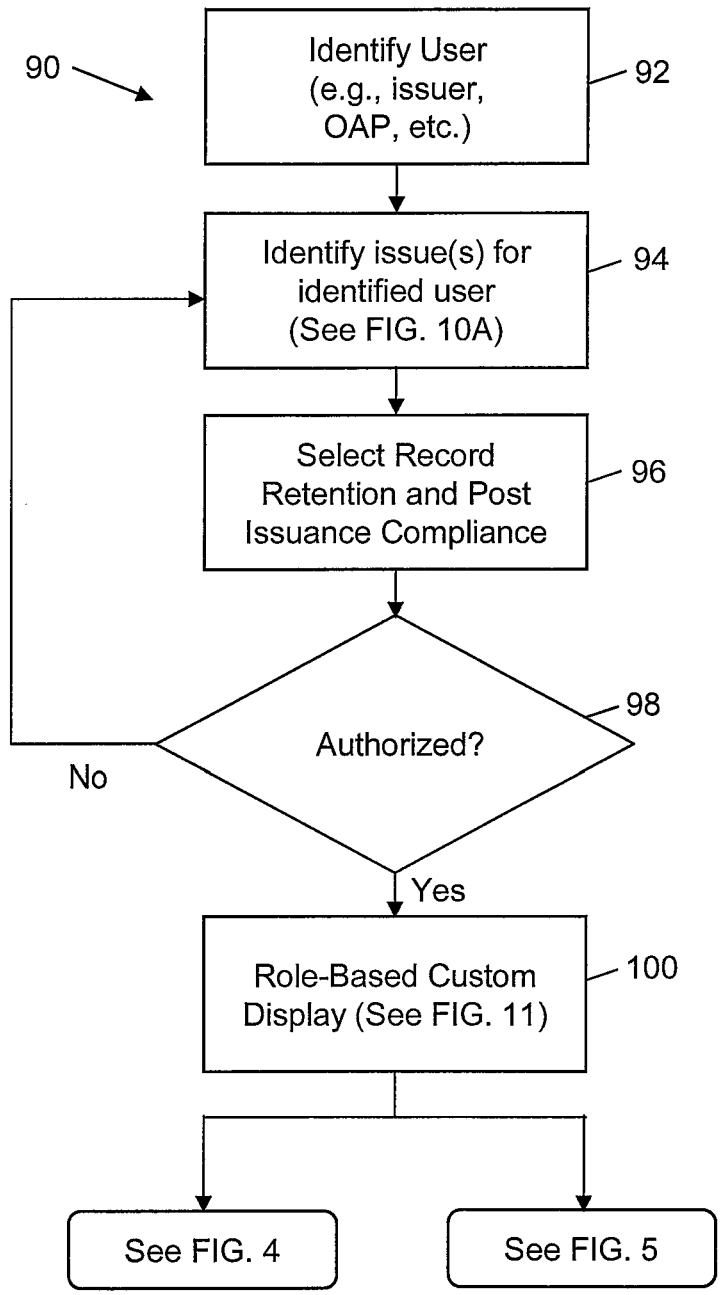
FIG. 3 is an exemplary illustration of a flow chart for accessing and viewing a custom display of information and documents related to a bond, according to various implementations of the invention.

FIG. 3 illustrates a process 90 wherein a user may access the integrated municipal bond compliance system 50 and view a custom display of information and documents related to bond issues. In an operation 91, a user may be identified 92 by system 50. System 50 may also determine if the user is authorized to setup a bond issue or to access the system. Identification and authorization module 70, as disclosed above, may be used to identify and determine authorization of a user. In some instances, bond issues associated with or accessible by the user may then be identified in operation 94. In some instances, operation 94 may include presenting the user with a number of viewing and/or editing options related to the identified bond issues. For example, the user may be presented with a customized graphical user interface or role-based menu. In some embodiments, the role based menu may be enabled, created, or otherwise supported by interface module 79, or other module of system 50.

Figure 10A:
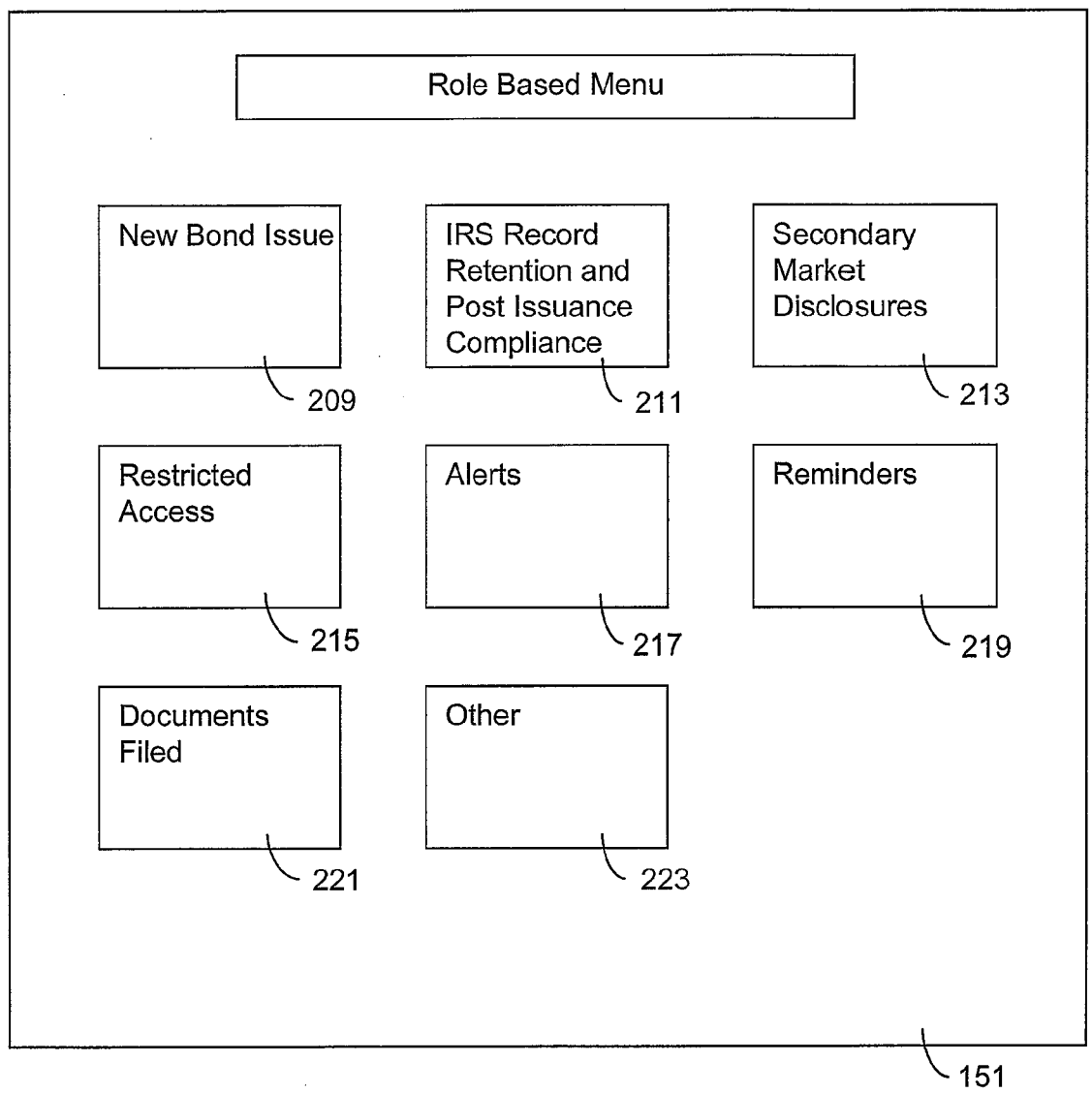
FIG. 10A is an exemplary illustration of a role based menu or dashboard for displaying information related to bond issues for an issuer or obligor, according to various implementations of the invention.

The role-based menu may be provided to the user after entering or logging onto the system 50 via a client device 56. FIG. 10A illustrates an example of a user interface 151 that may serve as a role-based menu or customized dashboard which may be presented to a user (further described herein) in operation 94.

In an operation 96, the user may select one of the selection portions (e.g., 209-223) of interface 151 in an attempt to access a record retention and post issuance compliance module (e.g., module 12 of FIG. 1 or module 52 of FIG. 2). In an operation 98, it may be determined whether the user is authorized to access the record retention and post issuance compliance system and/or module (or the specific portion/feature of the system associated with the selection portion selected by the user). In some implementations, the user may be prompted to identification information (e.g., username, password, etc.) prior to the determination being made. If the user is not authorized to access the system and/or module, the user may be directed back to a graphical user interface. For example, the user may be directed back to user interface 151 of FIG. 10A. In some instances, if access is not granted, the system may flag the attempted entry and prohibit any further access to bond issue information.

If, in operation 98, it is determined that the user is authorized to access the record retention and post issuance compliance module, then the user may be provided, in an operation 100, with role-based options determined by the record retention module and post issuance compliance 12, restricted access module 80, or system 50. In some implementations, the options provided to the user may be restricted and/or enabled by the users role or specific level of access. The role-based custom display (e.g., interface 250 of FIG. 11) for a user may be based on the identification of the user and/or the determined authorizations associated with such a user, as will be further described herein.

Figure 4:
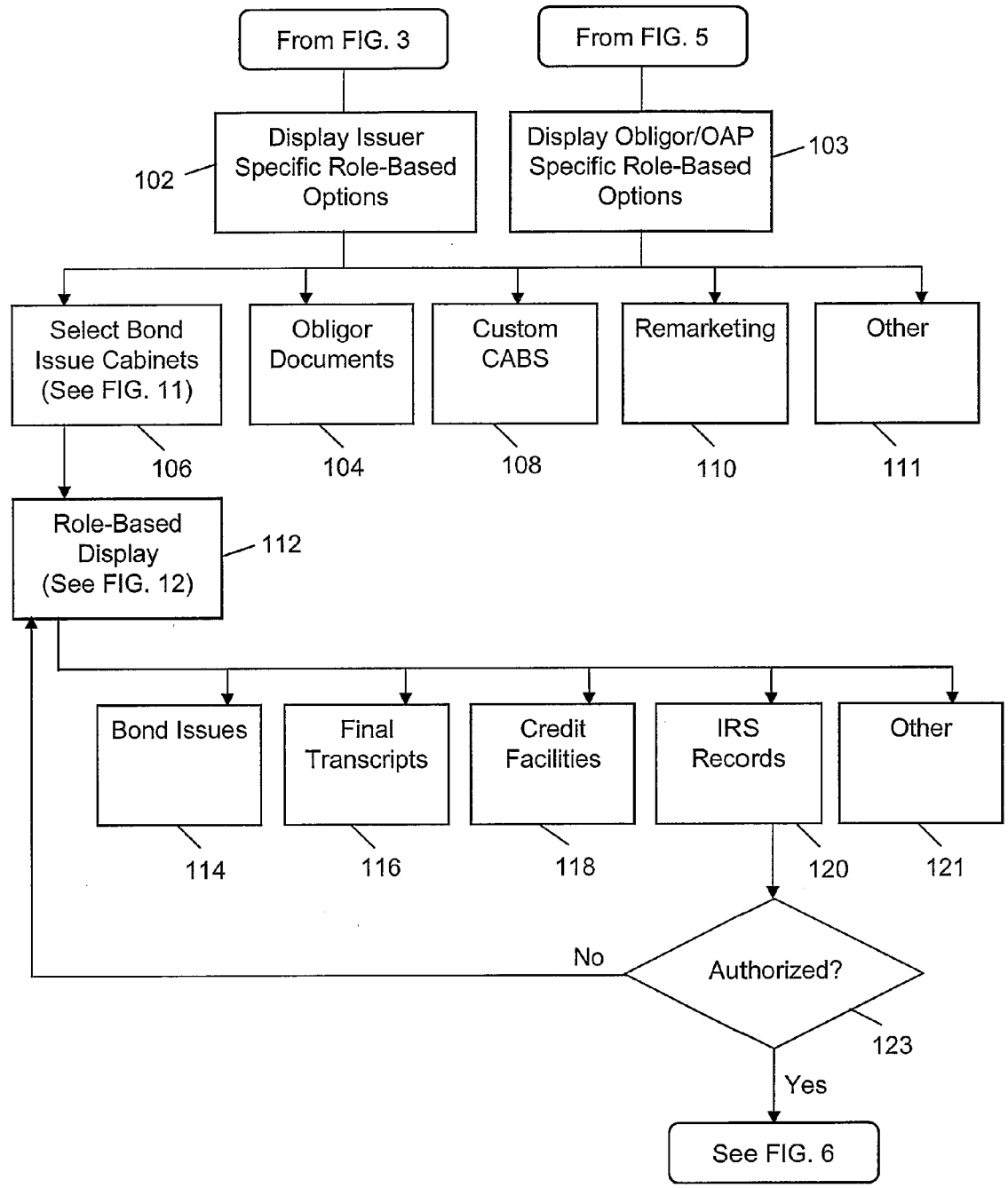
FIG. 4 is an exemplary illustration of a flow chart of options available to a user once a role-based display is present to the user, according to various implementations of the invention.

FIG. 4 illustrates an example of a process 400 that illustrates options available to a user once a role-based display is presented to the user in accordance with an implementation of the invention. For example, should the system determine that the user is an entity associated with an issuer in operation 92 of FIG. 3, and the user is authorized to access the record retention and post issuance compliance system 10 or integrated municipal bond compliance system 50, issuer-specific, role-based options may be displayed to the user in an operation 102 (e.g., via user interface 250 of FIG. 11). The options may comprise the user's ability to access, view, manage, and edit the bond issue information associated with bond issues accessible to that specific user. The bond issue information may be organized such that information and/or documents are easily accessed. For example, the system may include bond storage modules for each bond issue. The bond storage modules may enable storage, sorting and filing of information and/or documents and requirements, which are entered or uploaded into the system, in an organized fashion.

For example, as shown in FIG. 4, a user may access information including: obligor documents (in an operation 104), bond issue storage cabinets module (in an operation 106), any number of custom storage modules (in an operation 108), remarketing data (in an operation 110), and/or other storage modules or cabinets (in an operation 111) related to a bond issue(s) (as described herein). The system may provide access to each bond issue associated with an issuer, for example, and allow for viewing of the bond issue information and/or documents stored (e.g., in a storage module) during the life of a bond. In some embodiments, the bond issue storage cabinet module of operation 106 may be a module that is associated with or supported by the record retention and post issuance compliance module (e.g., modules 12 or 52) of the systems of the invention.

Selection of obligor documents in operation 104 may include accessing documents or information related to bond issues such as the information as described with reference to disclosure documents module 32 in FIG. 1. For example, secondary market disclosure documents (such as material event notices that must be disclosed by a user under Rule 15c2-12) assigned to an obligor may be accessed or viewed.

The bond issue storage cabinet module of operation 106 enables a user to access a list of bond issues. In some implementations, access to the list of bond issues of the bond issue storage cabinet module may include displaying role-based options (in operation 112). That is, when accessing the bond issue storage cabinet module in operation 112, a user may be identified and authorization may be determined before presenting a list of bond issues and information and/or documents related to those bond issues. Operation 112 may include presenting the user with a list of bond issues that the user is authorized to view and/or edit. In some instances, a user may be permitted to view documents, transcripts, and/or information associated with bond issues, but may not be able to add and/or edit additional information and/or upload documents related to the bond issues. When selecting a bond issue, the user may be provided with a plurality of options for accessing, entering, editing, and reviewing bond issue information and/or documents for a selected bond. Additional description regarding selecting, viewing, and editing information and/or documents related to a particular bond issue are further described herein in reference to FIG. 6.

Figure 12:
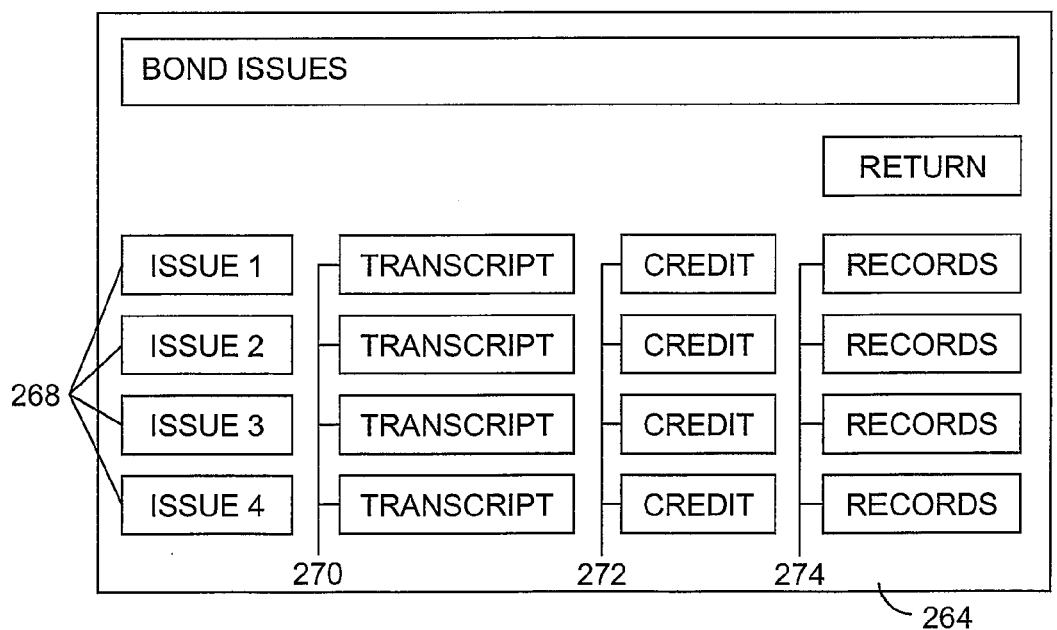
FIG. 12 is an exemplary illustration of a user interface that enables a user to access bond issue information in a bond issues cabinet module, according to various implementations of the invention.

In an implementation, options relating to the list of bond issue(s) that are accessible by a user may be provided to a user in the form of a user interface. FIG. 12 (further described herein) illustrates an example of a graphical user interface 264 that enables a user to view and access a list of bond issues and information and/or documents in a bond issues cabinet module. User interface 264 may be enabled, created, or otherwise supported by an interface module (e.g., user interface modules 44 and 79) of the system of the invention.

The role based options (of operation 112) provided by accessing bond issue storage cabinet module (of operation 106) may include access to information and/or documents associated with the bond issues, final transcripts, credit facilities, IRS records, and/or other storage modules for the issuer's bond issues. For example, In an operation 114, a list of bond issues may be provided to a user after accessing bond issue storage cabinet module. In an operation 116, the user may access final transcripts which may allow the user to manage information from a final transcripts module, such as final transcripts module 86 of integrated municipal compliance system 50, and may be used to facilitate the storage and use of an issue's final transcript. For example, the user may be able to view and/or upload final transcripts for a bond issue. In some implementations, the user may download the final transcripts for a bond issue. In some instances, a user may manage user access and/or a mailing list for viewing or receiving information related to the final transcripts of a bond issue.

In operation 118, the user may select credit facilities, which may include accessing information and/or documents for credit facilities associated with the bond issue. For example, the user may be able to view, upload, and/or edit or update credit facilities for a bond issue. In some implementations, the user may download credit facilities information and/or documents for a bond issue. In some instances, a user may manage user access and/or a mailing list for viewing or receiving information related to the credit facilities of a bond issue.

Figure 10B:
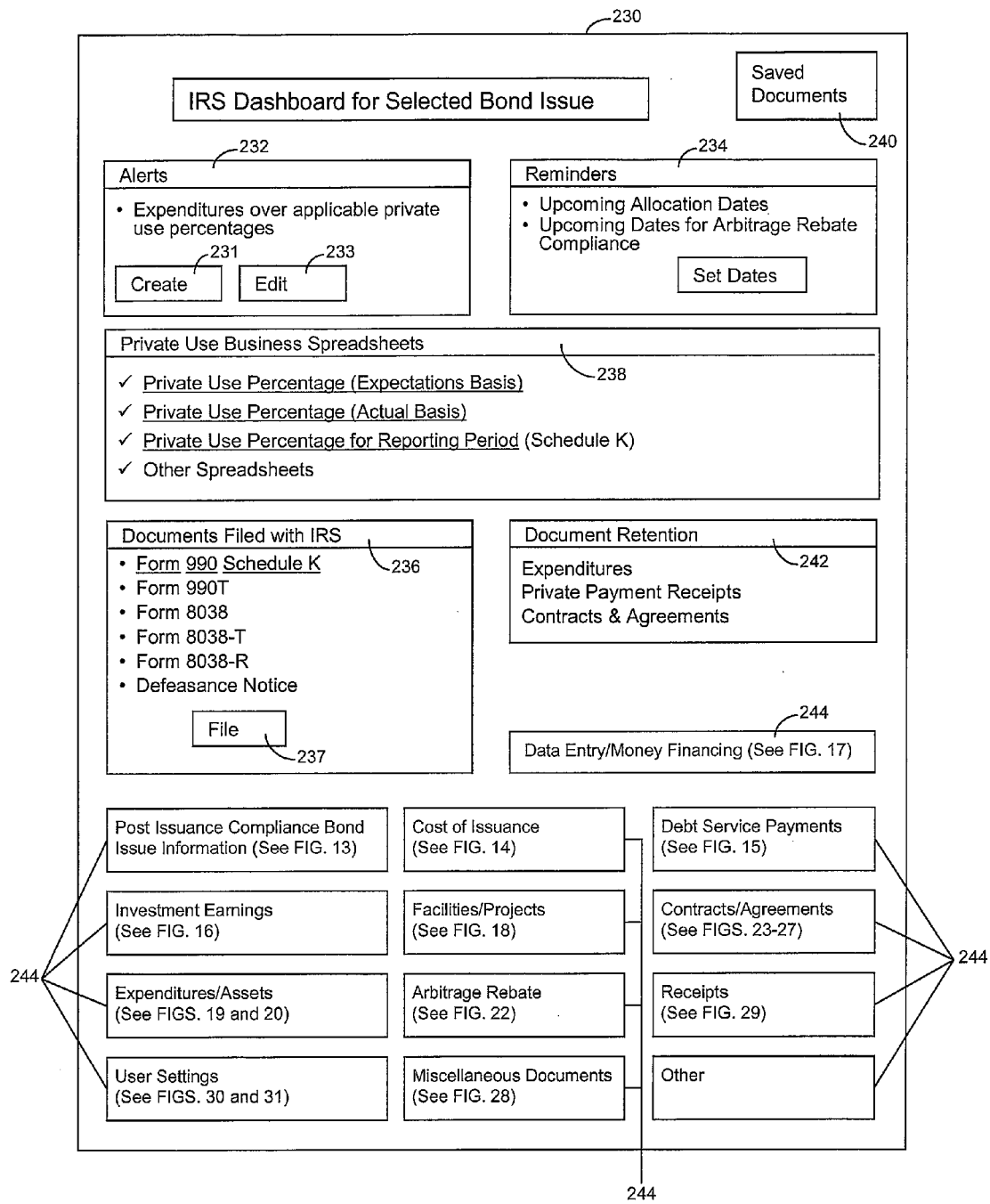
FIG. 10B is an exemplary illustration of a dash board for displaying information related to a selected bond issue, according to various implementations of the invention.

"IRS records" may include information and documents relevant to IRS records for a bond issue that need to be maintained to ensure compliance with IRS regulations. In an operation 120, the user may access IRS records associated with a particular bond issue so as to view, create, and/or edit information and/or upload documents for the bond issue. When a user accesses IRS records (e.g., in operation 120) for a bond, a determination may be made in an operation 123 as to whether the identified user is authorized. If the user is not authorized, the user may be directed to the role-based display (e.g., such as, for example, user interface 264 of FIG. 11). If the user is authorized to access IRS records, the user may be directed to a customized bond issue dashboard. For example, the user may be directed to a graphical user interface in the form of an IRS dashboard for the specific bond issue. FIG. 10B, further described herein, provides an example of a user interface 230 that may be provided to a user with authorized access. User interface 230 may be supported by a user interface module (e.g., user interface module 44 or 79) of the system of the invention.

In some implementations, custom storage modules provided for a user to personalize and organize selected information and/or documents associated with a bond issue. A user may access such custom storage modules in an operation 108.

In some embodiments, remarketing data may be provided from a remarketing data module, such as remarketing data module 88 of integrated municipal compliance system 50, and may provide collection information relating to remarketing of the various bond issues. The remarketing data may be accessed in an operation 110, for example.

Figure 5:
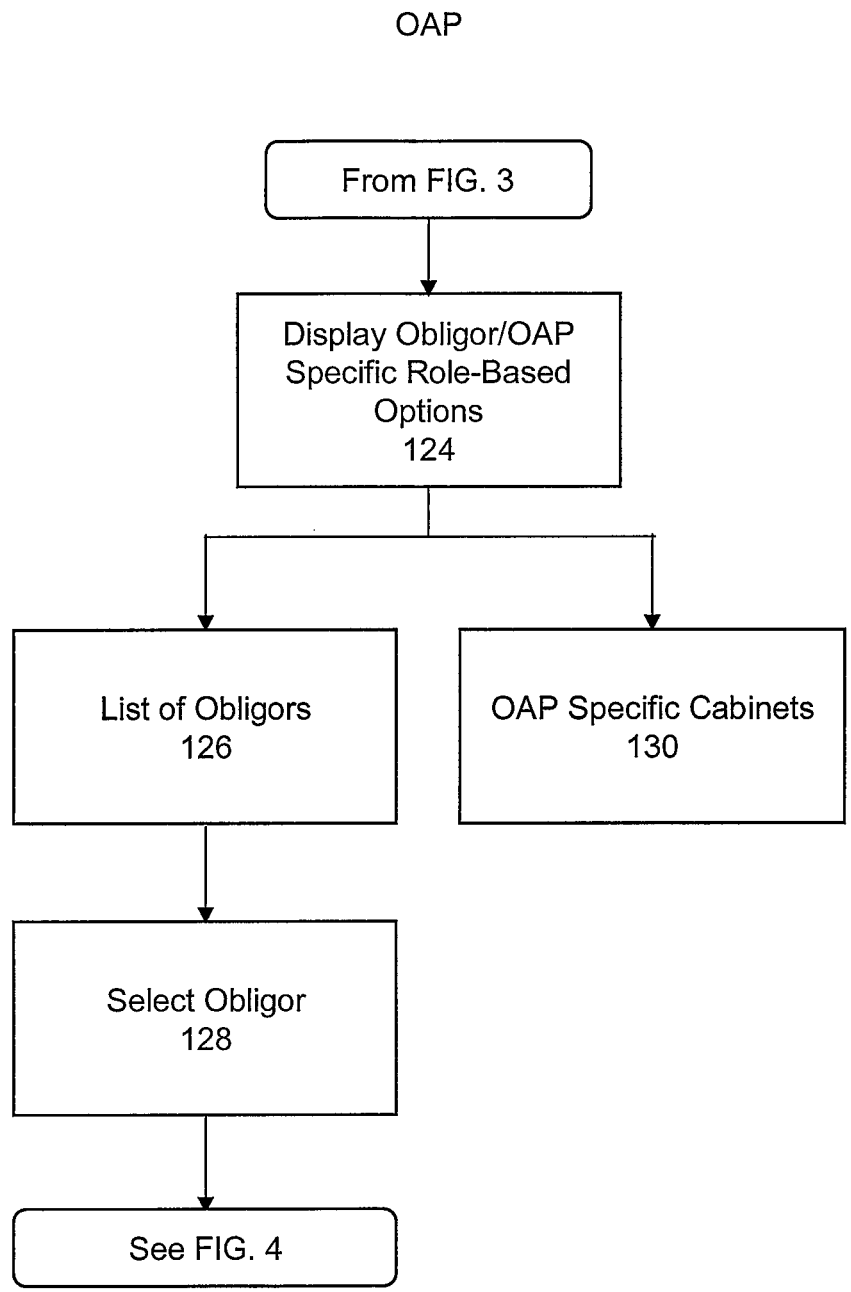
FIG. 5 is an exemplary illustration of a flow chart of options for an obligor or obligor associated person (OAP), according to various implementations of the invention.
Figure 11:
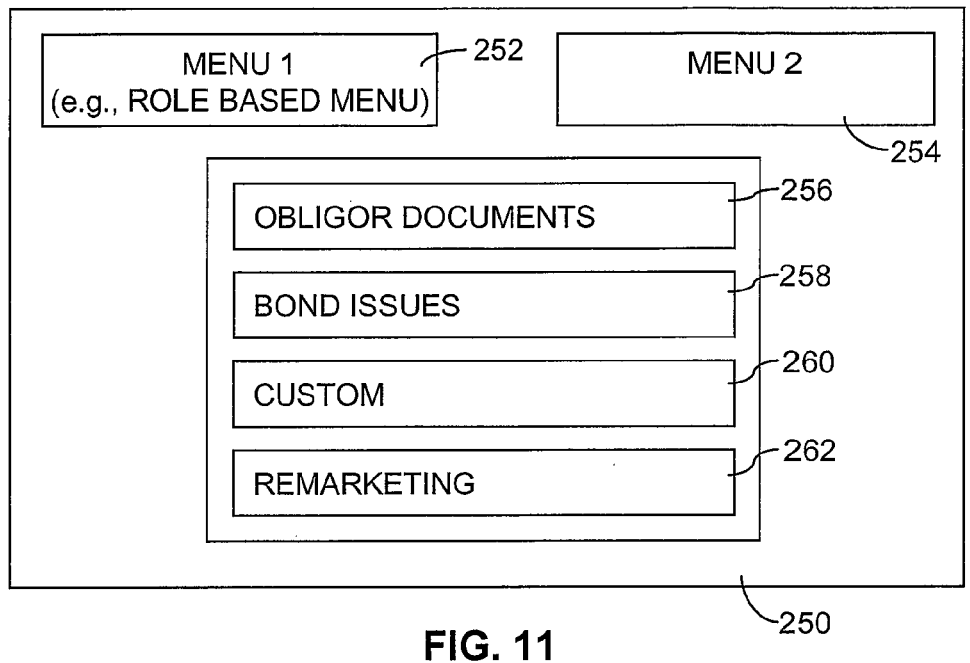
FIG. 11 is an exemplary illustration of a user interface, according to various implementations of the invention.

In some implementations, if the system determines that the user is an entity associated with an obligor (or an obligor associated person (OAP)) in step 92 of FIG. 3, and the user is authorized to access the record retention and post issuance compliance system 10 or integrated municipal bond compliance system 50, obligor specific role-based options may be displayed, in an operation 103, to the user (e.g., via user interface 250 of FIG. 11). The options may include the user's ability to access, view, manage, and edit the bond issue information associated with the selected bond issue. The bond issue information may be organized such that information and/or documents are easily accessed. More specifically, as shown in FIG. 5, after a user is recognized as authorized to access the system, obligor specific role-based options may be displayed, in an operation 124, to the user. The role-based options may include providing or displaying a list of obligors (in operation 126) or obligor specific cabinets or storage modules (in operation 130). If the list of obligors is selected in operation 126, the user may be prompted to select a specific obligor from a list, in an operation 128. Upon selection of an obligor (in operation 128), the user may be provided with obligor specific role-based options, similar to the issuer specific role-based options of FIG. 4. Selecting obligor specific modules (in operation 130) may comprise modules that are customized or created for or by an obligor, for example.

Figure 6:
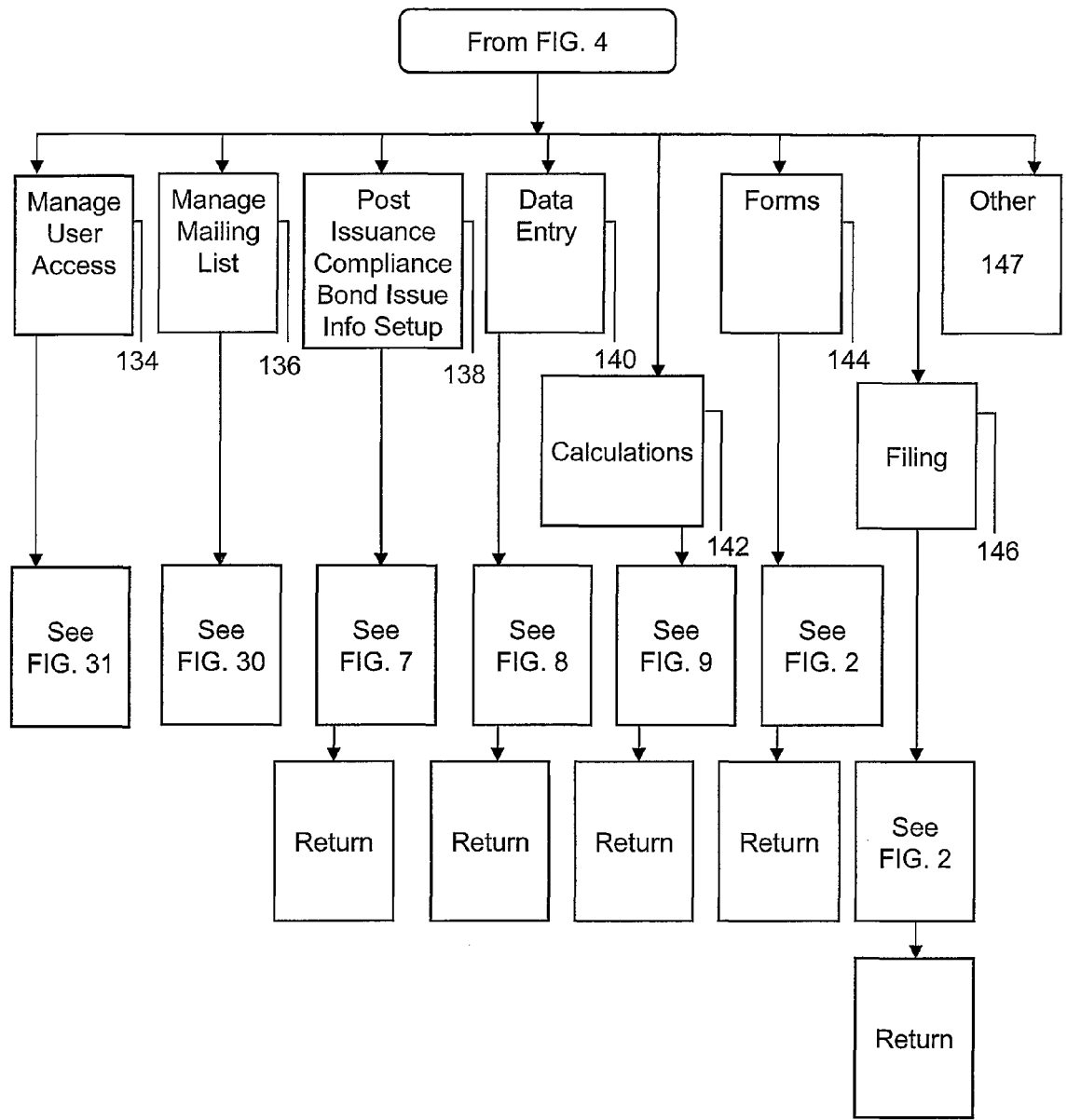
FIG. 6 is an exemplary illustration of a flow chart for accessing, entering, editing, and reviewing bond issue information for a selected bond, according to various implementations of the invention.

FIG. 6 illustrates a process for accessing, entering, editing, and reviewing bond issue information for a selected bond in accordance with an implementation of the present invention. For example, when a user selects the bond issue storage cabinet module (in operation 106 of FIG. 4), the user may be presented with a list of bond issues (e.g., such as user interface 264 in FIG. 12). The user may then select to view, create, and/or edit information and/or upload documents for bond issue(s).

Generally, as shown in FIG. 6, for a particular bond issue, the system enables a user to manage, in an operation 136, a mailing list for the selected bond issue; manage user access to information related to the selected bond issue, in an operation 134; enter or setup post issuance compliance bond issue information, in operation 138; allow for data entry related to the selected bond issue, in operation 140; perform or access compliance calculations, in operation 142; create, access, and/or file forms related to the selected bond issue, in operation 144; access forms that have already been filed for the selected bond issue, in operation 146; and/or manage other information and documents associated with the selected bond issue, in operation 147 (further described herein). In some implementations, the user may be presented with an interface or dashboard including at least the above listed options in an organized fashion. For example, as noted above, the user may be directed to a user interface (such as user interface 230 in FIG. 10B) in the form of an IRS dashboard for the selected bond issue.

Figure 29:
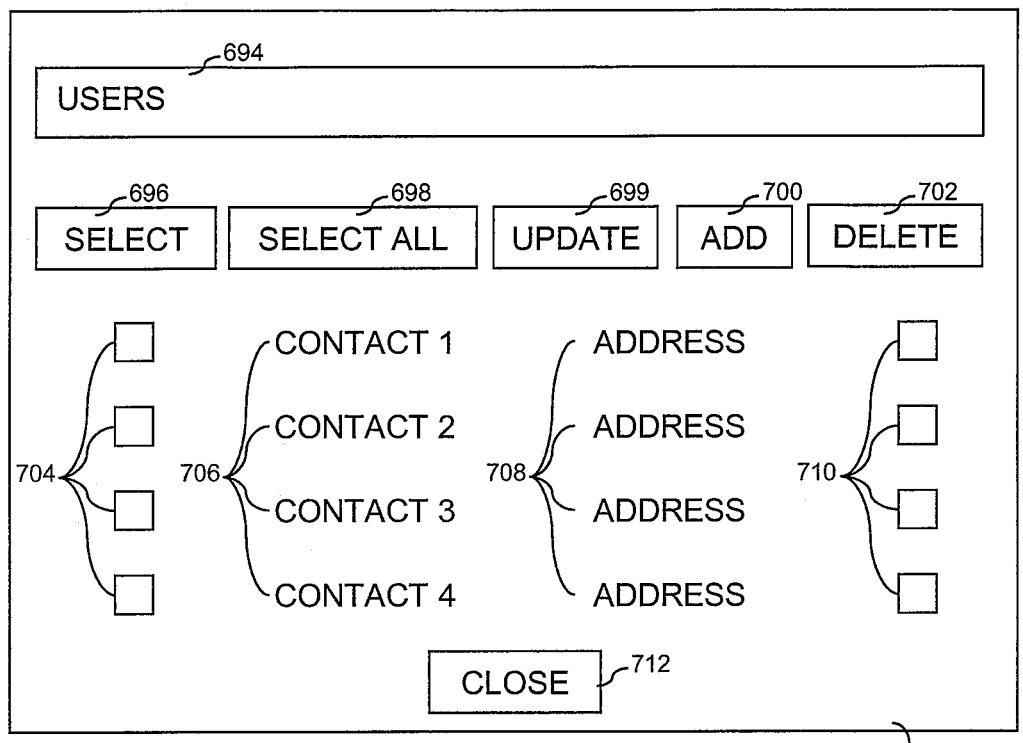
FIG. 29 is an exemplary illustration of a user interface that enables a user to define a list of users or contacts that are to receive transmissions of files, according to various implementations of the invention.

As discussed above, in operation 136 the system may allow for the management of a mailing list. In some implementations, the system may allow for the addition, editing, or deletion of contacts or a list of users (including address information) that may receive updates, calculations, and/or other information related to input bond issue information. The contact list may be stored by storage module 18, it may be stored locally on the client device 16 of a user, or it may be stored elsewhere. FIG. 29 illustrates an example of a user interface 692 that may be accessed by a user to define, add, edit, or delete a contact from a list of users that may receive transmissions regarding a bond issue. In some implementations, the contact list may include a contact list that is used globally for all users on system 10 or 50, a contact list that is specific to the user, a contact list that is specific to a user associated with the issuer or obligor, and/or other contact lists. Access to the list of users may be implemented by issue module 28 or 68 to determine whether to grant access to information to a user that logs on to system 10 or 50, based on the identification of the user by identification and authorization module 30 or 70. In some instances, the list of users may include purchasers/holders of bonds issued by the issuer, issuers (e.g., guarantors) of secondary securities (e.g., demand features) associated with one or more bonds issued by the issuer, obligor, dealers brokers, federal regulators, and/or other parties.

In some implementations, the list of approved users may be predefined to include users from whom it would be appropriate to have access to the files related to the bond issue. In these implementations, the list of approved users may or may not be predefined with input/cooperation from the issuer. For example, the list of approved users may be maintained by a system administrator using system administration module 24 or 64 to include only certain purchasers/holders (or parties associated therewith). The system administrator may be responsible for updating the list to include only the relevant parties (e.g., adding and deleting parties as employment status changes, as funds are organized and/or dissolved, etc.).

This enables the user to provide restricted access to relevant parties without having to expend resources to maintain the list, and would provide a level of third-party oversight over the dissemination of confidential information that is related to parties other than the issuer of the security (e.g., information related to a guarantor of the security).

Figure 30:
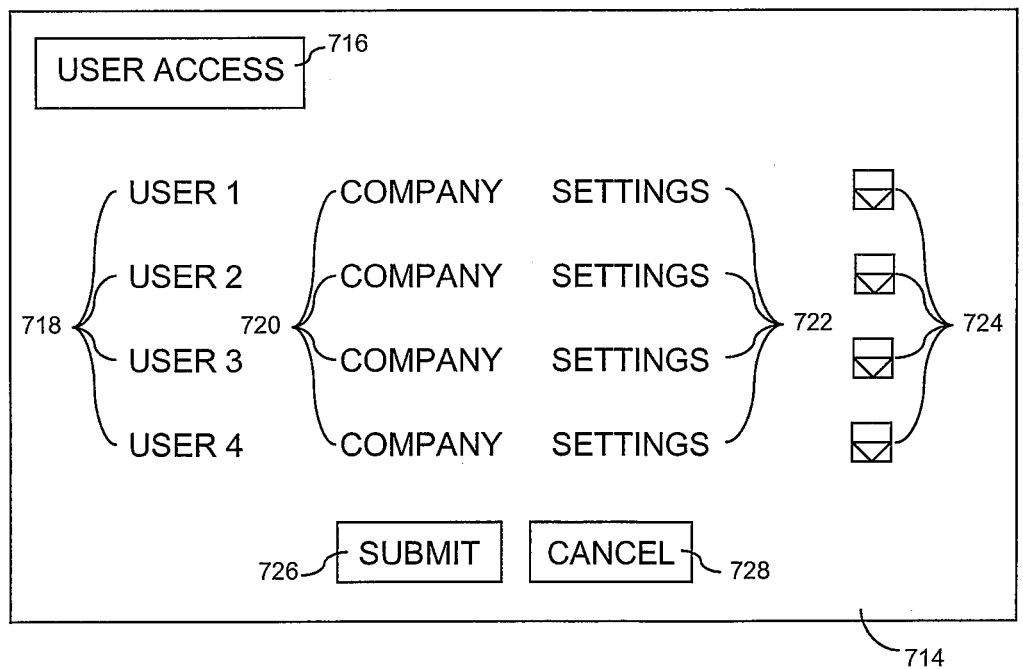
FIG. 30 is an exemplary illustration of a user interface that enables a user to define a list of users for accessing information and/or documents related to a bond issue, according to various implementations of the invention.

As discussed above, the system may also enable the management of user access for the selected bond, in an operation 134. In some implementations, the list of contacts for user access may comprise the same contacts as those in the list of contacts for the mailing list. The contact list may be stored at storage module 18 may be stored locally on the client device 16 of the user, or may be stored elsewhere. The contact list may include a contact list that is used globally for all users on system 10 or 50, a contact list that is specific to the user, a contact list that is specific to a user associated with the issuer or obligor, and/or other contact lists. It should be appreciated that issue module 28 or 68 may enable the user to define a list of approved users that are approved for access: (1) to information related to all of the bonds issued by the issuer; and/or (2) only for a certain subset of the bonds issued by the issuer. FIG. 30 illustrates an example of a user interface 714 for a user to add, edit, or delete contacts with access to information or documents related to a bond issue.

Figure 7:
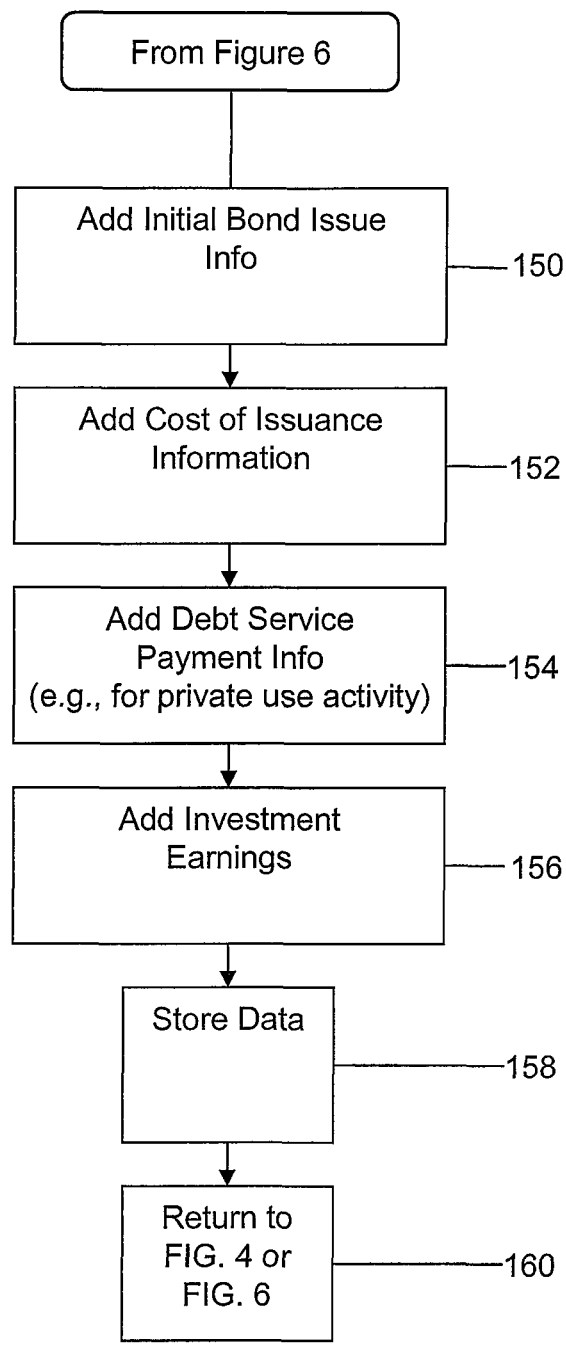
FIG. 7 is an exemplary illustration of a flow chart for entering initial bond and/or other information, according to various implementations of the invention.

As discussed above, the system may, in an operation 138, prompt the user to enter or setup post issuance compliance bond issue information for a selected bond issue to assist in tracking post-issuance compliance requirements and ensure that information and/or documents related to each bond issue are separated and retained in an organized fashion. For example, the system may provide a template for entering and setting up the bond issue information. As an example, and as shown in FIG. 7, the system may, in an operation 150, receive or request initial bond issue information for post issuance compliance, may receive or request cost of issuance information, in an operation 152, receive or request debt service payment information, in an operation 154 (e.g., for private use activity or testing), receive or request investment earnings information, in operation 156, and/or receive or request other bond issue information, as desired or necessary. In an operation 160, the bond issue information may then be stored. In an operation 160, the system may then return back to the options associated with the selected bond, such as shown in FIG. 4 or 6, for example.

Adding initial bond issue information (as in operation 150) may include adding a plurality of facts related to the bond issue. For example, the date of a bond issue, a bond issue price, amounts held in reserve funds, final maturity date, arbitrage yield percentage, form filing dates, and other information related to a bond may be input into the system. The initial bond issue information may also include the name of the issuer, the tax identification number of the issuer, the proceeds received from the sale of the bond issue, the purpose for the bond, refunding information, reserve fund information, and other bond issue information. Furthermore, documents (e.g., Form 8038 or Form 990 Schedule K) associated with the bond issue may also be uploaded and stored (e.g., using upload module 77).

Adding the cost of issuance information of a bond issue, in operation 152, may include adding information such as the expenditure date, total fee(s) or cost(s), the amount funded with bond proceeds, the entity or person(s) receiving the proceeds, and the role of the entity or person. Additionally, the system may allow for uploading of documents that may be related to the cost of issuance information for the bond. In some embodiments, some of the fields in forms provided by the system of the invention may be pre-populated according to previously-entered bond issue information or other information. For example, an expenditure date may be pre-populated by the system of the invention (e.g., by entering the date of issue when entering the initial bond issue information).

Adding debt service payment information, in operation 154, may include adding the date a debt service payment is made and the amount of the debt service payment. The debt service payment information may be used for recording and tracking private-use activity of the proceeds of a bond issue, for example. Documents may also be uploaded and stored by the system for a debt service payment.

Adding investment earnings information, in operation 156, may include adding an amount of investment earnings earned during construction period. The year and amount of the investment earnings earned each year during the construction period may be entered, for example.

As discussed above, after entry of the post issuance compliance bond information, the information may be stored in operation 158 and the user may return, in operation 160 to interfaces enabling viewing, addition, and/or editing of information and/or uploading documents associated with the bond issue.

Referring back to FIG. 6, the system may, in an operation 140, enable data entry related to a selected bond issue. For example, the system may receive information regarding each bond and the use and investment of bond proceeds, such as entering an allocation of new money funds. In some implementations, the facility or project receiving the finds may be added, as well as the private use percentage, private use receipts, contract(s) or agreements(s), and expenditures or assets. Documents (e.g., such as contracts or receipts) may also be uploaded and stored by the system.

In some implementations, system 10 or 50 may provide one or more template(s) or forms for entering bond issue information required for post-issuance compliance and/or record retention for the bond. System 10 or 50 may also receive information by uploading entered information. For example, bond issue information may be entered into a template in a bond issue storage module (e.g., Qualified Expenditures) and/or a document related to the bond issue information (e.g., expenditure) may be uploaded and stored in a bond issue storage module 18, 20, 58, 60, or other storage area.

Figure 17:
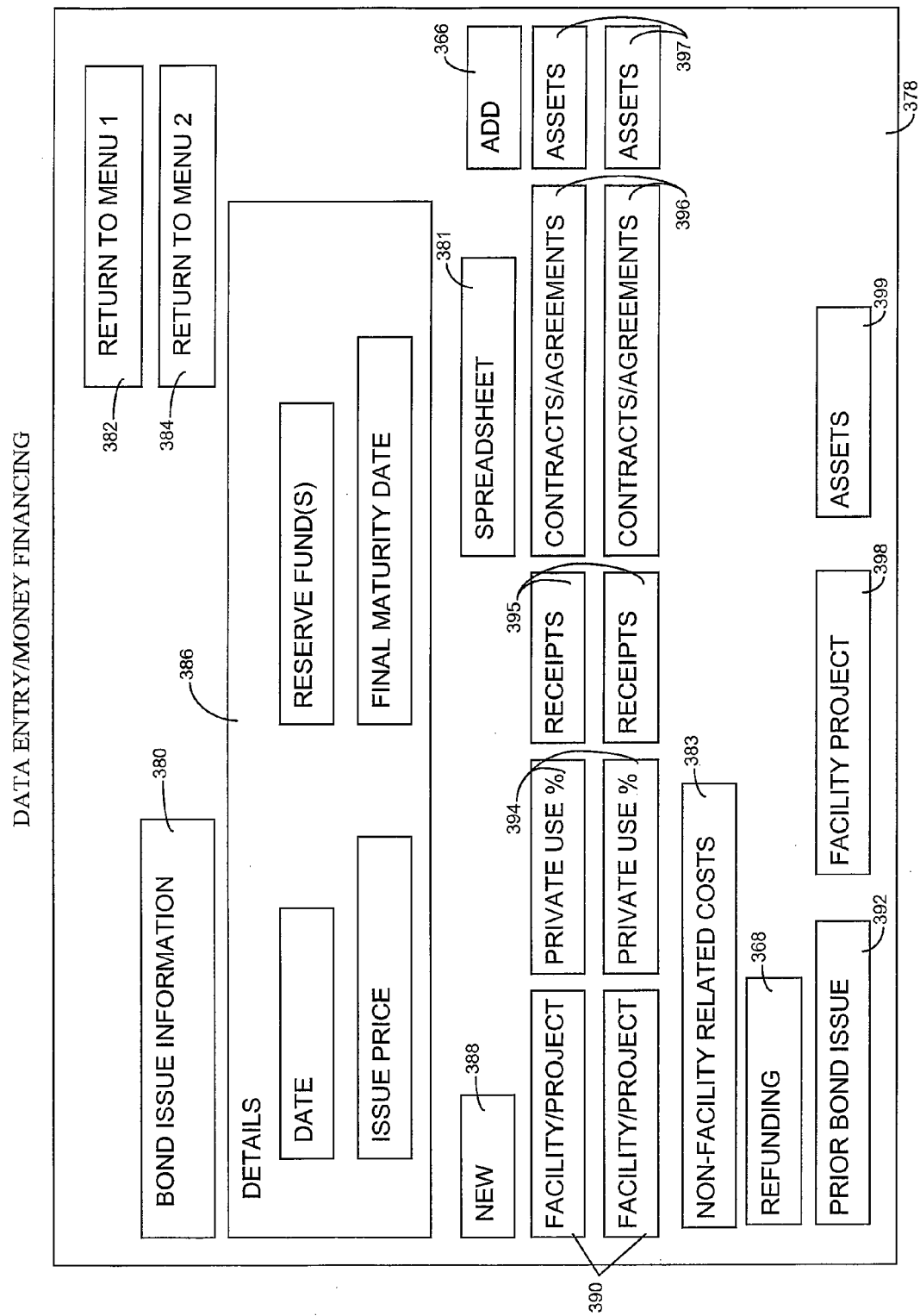
FIG. 17 is an exemplary illustration of a user interface that enables a user to view, add, and/or edit data entry options related to new money or refunding for facilities or projects associated with a bond issue, according to various implementations of the invention.

In one example, when adding a new facility or project, system 10 or 50 may provide a template for entering the facility name, placed in service dates, expected placed in service dates, percentages of private use, types of percentage, and other facility-related information. The system may also enable refunding data entry. The system may further enable the selection of a prior bond issue and the selection of a facility or project refinanced. Expenditures or assets may be added and documents may be uploaded related to the refunding data entry, for example. The refunding information may then be stored by the system. FIG. 17 illustrates an example of a user interface for entering data associated with the allocation of funds to a facility(ies) or project(s) for a bond issue.

Figure 8:
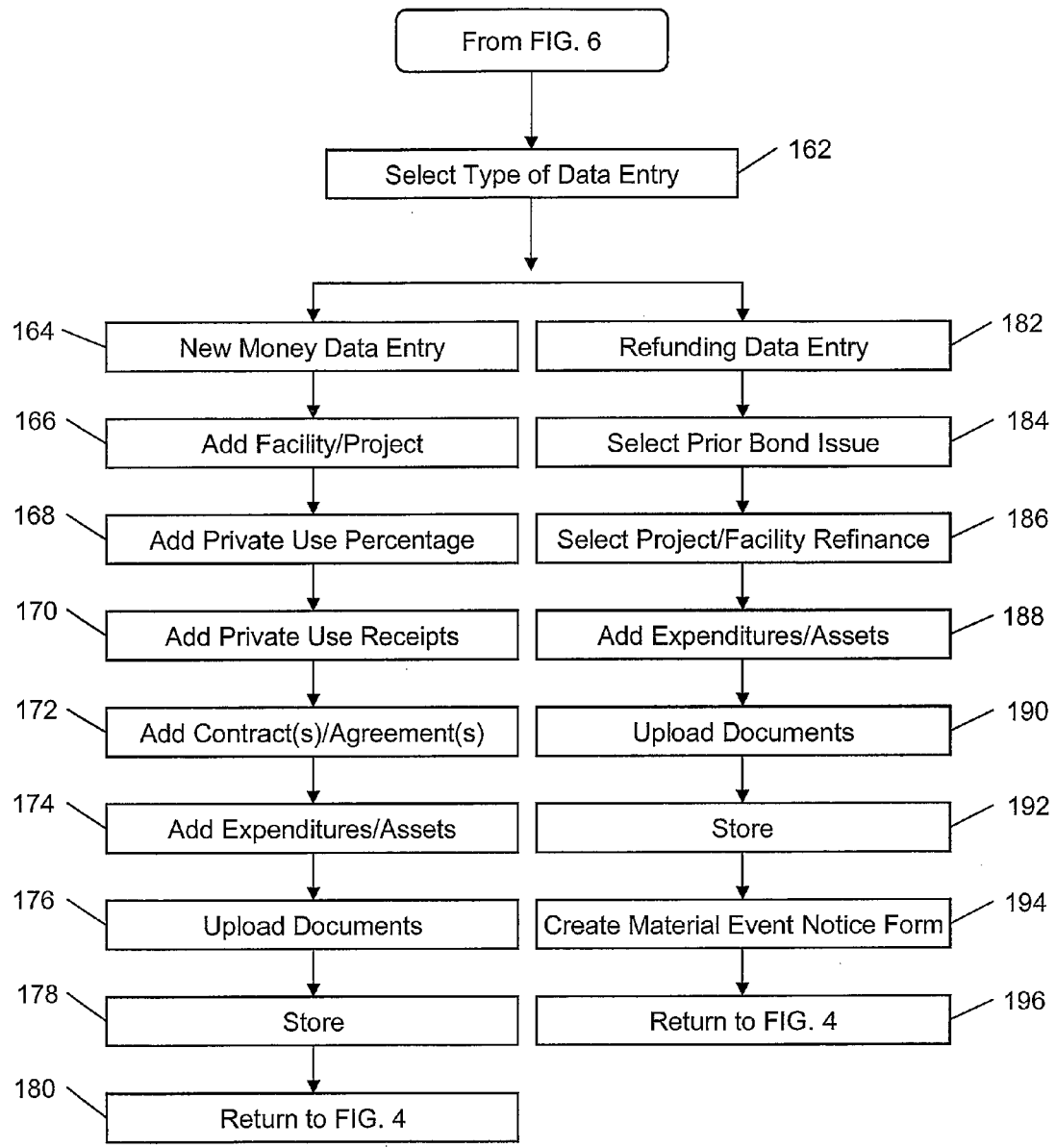
FIG. 8 is an exemplary illustration of a flow chart of data entry options related to new money or refunding of a selected bond issue, according to various implementations of the invention.

FIG. 8 illustrates a method of entering allocation data for entry of new money data and/or refunding data. After choosing to enter data, in operation 140 of FIG. 6, the user may be presented with the ability to select the type of data entry in an operation 162. In some embodiments, the system may enable new money data entry in an operation 164. The facility or project receiving the funds may then be added in an operation 166, as well as the private use percentage in an operation 168, private use receipts in an operation 170), contract(s) or agreements(s) in an operation 172), and expenditures or assets in an operation 174. Documents (e.g., such as contracts or receipts) may also be uploaded in an operation 176 and stored by the system in an operation 178. After completion of new money data, the user may return in an operation 180 to the options for the selected bond issue as shown in FIG. 4, for example.

The system may also enable refunding data entry in an operation 182. The system enable for the selection of a prior bond issue financing entry in an operation 184 and the selection of a facility or project refinanced in an operation 186. Expenditures or assets may be added in an operation 188 and documents may be uploaded relating to the refunding data entry in an operation 190. The refunding information may then be stored by system 10 or 50, in an operation 192.

In some instances, it may be determined that the information that is entered and/or added to the refunding data may affect events related to the bond issue. For example, the entered information may affect tax calculations for the bond issue. Thus, the system may indicate a need to post a material event as a secondary market disclosure (e.g., if such calculations show that the tax-exempt status of a bond is in jeopardy). Therefore, if required, a material event notice form may be created automatically by the system and/or manually by the user in an operation 194. After completion of entering and saving the refunding data (and a material event notice, if needed), the user may return, in operation 196, to the options for the selected bond issue as shown in FIG. 4, for example.

Figure 9:
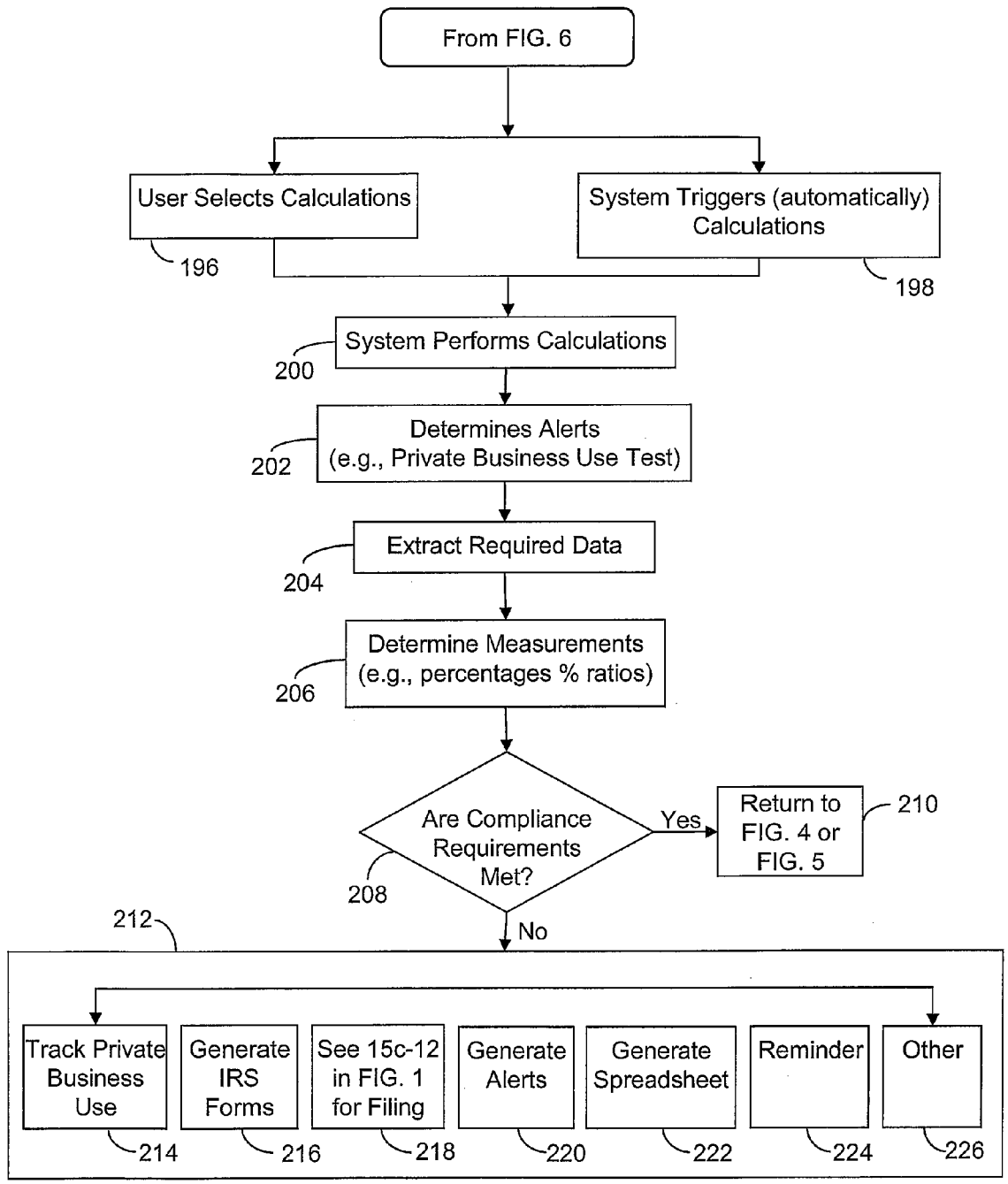
FIG. 9 is an exemplary illustration of a flow chart for options relating to performing compliance calculations and options relating to taking actions for compliance based on the calculations, according to various implementations of the invention.

Returning to FIG. 6, system 10 or 50 may also be used to access stored information and perform compliance calculations (in operation 142) for a selected bond. For example, the system may apply applicable Code and regulatory tests as determined by the IRS. As illustrated in FIG. 9, the system may perform calculations upon a manual prompt in an operation 196 (e.g., when prompted or selected by a user) or by an automatic trigger in an operation 198. For example, calculations may be automatically triggered after entry of a information into a template. In some implementations, one or more date determining rules (e.g., supported by rule data module 21 and rules module 42 or 78) may be used to determine when calculations are to be performed. In some implementations, the date determining rules maybe used to send a reminder or alert to one or more users to initiate one or more calculations upon a manual prompt in operation 196. In some implementations, one or more date determining rules may be used to send a reminder or alert to a user to enter necessary data (e.g., post issuance information) necessary to perform calculations (either by a later manual prompt or an automatic trigger). In some implementations, one or more date determining rules may be used to automatically trigger performance of calculations (e.g., using data present in the system).

In some instances, the system may retrieve inputted and/or saved information for a bond to perform compliance calculations. In some instances, this information may include bond issuance information, including information needed to determine compliance with IRS regulations relating to a municipal bond issue. In some instances, this information may also include post issuance information such as, for example, information regarding the use of proceeds of a municipal bond issue. Once prompted, system 10 or 50 may perform calculations related to the reporting requirements and/or compliance calculations in an operation 200. The calculations may be performed, for example, as described above with reference to compliance calculation module 34. In an operation 202, a determination regarding one or more alerts associated with the calculation being performed may be made. In some implementations, operation 202 may include sending one or more alerts or to one or more users regarding the results of the calculations or otherwise generating an indication of the results of the calculations and communication that indication to one or more users (e.g., via a display on a client device screen, via an alert sent to a device, etc.).

In an operation 204, system 10 or 50 may also retrieve the required data such as, for example, bond issuance information or post issuance information that has been previously entered and stored in the system. In some embodiments, system 10 or 50 may prompt a user to enter any information needed and subsequently receive and store such information. In an operation 206, system 10 or 50 may determine the measurements (e.g., percentages, ratios) for compliance with one or more regulations (e.g., the IRS regulations listed herein or other regulations). In some implementations, system 10 or 50 may provide one or more template, for example, for entering the required calculation information for calculating compliance requirements. In some implementations, the template(s) may include the initial bond issue information, cost issuance information, expenditures/assets, and other bond issue information. The bond issue information may be retrieved from the record retention and post issuance compliance system 10 or by using one or more modules associated with the integrated municipal bond compliance system 50.

In an operation 208, the compliance calculations may be analyzed in order to determine if compliance requirements for a bond issue are met. For example, the system may determine the highest percentage of private business use of finance assets for each bond year and track compliance with IRS rules on private use of tax-exempt financed facilities. Compliance calculations may also include determining the highest percentage of private business use of bond financed assets for each bond year, determining the amount of unexpended bond proceeds, determining the percentage of bond proceeds used to finance costs of issuance, determining the average life of the financed facilities, and other compliance computations relating to the bond issue.

By way of example, the average private business use percentage, including the amount of proceeds spent on working capital and issuance costs, may be calculated. For example, the amount of private use percentage of the total amount of bond proceeds expended as of each year of bond issue may be calculated. The total private use over the life of the bonds may also be calculated. The calculations may also include, for example, the calculations described above with reference to compliance calculation module 34, such as a comparison of the present value of the private payments with the present value of the debt service payments on the bond. The amount of private use percentage may also be determined. Additional calculations may also be determined.

If the compliance requirements are met, the user may, in an operation 210, return to the options as presented in FIG. 4 or 6, for example. In some implementations, if the requirements are met, the user may be prompted to take specific action (e.g., to initiate a record of the result of the calculation or submit the results to a regulatory entity). In some implementations, system 10 or 50 may automatically make a record (and store such record) of the results of the calculations and/or automatically submit the results of the calculations to a regulatory authority.

If requirements for a bond issue are not met, the system may provide the user with a compliance facilitation steps in an operation 212. The compliance facilitation steps may include one or more prompts to the user regarding methods or options provided by system 10 or 50 that may provide a user with reporting alternatives to correct non-compliance issues. For example, the compliance facilitation steps may include the ability to track private business use in an operation 214, generate form(s) in an operation 216, generate and prepare bond issue information for filing in an operation 218, generate alert(s) in an operation 220, generate a spreadsheet(s) in an operation 222, generate reminder(s) in an operation 224, or provide other reporting alternatives in an operation 226 for non-compliance issues. In some embodiments, system 10 or 50 may prepare forms for filing that are required for compliance with respect to the use of the bond issue proceeds. For example, system 10 or 50 may prepare Schedule K forms for filing with the IRS. System 10 or 50 may also prepare a defeasance notice(s) relating to changes in use of the bond proceeds, or other documents relevant or necessary to the compliance calculations and record retention.

System 10 or 50 may present compliance calculations or the distribution of the bond issue proceeds to the user after entry or retrieval of the required calculation information. For example, system 10 or 50 may output results (e.g., compliance calculations) to one or more devices. In some implementations, system 10 or 50 may output results to a display screen, a handheld device, or other device such as a client device (e.g., devices 16 or 56) that accesses the system. System 10 or 50 may provide the results to one ore more users via one or more devices. In some implementations, system 10 or 50 may present the compliance calculations, distribution of bond issue proceeds, and/or other related bond issue information in an electronic format. For example, system 10 or 50 may present the information or calculations in the form of spreadsheets or electronic documents. In some implementations, system 10 or 50 may present the information or calculations in other formats such as, for example via a printout or other non-electronic method.

Referring back to FIG. 6, system 10 or 50 may enable a user to create, access, and/or file documents or forms related to the selected bond issue in an operation 144. For example, a user may access forms such as Form 990 or Forms 8038 for filing with the IRS to maintain the appropriate post issuance compliance. The documents and/or forms may be accessed from disclosure documents modules 32, for example. In some implementation, the user may select a document and/or form and manually enter information into the selected form. In some instances, the user may select a form and system 10 or 50 may automatically populate the form with information entered and stored within the system.

In some implementations, the user may also access documents and/or forms that have been filed or submit forms for filing for the selected bond issue in an operation 146. For example, the user may file forms for IRS post issuance compliance using either record retention and post issuance compliance system 10 or using integrated municipal bond compliance system 50. In some instances, the user may use secondary market disclosures module 90 to make filings pursuant to Rule 15c2-12 compliance. Documents or forms which have been filed with the IRS may be stored in a filings module 40 or 76, for example.

In one implementation, the user may also access and/or manage other information and documents associated with the selected bond issue, in an operation.

As previously noted, a user interface module (e.g., user interface module 44 or 79) may also be used with the record retention and post issuance compliance system 10 of FIG. 1 and/or the municipal bond compliance system of FIG. 2. FIGS. 10A-31, described herein, illustrate examples of user interfaces that may be accessed or presented to the user via a client device.

FIG. 10A illustrates an example of a user interface 151 in the form of a role-based menu or customized dashboard that may be presented to a user. As noted with reference to FIG. 3, after a user is identified and authorized to access the system, the user may be presented with a number of viewing and/or editing options related to the identified bond issues. In some instances, the issue module 28, 68 may cause a user interface module to provide a user interface similar to user interface 151 to the user via one of client devices 16, 56. The user interface or role-based menu 151 may include role-based custom display information that is determined when a user is identified. For example, the information displayed to a user (e.g., an issuer or obligor) on the role-based menu 151 may be determined by a user's identification and authorization (e.g., such as determined by the identification and authorization modules 30 or 70).

The role-based menu 151 may include a personalized or customized home page or a dash board that is designed to display a summary of information and options related to the bond issues associated with a user. For example, the user may be provided with options including new bond issue portion 209, IRS record retention and post issuance compliance portion 211, secondary market disclosures portion 213, restricted access portion 215, alerts portion 217, reminders portion 219, documents filed portion 221, or other portions 223 via the role-based menu 151.

New bond issue portion 209 may enable a user to enter and save a new bond in the system. For example, a user may add a new bond issuance to the record retention system 10 or integrated municipal bond compliance system 50.

IRS record retention and post issuance compliance portion 211 may enable a user to access bonds that have already been issued and currently exist in system 10 or 50 such that a user may view, enter, and/or edit information and upload documents for IRS post issuance compliance. For example, a user may enter information and upload documents so as to save information for performing compliance calculations and for filing forms (such as Schedule K) for reporting to the IRS.

Secondary market disclosures portion 213 may enable a user to access bonds that have already been issued and currently exist in system 10 or 50 such that a user may view, enter, and/or edit information and upload documents. For example, a user may enter information and upload documents so as to save information for bond issues in accordance with Rule 15c2-12.

Restricted access portion 215 may allow a user to access information and/or documents that are limited by class of entities (or not made public) associated with bond issues. For example, a user may access documents relevant to Rule 2a-7.

In some instances, alerts portion 217, reminders portion 219, documents filed portion 221, and/or other information or portions 223 may be provided on role-based menu 151. For example, sections 217-221 may provide information and or shortcuts for accessing information and/or documents related to bond issues. Alerts portion 217 may comprise displaying information relating to alerts for bond issues. For example, when bond issue(s) are determined (e.g., via calculations) not to be in compliance, an alert may be displayed in alerts portion 217. Examples of alerts that may be displayed include those described above with reference to alerts module 35 or 72. In some instances, the alerts portion 217 of role-based menu 151 may provide information or alerts related to all bond issues associated with the user accessing the system 10 or 50.

Reminders portion 219 may comprise displaying information relating to a summary of pending deadlines or dates relating to a bond issue that are approaching or have approached. Examples of reminders that may be displayed include those described above with reference to reminders module 36 or 73. The displayed reminders in reminders portion 219 may include annual reminders (e.g., for private use or arbitrage rebate), upcoming allocation dates, upcoming dates for arbitrage rebate compliance, or any other reminders that may be associated with bond issues.

The documents filed portion 221 may provide a shortcut to documents and/or forms that may need to be filed or that have been filed for one or more bond issue(s). For example, the documents may include documents and/forms that are upcoming and/or required for each bond issue to comply with IRS regulations, such as the Schedule K form, Form 990, Form 990T, Form 8038, Form 8038-G, Form 8038-T, Form 8038-R, or other forms required for compliance.

In some implementations, a user may not have access to each portion provided on interface or role-based menu 151. In some instances, the user may access and enter information in one portion without accessing another. For example, a user may use role-based menu 151 to access IRS record retention and post issuance compliance information via portion 211 without accessing secondary market disclosures module 213.

FIG. 11 illustrates an example of a portion of a user interface 250 that enables a user to access information, such as entered information or uploaded documents related to a bond issue, managed by issue module 28 or 68, for example. Once a user selects and receives access to IRS record retention and post issuance compliance module 211 of FIG. 10A, the user may be directed to user interface 250. User interface 250 may include an obligor documents field 256, bond issue cabinets field 258, custom identification field 260, remarketing field 262, and/or other information fields.

Obligor documents field 256 may provide the user with access to information and/or documents related to bond issues for obligors such as the information as described with reference to disclosure documents module 32 in FIG. 1. For example, secondary market disclosure documents (such as material event notices that must be disclosed by a user under Rule 15c2-12) assigned to an obligor may be accessed or viewed when obligor documents field 256 is accessed. Bond issues field 258 may enable the user to select one or more files (e.g., bond issues) associated with a user that are stored locally on one of client devices 16, 56 or that are stored in one or more of the systems 10, 50. By selecting the bond issues field 258, the user may access the bond issues related to the user (and the corresponding bond issue modules).

In some implementations, menu fields 252 and 254 may also be provided on user interface 250. Menu fields 252 and 254 may enable a user to access additional user interfaces or provide shortcuts back to previously-accessed interfaces. For example, menu field 252 may enable a user to access interfaces or modules such as those described in FIG. 2. In some instances, menu fields 252 and 254 may be provided in the form of buttons or other interface portions. In some instances, menu field 252 may enable a user to access a user interface such as role-based menu 151 of FIG. 10A. In some instances, menu field 254 may enable a user to default to a user interface such as user interface 250 of FIG. 11. For example, if a user attempts to access bond issues cabinet field 258 and access is denied, the user may be presented with an error message on user interface 250. The user may then access the "default" menu including fields 252-262 for user interface 250 through menu 254. Although not specifically shown, menu fields 252 and 254 may be provided on any of the interfaces or templates as described herein with reference to FIGS. 11-31.

FIG. 12 illustrates an example of a user interface 264 that enables a user to access bond issue information managed by issue module 28, 68 (e.g., in bond issue modules). User interface 264 may include a list of files or bond issues 268 issued by the issuer (e.g., the issuer identified by user interface 250). In some instances, a user may access interface 264 by selecting the bond issues field 258 of interface 250 in FIG. 11. In some instances, the list of bond issues 268 may include only the bond issues for which the user is included on the list of approved users defined by the issuer. That is, the list of bond issues 268 may be provided as a role-based custom display, such as described in FIGS. 3, 4, and 5. In some instances, the list of bond issues 268 may include all of the bonds issued by the issuer. By selecting a specific one of the bond issues from the list of bond issues 268 within user interface 264, the user may be provided with access to information about the specific bonds (e.g., as discussed herein). User interface 264 may also include information related to each bond issue in the list of bond issues 268 such as final transcripts 270, credit facilities 272, and IRS records 274, for example. By selecting an appropriate one of the transcript buttons 270, the user may access stored information and/or documents (e.g., final transcripts) associated with the selected bond issue (such as described above with reference to final transcripts 116 in FIG. 4). For example, the user may be able to view and/or upload final transcripts for a bond issue. In some implementations, the user may download the final transcripts for a bond issue. In some instances, a user may be able to manage user access and/or a mailing list for viewing or receiving information related to the final transcripts of a bond issue.

By selecting an appropriate one of the credit buttons 272, the user may access credit information and/or documents for credit facilities associated with the bond issue (such as described above with reference to credit facilities 118 in FIG. 4). For example, the user may be able to view, upload, and/or edit or update credit facilities for a bond issue. In an implementation, the user may download credit facilities information and/or documents for a bond issue. In some instances, a user may be able to manage user access and/or a mailing list for viewing or receiving information related to the credit facilities of a bond issue.

By selecting an appropriate one of the records buttons 274, the user may access documents (e.g., tax reporting documents) associated with the selected bond issue. For example, the IRS records button 274 may provide access to information and/or documents relevant to IRS records for a particular bond issue that need to be maintained to ensure compliance with IRS regulations. The information and/or documents and information accessed (or edited) using these buttons is further discussed herein. A user may access IRS records associated with a particular bond issue so as to view, create, and/or edit information and/or upload documents for the bond issue. When a user accesses IRS records for a bond, it may be determined if the identified user is authorized (as illustrated and described in FIG. 4 above). If the user is not authorized, the user may be directed to the user interface 264 of FIG. 11 or be denied access and held at interface 264, for example. If the user is authorized to access IRS records, the user may be directed to a customized bond issue dashboard. For example, the user may be directed to a user interface in the form of an IRS dashboard for the specific bond issue. FIG. 10B, further described herein, provides an example of a user interface 230 that may be provided to a user with authorized access.

User interface 264 may also include a return button 276 that may enable a user to return to the user interface 250 of FIG. 11. In some implementations, menu fields (not shown) may also be provided on user interface 264. The menu fields may enable a user to access additional user interfaces, such as those described in FIG. 10A or 11.

FIG. 10B illustrates an example of a customized dash board 230 for displaying information related to a selected bond issue, according to various implementations of the invention. The dash board 230 is an example of a user interface that may be presented to a user upon receiving authorization to access IRS records for a selected bond. The dash board 230 may display a summary of information related to the particular bond issue selected by the user. For example, to view and/or edit existing IRS records, or to create new IRS records for a particular bond issue, a user may select a records button 274 on user interface 264 of FIG. 12 that is associated a particular bond issue. The user may then be presented with a user interface such as dash board 230 of FIG. 10B.

Dash board 230 may comprise a plurality of sections that display information regarding bond issues. In some embodiments, dash board 230 may include an alerts section 232, a reminders section 234, a documents filed section 236, a spreadsheets section 238, a saved documents button 240, a document retention section 242, and/or any other buttons or sections 244 related to the bond issue.

Alerts section 232 may display information relating to alerts for a selected bond issue which are determined (e.g., via calculations) not to be in compliance with the rules for such a particular bond issue. Alerts may include notifying a user when expenditures are over applicable private use percentages, when expenditures are over the designated percentage limitation on issuance costs, when expenditures are over the monetary limit on bad costs, and/or when other alerts related to expenditures and/or assets associated with the selected bond issue are appropriate, for example. In some instances, dash board 230 may include a create button 231 and an edit button 233 which enable a user to create, edit, and/or customize preferences for the alerts. For example, in some instances, the user may access and create and/or edit alerts and save such preferences. In some instances, a button (not shown) may be provided that enables a user to edit a mailing list for those who should be notified via e-mail, for example, of alerts. In some instances, the system may generate system alerts that are not accessible by a user, and that may not be edited or changed. For example, system alerts may only be accessed by an authorized user such as a system administrator. The alerts may be supported by alerts module 35 or 72 and accessed through system administration module 24 or 64.

Reminders section 234 may display information relating to a summary of pending deadlines or dates relating to a bond issue that are approaching or have approached. For example, reminder may be generated to alert a user of upcoming dates (such as allocation, reporting, or compliance dates) related to a selected bond issue. The information in reminders section 234 may include annual reminders (e.g., for private use or arbitrage rebate), upcoming allocation dates, upcoming dates for arbitrage rebate compliance, or any other reminders that may be associated with the bond issue. In some instances, the dash board 230 may include a set dates button 235 which enables a user to create, edit, and/or customize date preferences for the reminders. For example, in some instances, the user may access, create and/or edit the schedule for which reminders should be sent, and save such preferences. In some instances, a button (not shown) may be provided that allows a user to edit a mailing list for those who should be notified via e-mail, for example, of reminders. In some instances, the system may generate system reminders that are not accessible by a user and may not be edited or changed. For example, system reminders may only be accessed by an authorized user such as a system administrator. The reminders may be supported by reminders module 36 or 73 and accessed through system administration module 24 or 64, for example.

Documents filed section 236 may provide a shortcut to documents and/or forms that may need to be filed for a bond issue. The documents may include documents and/forms that are required for a bond issue to comply with IRS regulations, such as the Schedule K form, Form 990, Form 990T, Form 8038, Form 8038-G, Form 8038-T, Form 8038-R, or other forms required for compliance. In some instances, dash board 230 may include a file button 237 which enables a user to access, edit, and file a document and/or form for IRS post issuance compliance. For example, in some instances, when a form is selected in section 236, the documents and/or forms may be accessed from disclosure documents modules 32 and provided to a user. In some instances, the user may select a document and/or form and manually enter information into the selected form. In some instances, the user may select a form and the system may automatically populate at least part of the form with information entered and stored within the system.

Spreadsheets section 238 may comprise shortcuts to spreadsheets providing information such as calculations for determining compliance of bond issue proceeds with IRS regulations. For example, spreadsheets section 238 may provide information regarding private use percentages such as for Schedule K reporting, defeasance notice due dates, and arbitrage rebate calculation dates.

Document retention section 242 may also include shortcuts for access to reporting information and/or documents related to the particular bond issue. For example, saved documents button 240 may provide to the user a shortcut of all of the documents that have been uploaded and saved for the selected bond issue. Documents retention section 242 may provide the user with shortcuts to particular groups of documents that have been uploaded for a selected bond issue. For example, documents retention section 242 may provide a user with a shortcut to viewing documents associated with expenditures, private payment receipts, and/or contracts and agreements, for example.

Other sections and/or buttons 244 may also be provided for a bond issue. For example, buttons 244 may provide a user with a shortcut to a specific form or template for entering information and/or uploading documents to be associated with the bond issue. In some instances, buttons 244 may direct a user to user interfaces as shown and described with reference to FIGS. 13-31.

In some implementations, the dash board 230 may comprise sections that provide a summary of information related to the bond issue selected by the user. The summary of information provided by dash board 230, however, should not be limited to the aforementioned examples.

When a user accesses dash board 230, the user may be prompted to set up post issuance compliance bond issue information for a bond issue. As noted with reference to FIG. 7, the system may prompt the user to enter or set up post issuance compliance bond issue information for a selected bond issue to assist in tracking post-issuance compliance requirements and ensure that information and/or documents related to each bond issue are separated and retained in an organized fashion. Initial bond issue information may include a plurality of facts related to the bond issue. For example, the date of a bond issue, a bond issue price, reserve funds, final maturity date, arbitrage yield percentage, form filing dates, and other information related to a bond may be inputted into the system. The initial bond issue information may also include the name of the issuer, the tax identification number of the issuer, the proceeds received from the sale of the bond issue, the purpose for the bond, refunding information, reserve fund information, and other bond issue information. Furthermore, documents (e.g., Form 8038 or Form 990 Schedule K) associated with the bond issue may also be uploaded and stored.

A user may access post-issuance compliance bond issue setup information by selecting the appropriate button 244 or other portions of an interface of system 10 or 50. For example, a template may be provided to a user to assist in entering information related to a bond issue. FIG. 13 illustrates an example of a portion of a user interface 278 for enabling a user to set up or add post-issuance compliance information for a bond issue associated with an issue.

In some implementations, user interface 278 may present a user with a list of information that may be associated with a bond issue. User interface 278 may provide a plurality of fields that may enable the user to manually enter information or upload documents related to a bond issue. User interface 278 may include a date field 280, a issue price field 282, an original principal amount field 283, an issuer's name field 284, an issuer's tax identification number (TIN) 286, a proceeds from sale field 288, a purpose field 290, a refunding bonds field 292, a reserve fund field 296, a maturity date field 298, a temporary period field 300, a file date field 302, a form field 304, a documents filed field 306, a file date field 308, a miscellaneous document field 312, and/or other information fields.

Date field 280 may enable a user to input the date a bond issued. In some instances, user interface 278 may include one or more calendar buttons 318. If the user selects calendar button 318, a calendar may be provided to the user so that the user may select the relevant date from the calendar. Issue price field 282 may enable the user to input the amount of the bond. Fund field 296 may enable the user to input the amount of the reserve funds associated with the bond. Maturity date field 298 may enable the user to input the maturity date of the bond issue. In some instances, user interface 278 may include a calendar button 318 for selecting a date as described above. File date field 302 may enable the user to input a date relevant to one or more selected fields (e.g., date of filing). In some instances, the file date field 302 may be associated with at least one of the form fields 304-308.

In some instances, one or more drop down menus 320 may be provided. The drop down menus 320 may provide one or more option(s) to a user to select (e.g., YES/NO) for a designated field. For example, documents filed field 306 may include a drop down menu 320. As an example, documents filed field 306 may include inputting documents filed with the IRS. Thus, the drop down menu 320 associated with documents filed field 306 may include a list of forms from which to chose such as, for example, comprising Form 8038, Form 8038-T, Form 8038-R, Form 990, Form 990-T, Notice of Defeasance, or other forms that may be filed. Other drop down menus 320 may be used in conjunction with other fields of user interface 278.

In some instances, issue module 28, 68 may enable a user to enter information and/or upload documents. For instance, a user interface may be provided to the user that enables the user to select information to be entered. User interface 278 may enable the user enter information. Miscellaneous document field 312 may enable a user to upload other documents with information related to the bond issue. In some instances, the user interface 278 may include one or more upload document buttons 324. User interface 278 provides upload document buttons 324 for uploading existing documents. In some instances, a user may select one of the upload document buttons 324 that will enable the user to "browse" the file directory of client device 16, 56 to locate one or more documents to be selected for upload. In some instances, the initiation of the upload, and the ensuing upload, may be executed by an upload module. In some instances, when a user selects upload document buttons 324, a user interface module may provide a separate user interface to the user.

User interface 278 may include a submit button 314. The user may select the submit button 314 to initiate entry of information related to the bond issue, uploaded documents, and/or the other information entered via the user interface 278. User interface 278 may also include a cancel button 316. The user may select the cancel button 316 to cancel the entry of a bond issue, for example.

In some instances, cost of issuance information may be required for post issuance compliance of a bond issue. The cost of issuance information of a bond issue may include entering information such as the expenditure date, total fee(s) or cost(s), the amount funded with the bond proceeds, the entity or person(s) receiving the proceeds, and the role of the entity or person. Additionally, the system may enable uploading of documents that may be related to the cost of issuance information for the bond. Also, as an example, some of the fields may be pre-populated according to the previously entered bond issue information. For example, the expenditure date may be pre-populated by the system (e.g., by entering the date of issue when entering the initial bond issue information).

Figure 14:
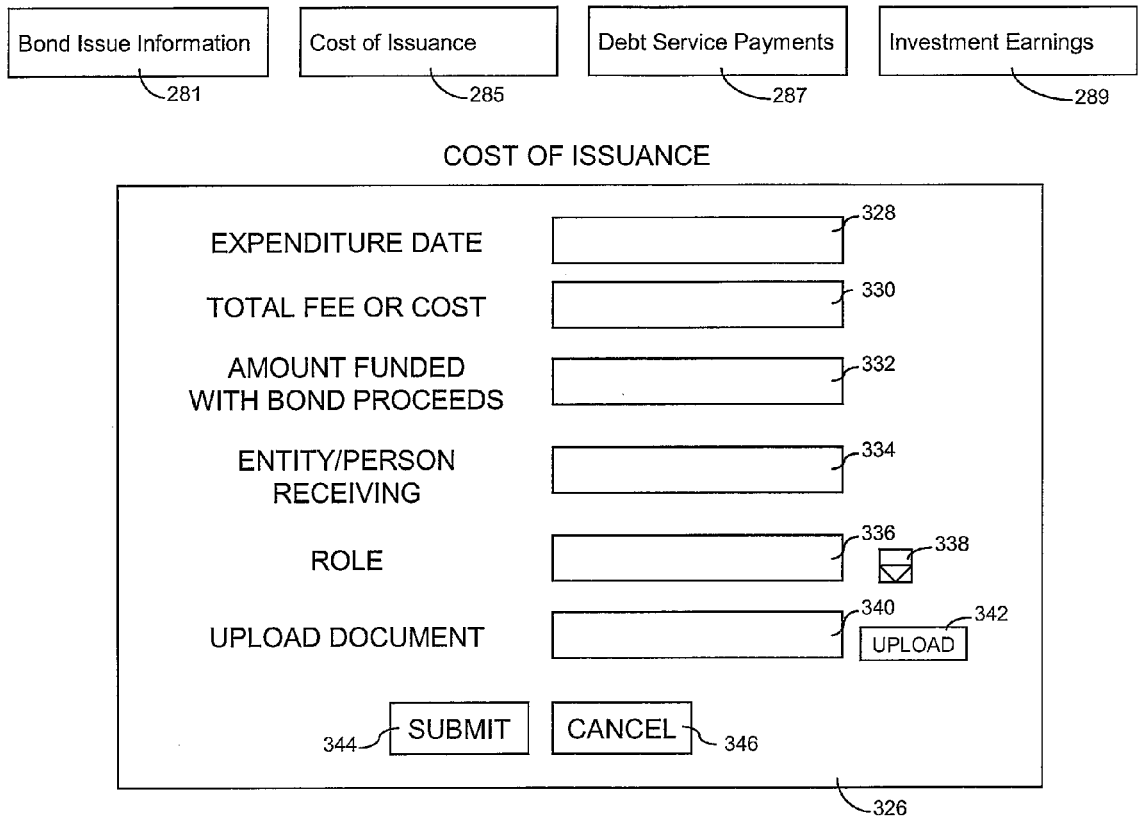
FIG. 14 is an exemplary illustration of a user interface that enables a user to add cost of issuance information and/or documents associated with a bond issue, according to various implementations of the invention.

FIG. 14 illustrates an example of a portion of a user interface 326 that enables a user to add cost of issuance information regarding a bond issue. User interface 326 may be enabled, created, or otherwise supported by user interface module 44 or 79. A user may access cost of issuance user interface 326, for example, by selecting the appropriate button 244 on dash board 230 of FIG. 10B, by accessing an appropriate button 285 of user interface 278, or via other portions of system 10 or 50. As shown in FIGS. 13-16, buttons 281, 285, 287, and 289 may be provided on any one or more of the user interfaces described herein to assist a user in accessing the interfaces or templates for entering information and/or uploading documents for the bond issue. Alternatively, each interface and/or template (described herein with reference to FIGS. 13-31) may also be accessed via dash board 230 as shown in FIG. 10B, for example. It should be recognized that each of the interfaces described herein may be accessed via dash board 230, via shortcut buttons on some or all of the user interfaces, or via any other methods.

Referring back to FIG. 14, user interface 326 presents a user with a list of information that may be entered and associated with a bond issue. User interface 326 may provide a plurality of fields that may enable the user to manually enter information or upload documents related to a bond issue. User interface 326 may include an expenditure date field 328, a total fee(s) or cost(s) field 330, an amount funded with bond proceeds field 332, a recipient field 334, a role field 338, and an upload source document field 340 and/or other information fields. Expenditure date field 328 may enable a user to enter the date of an expenditure associated with the bond issue. In some instances, the expenditure date field 328 may be pre-populated based on the date of issue entered in the date field 280 of user interface 278 in FIG. 13. The amount funded with bond proceeds field 332 may enable a user to enter the amount of bond proceeds that were expended. Recipient field 334 may enable a user to enter the name of a facility, person, or other entity to whom the bond proceeds were given. Likewise, the role field 338 may enable a user to enter a description for the facility, person, or entity identified in the recipient field 334. In some instances, the user interface 326 may include a "drop-down" button 338 that may enable a user to identify the role or title of the named recipient entered in recipient field 334. For example, the drop-down button 338 may provide a user with a menu of choices including, but not limited to, underwriter, financial advisor, bond counsel, trustee/paying agent, or issuer counsel. In some instances, the user interface 326 may include another field that may enable a user to enter a title or role not listed in the menu of drop-down button 338.

Upload source document field 340 may enable a user to upload documents related to an expenditure of bond issue. In some instances, the user interface 326 may include upload document button 342. User interface 326 provides upload document button 342 for uploading existing documents from client device 16, 56 to the issue module 28, 68, for example. In some instances, the user may select upload document buttons 342 to "browse" a file directory to locate one or more documents to be select for upload. In some instances, the initiation of the upload, and the ensuing upload, may be executed by an upload module. In some instances, when a user selects upload document button 342, a user interface module may provide a user separate interface to the user.

User interface 326 may include a submit button 344. The user may select the submit button 344 to initiate entry of information related the bond issue, uploaded documents, and/or the other information entered via the user interface. User interface 326 may also include a cancel button 346. The user may select the cancel button 326 to cancel the entry of issuance costs information, for example.

As shown in FIG. 7, a user may also enter debt service payment information when setting up a bond for post-issuance compliance. The debt service payment information may include entering the date a debt service payment is/was made and the amount of the debt service payment. Documents may also be uploaded and stored by the system for a debt service payment.

Figure 15:
FIG. 15 is an exemplary illustration of a user interface that enables a user to add debt service payments information and/or documents associated with a bond issue, according to various implementations of the invention.

FIG. 15 illustrates an example of a portion of a user interface 348 that may enable a user to set up debt service payments associated with a bond issue. User interface 348 may be enabled, created, or otherwise supported by user interface modules 44 and 79. User interface 348 may provide a plurality of fields that may enable the user to enter information or upload documents related to debt service payments of a bond issue. User interface 348 may include a debt service payments field 350 (and an associated drop down menu 352 to provide one or more options from which a user may choose), amount field 354, an allocation field 355, and an upload source document field 356 and/or other fields. Upload source document field 356 may enable a user to upload documents with information related to an expenditure of bond issue. In some instances, the user interface 348 may include upload document button 358. In some instances, the user may select upload document button 358 to "browse" a file directory to locate one or more documents to be selected for upload. In some instances, the initiation of the upload, and the ensuing upload, may be executed by an upload module. In some instances, when a user selects upload document button 358, the user interface module may provide a separate user interface to the user.

User interface 348 may include a submit button 360. The user may select submit button 360 to initiate entry of information related the bond issue. User interface 348 may also include a cancel button 362. The user may select the cancel button 362 to cancel the entry of debt service payment input for a bond issue, for example.

Figure 16:
FIG. 16 is an exemplary illustration of a user interface that enables a user to add investment earnings information associated with a bond issue, according to various implementations of the invention.

Investment earnings information may also be added during a bond issue post compliance setup (see FIG. 7). Investment earnings information may include entering an amount of investment earnings during construction period. The year and amount of the bond proceeds that are invested for the year may be entered, for example. FIG. 16 illustrates an example of a portion of a user interface 364 that may enable a user to set up investment earnings associated with a bond issue. For example, the bond issue information 366 may be provided on user interface 364. Additionally, the number of years for the bond issue may be chosen. As shown, the user interface 364 may include a drop down menu 368 for choosing a number from a list such that the number chosen (e.g., five (5)) will thus provide a corresponding number (i.e., five (5)) of year fields 370 and amount fields 372. Thus, a user is able to enter a total amount into the amount field 372 for each corresponding year.

User interface 364 may include a submit button 374. The user may select submit button 374 to save entry of the amount information related the bond issue, and/or the other information entered and/or document(s) uploaded by the user interface 364. User interface 364 may also include a cancel button 376. The user may select the cancel button 376 to cancel the entry of an investment earnings amount, for example. User interface 364 may be enabled, created, or otherwise supported by user interface modules 44 and 79.

FIG. 17 illustrates an example of a portion of user interface 378 that may enable a user to view the facilities or projects associated with a bond issue that may receive bond proceeds. User interface 378 may be enabled, created, or otherwise supported by user interface modules 44 and 79. As noted with respect to FIG. 8, after choosing to enter data for a bond issue (shown in FIG. 4), the user may be presented with the ability to select the type of data entry. For example, the system may allow for new money data entry or refunding data entry. In some instances, a portion of the bond proceeds may be used for private use. User interface 378 may include the name of the bond issue 380, bond details 386, list of facilities/project buttons 390, a list of prior bond issues 392, and/or other information. List of facilities/project buttons 390 may be listed as new data entry(ies) 388 and may enable a user to view the facilities, projects, or other entities to which bond proceeds or funds are distributed. List of facilities/project buttons 390 may also have associated therewith private use percentage buttons 394, receipt buttons 395, contracts/agreement buttons 396, and asset buttons 397. Percentage buttons 394 may enable a user to access private use percentages associated with a corresponding facility or project. Receipts buttons 395 may enable a user to access and/or view receipts associated with a corresponding facility or project. For example, the user may access and/or view receipts that may have been previously been uploaded for a specific facility or project. In some instances, the receipts buttons 395 may enable a user to access receipts associated with private payments. Contracts/agreements buttons 396 and assets buttons 397 may enable a user to view contracts and other agreements or assets associated with a facility or project, respectively. For example, the user may access and/or view contracts, agreements, or other assets that may have been previously uploaded for a specific facility or project.

User interface 378 may include a non-facility related button 383. Non-facility related button 383 may enable a user to view a summary of the working capital cost associated with the bond issue 380 that is not related to a particular facility or project.

User interface 378 may include an add facility button 366. Add facility button 366 may enable a user to add a facility or project that is not provided in list of facilities/projects 390. The user may select add facility button 366 and be directed to a user interface 400 as shown in FIG. 18 to add a facility, for example. User interface 378 may also include a list of prior bond issues 393 under refunding data entry 368 and which may include related facilities or projects 398 and assets 399.

User interface 378 may also include menu (or return) buttons 382 and 384. The menu button 282 may provide a shortcut for a user to return to a first menu such as role based menu 151 of FIG. 10A. Menu button 384 may provide a shortcut for a user to return to a second menu such as user interface 250 of FIG. 11, user interface 264 of FIG. 12, or dash board 230 of FIG. 10B, for example. However, as noted above, the menu buttons may be provided on any of the user interfaces and may direct a user to any interface.

FIG. 18 illustrates an example of a portion of user interface 400 that may enable a user to add a facility or project, and information associated with the facility or project, for a bond issue. User interface 400 may be enabled, created, or otherwise supported by user interface modules 44 and 79. User interface 400 may provide a plurality of fields that enable the user to enter information or upload documents related to a facility or project of a bond issue. In some implementations, when a user selects the add button 366 of interface 378 to add a facility or project, the user may be presented with user interface 400. User interface 400 may include a facility name field 402, actual placed in service date field 404, expected date field 408, percentage field 410, year fields 414 and 418, type of percentage fields 416, 420, and/or other fields. Facility name field 402 may enable a user to input the name of a facility, project, or other entity, for example. Actual placed in service date field 404 may enable a user to input the date the facility was placed in service. In some instances, user interface 400 may include a calendar button 406 that enables the user to select the relevant date from the calendar. Expected date field 408 enables a user to input the expected place in service date (which may also be selected from a calendar). Percentage field 410 enables the user to input the percentage of private use. In some instances, the user interface 400 may include a "drop-down" button 412 that may enable a user to select a type of percentage. For example, the drop-down button 412 may provide a user with a menu of choices including, but not limited to: based on cost calculations; based on a lease, contract, or other agreement; or other fields related to the type of percentage.

User interface 400 may include a submit button 422. The user may select the submit button 422 to initiate entry of the facility information related the bond issue, uploaded documents, and/or the other information entered via user interface 400. User interface 400 may also include a cancel button 424. The user may select the cancel button 424 to cancel the entry of a facility or project, for example.

As noted above in FIG. 8, data entry for a select bond issue, whether a new data entry or a refunding data entry, may require the addition of an expenditure or asset. When entering or accessing an expenditure or asset, the system may provide a list or menu of previously entered asset information. For example, the system may list each asset number and asset description. The menu may enable a user to add a new expenditure, or to edit or delete an existing expenditure/asset.

FIG. 19 illustrates an example of a portion of a user interface 426 that may enable a user to view expenditures or assets associated with a bond issue. User interface 426 may be enabled, created, or otherwise supported by user interface modules 44 and 79. User interface 426 may include the name of the bond issue 428, bond details 429, list of expenditures or asset buttons 430, description fields 432, action field 434, edit/delete buttons 436, and/or other information. As noted above in FIG. 17, bond details field 429 may include general details regarding the bond issue, such as the date of the bond issue, the issue price, the amounts held in reserve funds, the final maturity date, and other details regarding the bond issuance. The list of expenditures or asset buttons 430 may enable a user to view the expenditures or assets associated with the selected bond issue 428. In some instances, the user may view information related to the bond issue such as the date, amount funded with bond proceeds, entity or person receiving the expenditure, and/or documents associated with an expenditure that were added or uploaded, and/or other information related to an expenditure. List of expenditures buttons 430 may also have associated therewith description buttons 432 and edit and delete buttons 436. Edit and delete buttons 436 may enable a user to edit or delete an expenditure that is associated with the bond issue.

User interface 426 may further include an add expenditure button 438. Add expenditure button 438 may enable a user to add an expenditure or asset that is not provided in list of expenditures 430. The user may select add expenditure button 438 to add a expenditure, for example. When entering a new asset, the system may provide a template for entering asset information needed for reporting requirements. For a selected facility or project, the system may allow for entry of an asset description, asset number, expenditure type, vendor name, expenditure date, costs financed with bond proceeds and asset life. The system may also allow for uploading documents relating to the asset.

FIG. 20 illustrates an example of a portion of a user interface 440 that may enable a user to add an expenditure or asset to a bond issue. User interface 440 may be enabled, created, or otherwise supported by user interface modules 44 and 79. User interface 440 may provide a plurality of fields that may enable the user to enter information or upload documents related to a new expenditure or asset of a bond issue. User interface 440 may include a facility name field 442, an asset description field 444, an asset number field 446, an expenditure type field 448, a vendor name field 452, a date field 454, a cost financed with bond proceeds field 458, an asset life field 460, an upload source document field 462, a change in use/sale date field 468, a sale price field 470, a remediated field 472, and/or other fields. Facility name field 442 identifies, if available, a facility or project for which an expenditure or asset to be added is associated. The facility name field 442 may be entered automatically or input from a drop down menu 443, or none may be provided. Asset description field 444 may enable a user to input a title, description, or other information that describes the expenditure or asset to be added. Asset number field 446 may enable a user to input the number associated with the expenditure or asset. Expenditure type field 448 may enable a user to select a description related to the type of expenditure being added. In some instances, the user interface 440 may include a "drop-down" button 450 that may enable a user to select from a number of predetermined descriptions that may relate to an expenditure or an asset. For example, the drop-down button 449 associated with the expenditure type field 488 may provide a user with one or more menus. For example, the first menu may comprise such choices as capital expenditure, working capital expenditure, neutral cost (other than cost of issuance), or other descriptive terms associated with the type of expenditure. A second menu may be provided as well. For example, should a user choose capital expenditure from the drop down menu, a second menu may comprise such choices as qualified expenditure, non-qualified/private use expenditure, common cost, mixed use cost, or other descriptive terms that relate to an expenditure or asset.

User interface 440 may also include vendor name field 452 may enable a user to input the name of the vendor receiving the expenditure or asset. Expenditure date field 454 may enable a user to input the date of an expenditure associated with the bond issue. In some instances, user interface 440 may include a calendar button 456, such that if a user selects the calendar button 456, the user may be provided with a calendar to select the relevant date from the calendar.

Asset life field 460 may enable the user to input the expected life or length of the asset (e.g., in years and/or months or other time interval).

Upload source document field 462 may enable a user to upload documents with information related to an expenditure of proceeds of a bond issue. In some instances, the user interface 440 may include upload document button 464. In some instances, the user may select upload document button 464 to "browse" a file directory to locate one or more documents to be selected for upload. In some instances, the initiation of the upload, and the ensuing upload, may be executed by an upload module. In some instances, when a user selects upload document button 464, a user interface module may provide a separate user interface to the user.

FIG. 20 also shows change in use/sale date field 468 which may enable the user to indicate the date the expenditure or asset was sold. In some instances, user interface 440 may include a calendar button 456, such that if a user selects the calendar button 456, the user may be provided with a calendar to select the relevant date from the calendar. Sales price field 470 may enable the user to input the sales price of the expenditure or asset. Remediated field 472 may enable a user to identify whether any private use of the expenditure or asset has been remediated. In some instances, the user interface 440 may include a "drop-down" button 450 that may enable a user to make a selection that may relate to an expenditure or asset. For example, the drop-down button 450 for remediated field 472 may provide a user with a "Yes" or "No" selection to indicate whether the private use expenditure or asset has been remediated. User interface 440 may include a submit button 474. The user may select the submit button 474 to initiate entry of the facility information related the bond issue, uploaded documents, and/or the other information. User interface 440 may also include a cancel button 476. The user may select the cancel button 476 to cancel the entry of an expenditure or asset, for example.

FIG. 21 illustrates an example of a user interface 450 for enabling a user to add arbitrage rebate notification dates for a bond issue, according to an aspect of the invention. User interface 450 may be enabled, created, or otherwise supported by user interface modules 44 and 79. As noted above, an issuer is periodically required to determine the amount of arbitrage earnings on bond proceeds and in many instances, to remit arbitrage rebate to the U.S. Treasury. User interface 450 may provide a plurality of fields that may enable the user to enter information or upload documents related to arbitrage rebate information of a bond issue. User interface 450 may include a date field 451, first computation date field 453, computational interval field 455, next computation date(s) field 457, next payment due date(s) field 461, and/or other data fields. Date field 451 enables a user to input a date associated with the document (e.g., an issue date). In some instances, user interface 450 may include a calendar button 465 to enable the user to select the relevant date from the calendar. As shown, in an implementation, calendar button 465 may also be used with fields 453, 457, and 461. In an implementation, date field 451 may be pre-populated with the issue date for the selected bond. For example, date field 451 may be pre-populated with the date entered in date field 280 of user interface 278 shown in FIG. 13 when a user is initially setting up a bond issue for post issuance compliance. Similarly, first computation date field 458, computation interval field 455, next computation date(s) field 457, and next payment due date(s) field 461 may also be pre-populated. First computation date field 453 indicates the first date for computing arbitrage rebate. The amount of arbitrage required to be rebated to the U.S. Treasury is generally determined once every five years during the lifetime of a bond per the requirements in section 148(f) of the Internal Revenue Code and regulations issued thereunder. Thus, for example, the first computation date field 453 may be pre-populated by calculating and entering a date that is five (5) years from the date of issue. However, calendar button 465 associated with field 453 may enable a user to set a different (e.g., earlier) first computation date.

Computational interval field 455 indicates the interval in number of years for calculating the arbitrage rebate. Computational interval field 455 may be pre-populated with a period of five (5) years, for example. In some instances, the user interface 450 may include a "drop-down" button 463 that may enable a user to edit a field. For example, the drop-down button 463 may be associated with computational interval field 455 and may allow a user to choose an alternative number of years (e.g., one) to calculate the arbitrage rebate.

Next computation date(s) field 457 may be pre-populated with the next computation date after the current calendar date. Next computation date(s) field 457 may depend upon the interval chosen in computational interval field 455. For example, if a period of five years is chosen, the next computation date may be five years after the entered or pre-populated issue date in date field 451. Next payment due date(s) field 461 may also be pre-populated with a date that is a defined period of time after the next computation date in field 457. For example, the next payment due date(s) field 461 may be sixty days after the date in field 457. However, a user may have the option to use calendar buttons 465 associated with fields 457 and 461 to manually adjust the dates in these fields.

User interface 450 may also include a submit button 475. The user may select the submit button 475 to initiate entry of the facility information related the bond issue, and/or the other information entered via user interface 450. User interface 450 may also include a cancel button 477. The user may select the cancel button 477 to cancel the entry of an expenditure or asset, for example.

FIG. 22 illustrates an example of a user interface 478 for enabling a user to select a type of document to add to a bond issue, according to an aspect of the invention. User interface 478 may be enabled, created, or otherwise supported by user interface modules 44 and 79. In some implementations, the document to be uploaded may be a contract or agreement. User interface 478 may include the facility name field 480 and type of document field 482. Facility name field 480 identifies, if available, a facility or project for which an expenditure or asset to be added is associated. The type of document field 482 enables a user to select a type of document such as a contract or agreement to add information thereto. In some instances, the user interface 478 may include a "drop-down" button 484 that may enable a user to choose a document in the type of document field 482. For example, the drop-down button 484 may allow a user to choose between a listing of a management contract, research agreement, lease agreement, sales agreement, incidental use, or other type of document.

After a user chooses a type of document in user interface 478, the user may be required to enter information related to the type of document. For example, the user may be required to enter information such as the document name, date, a description, and parties associated with the type of document chosen.

FIG. 23 illustrates an example of a user interface 486 for enabling a user to enter information related to a bond issue for a contract or agreement. User interface 486 may be enabled, created, or otherwise supported by user interface modules 44 and 79. User interface 486 may provide a plurality of fields that may enable the user to enter information or upload documents related to a management contract of a bond issue, for example. In an implementation, the information entered in user interface 486 may include information related to a management contract. User interface 486 may include a facility name field 487, a document name field 488, a date field 490, a description field 494, a document type field 496, a contract party/sponsor/lessee field 500, a structure of compensation field 502, a penalty to terminate field 504, and/or other information fields. The facility name field 487 identifies, if available, a facility or project for which the document will be associated. Name field 488 enables a user to input a title, description, or other information that describes the document or file to be added. Date field 490 enables a user to input a date associated with the document (e.g., the date the document was last saved, the date a document is uploaded, etc.). In some instances, user interface 486 may include a calendar button 492. If the user selects calendar button 492, a calendar may be provided to the user so that the user may select the relevant date from the calendar. Description field 494 enables a user to enter a description regarding the document to be uploaded. Document type field 496 enables a user to enter the type of document being uploaded. In an implementation, the document type field 496 may be pre-populated with the type of document chosen in type of document field 482 in user interface 478 of FIG. 22. In some instances, the user interface 486 may include a "drop-down" button 498 that may enable a user to identify the type of document. For example, the drop-down button 498 may provide a user with a menu comprising such choices as management, research, contact/lessee, incidental, or other types. Contract party/sponsor/lessee field 500 enables a user to input a name, description, or other information describing a contract party/sponsor/lessee that may be associated with the miscellaneous document. Structure of compensation field 502 enables a user to choose from a selection of rates with respect to compensation. In some instances, the user interface 486 may include a "drop-down" button 501 that may enable a user to choose a selection associated with the structure of compensation field 502. For example, the drop-down button 501 may provide a user with the selections periodic fixed fee, capitation fee, per unit fee, or other fields associated with fees and compensation. Penalty to terminate field 504 enables a user to input whether there is a penalty associated with terminating a contract. In some instances, the user interface 486 may include a "drop-down" button 503 that may enable a user to choose a selection. For example, the drop-down button 503 may be associated with penalty to terminate field 504 and may provide a user with the option of selecting yes or no.

User interface 486 may also include a contract field 505, an upload document field 512, or other fields. Contract field 508 enables a user to indicate if a contract meets safe harbor. In some instances, the user interface 486 may include a "drop-down" button 506 that may enable a user to choose a selection. For example, the drop-down button 506 may be associated with contract field 505 and may provide a user with the option of selecting "yes" or "no."

In an implementation, should a user select the option "no" with respect to the question if the "contract meets safe harbor?" in contract field 505, information may be entered into additional fields. For example, in an implementation, termination date field 507, facility managed field 508, and private business use field 510 may be provided on user interface 486. Termination date field 507 may enable a user to enter the date of termination of a contract. Facility managed field 508 may enable a user to select the facility or project associated with the contract. In some instances, the user interface 486 may include a "drop-down" button 509 associated with the facility managed field 508, that may enable a user to choose a facility or project associated with a bond issue. Private business use field 510 may enable a user to input if a contract constitutes private business use of a facility. In some instances, the user interface 486 may include a "drop-down" button 511 associated with the private business use field 510, and may provide a user with the option of selecting "yes" or "no."

User interface 486 may also include an upload document field 512. In some instances, the user interface 486 may include upload document button 514. In some instances, the user may select upload document button 514 which will allow a user to "browse" a file directory to locate one or more documents to be selected for upload. In some instances, the initiation of the upload, and the ensuing upload, may be executed by an upload module.

User interface 486 may include a submit button 516. The user may select the submit button 516 to submit the entered information and/or document for uploading, and/or the other information entered via user interface 486. User interface 486 may also include a cancel button 518. The user may select the cancel button 518 to cancel uploading of the document, for example.

FIGS. 24-26 illustrate examples of user interfaces that may enable a user to enter information for a research, lease, and sales agreement, respectively, related to a bond issue. User interfaces 520, 542, and/or 580 may provide a plurality of fields that may enable the user to enter information or upload documents related to a contract or agreement of a bond issue. User interfaces 520, 542, 580 may be enabled, created, or otherwise supported by user interface modules 44 and 79.

FIG. 24 illustrates an example of a user interface 520 that may be presented to a user when entering information and/or uploading documents related to a research agreement. User interface 520 may be presented to a user upon a selection in FIG. 22 or 23, for example. User interface 520 may include a facility name field 522, a name field 524, a date field 526, description field 530, a sponsor field 532, a type field 534, and/or other fields. The facility name field 522 identifies, if available, a facility or project for which the document(s) will be associated. Name field 524 may enable the user to input a title, description, and/or other information to identify the one or more selected documents/files. Date field 526 may enable the user to input a date relevant to one or more selected files (e.g., date of research agreement, date of upload, etc.). In some instances, user interface 520 may include a calendar button 528. If the user selects calendar button 528, a calendar may be provided to the user so that the user may select the relevant date from the calendar. For example, the date may include the date of the document, date of upload, date of execution, etc. Description field 530 may enable a user to input a title, description, or other information that describes the type of document being added. Sponsor field 532 may enable a user to input a title, description, or other information that describes the sponsor of the research (e.g., such as an entity). The type field 534 enables a user to enter the type of sponsor of the research agreement. In some instances, the user interface 520 may include a "drop-down" button 536 associated with the type of sponsor field 534, and may provide a user with the options of selecting a sponsor type according to tax law treatment (e.g., Federal government, private corporation, or exempt entity).

User interface 520 may include a submit button 538. The user may select the submit button 538 to initiate entry of the research agreement information related the bond issue, documents uploaded, and/or the other information entered via user interface 520. User interface 520 may also include a cancel button 540. The user may select the cancel button 540 to cancel the entry of a research agreement, for example.

FIG. 25 illustrates an example of a user interface 542 that may be presented to a user when entering information and/or uploading documents related to a lease agreement. User interface 542 may be presented to a user upon a selection in FIG. 22 or 23, for example. User interface 542 may include a facility name field 544, a name field 546, a date field 548, description field 552, a name of leasing party field 554, a square footage subject to lease field 556, a square footage of common space benefiting lease field 558, a square footage of property financed with bonds field 560, a square footage of common space allocated to lease field 562, a percentage field 564, a basic research field 568, and/or other fields. The facility name field 544 identifies, if available, a facility or project for which the document(s) will be associated. Name field 546 may enable the user to input a title, description, and/or other information to identify the one or more selected documents/files. Date field 548 may enable the user to input a date relevant to one or more selected files (e.g., date of lease agreement, date of upload, etc.). In some instances, user interface 542 may include a calendar button 550. If the user selects calendar button 550, a calendar may be provided to the user so that the user may select the relevant date from the calendar. For example, the date may include the date of the document, date of upload, date of execution, etc. Description field 552 may enable a user to input a title, description, or other information that describes the type of document being added. The name of leasing party field 554 identifies the name of the leasing party. Fields 556, 558, 560, and 562 identify the square footage, as noted, associated with the lease agreement. The percentage field 564 identifies the percentage of property allocated to lease. The basic research field 568 enables a user to select if basic research is provided for the lease agreement. In some instances, the user interface 542 may include a "drop-down" button 570 associated with the basic research field 568, and may provide a user with the options of selecting "yes" or "no."

User interface 542 may also include upload source document field 572. In some instances, the user interface 542 may include upload document button 574. The user may select upload document button 574 which will allow a user to "browse" a file directory to locate one or more documents to be selected for uploading. In some instances, the initiation of the upload, and the ensuing upload, may be executed by an upload module.

User interface 520 may include a submit button 576. The user may select the submit button 576 to initiate entry of the research agreement information and/or uploading documents related the bond issue, and/or the other information entered via user interface 542. User interface 542 may also include a cancel button 578. The user may select the cancel button 578 to cancel the entry of a lease agreement, for example.

FIG. 26 illustrates an example of a user interface 580 that may be presented to a user when entering information and/or uploading documents related to a sales agreement. User interface 580 may be presented to a user upon a selection in FIG. 22 or 23, for example. User interface 580 may include a facility name field 582, a name field 584, a date field 586, description field 590, a purchaser field 592, a price field 594, an action field 596, and/or other fields. The facility name field 582 identifies, if available, a facility or project for which the document(s) will be associated. Name field 584 may enable the user to input a title, description, and/or other information to identify the one or more selected documents/files. Date field 586 may enable the user to input a date relevant to one or more selected files (e.g., date of sales agreement, date of upload, etc.). In some instances, user interface 580 may include a calendar button 588. If the user selects calendar button 588, a calendar may be provided to the user so that the user may select the relevant date from the calendar. For example, the date may include the date of the document, date of upload, date of execution, etc. Description field 590 may enable a user to input a title, description, or other information that describes the type of document being added. The purchaser field 592 allows a user to enter and identify the name of the purchaser of the sale. The price field 594 enables the user to input the sales price. The action field 596 enables a user to enter if remedial action has been taken. In some instances, the user interface 580 may include a "drop-down" button 598 associated with the action field 596, and may provide a user with the options of selecting "yes" or "no."

User interface 580 may also include upload source document field 600. In some instances, the user interface 580 may include upload document button 602. The user may select upload document button 602 which will enable a user to "browse" a file directory to locate one or more documents to be selected for uploading. In some instances, the initiation of the upload, and the ensuing upload, may be executed by an upload module.

User interface 580 may include a submit button 604. The user may select the submit button 604 to initiate entry of the sales agreement information, uploaded documents related the bond issue, and/or the other information entered via user interface 580. User interface 580 may also include a cancel button 606. The user may select the cancel button 606 to cancel the entry of a lease agreement, for example.

Figure 27:
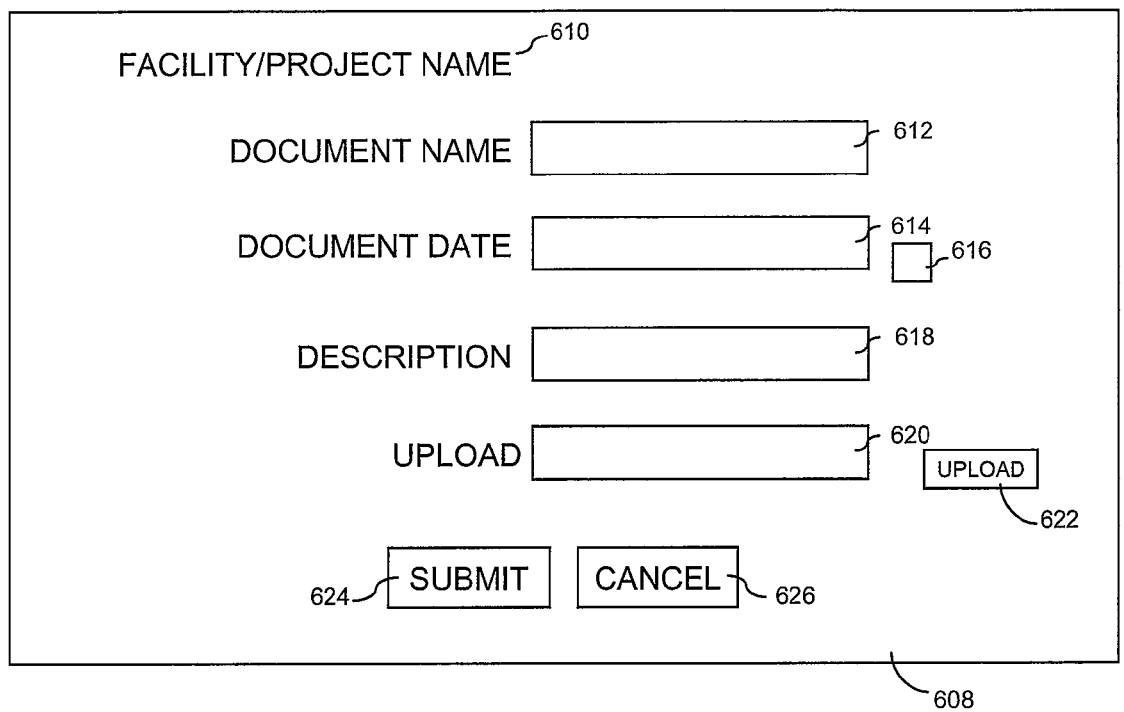
FIG. 27 is an exemplary illustration of a user interface that enables a user to enter information and/or upload other contracts, agreements, documents or files associated with a bond issue, according to various implementations of the invention.

FIG. 27 illustrates an example of a user interface 608 for enabling a user to upload other contracts, agreements, documents or files associated with a bond issue. User interface 608 may be enabled, created, or otherwise supported by user interface modules 44 and 79. User interface 608 may provide a plurality of fields that may enable the user to enter information or upload documents related to a document for a bond issue. In an implementation, user interface 608 may be presented to a user upon selection of "other" in the fields of FIG. 22 or 23, for example.

User interface 608 may include a facility name field 610, a name field 612, a date field 614, and a description field 618, and/or other information fields. The facility name field 610 identifies, if available, a facility or project for which the document(s) will be associated. Name field 612 may enable the user to input a title, description, and/or other information to identify the one or more selected documents/files. Date field 614 may enable the user to input a date relevant to one or more selected files (e.g., date of expenditure, date of upload, etc.). In some instances, user interface 608 may include a calendar button 616. If the user selects calendar button 616, a calendar may be provided to the user so that the user may select the relevant date from the calendar. For example, the date may include the date of the document, date of upload, date of execution, etc. Description field 618 may enable a user to input a title, description, or other information that describes the type of document being added.

User interface 608 may also include upload source document field 620. In some instances, the user interface 608 may include upload document button 622. The user may select upload document button 622 which will enable a user to "browse" a file directory to locate one or more files to be selected for uploading. In some instances, the initiation of the upload, and the ensuing upload, may be executed by an upload module.

User interface 608 may include a submit button 624. The user may select the submit button 624 to initiate uploading of the one or selected documents. User interface 608 may also include a cancel button 626. The user may select the cancel button 626 to cancel uploading of a document or file, for example.

FIG. 28 illustrates an example of a portion of a user interface 628 for enabling a user to input receipts and information associated with a bond issue. User interface 628 may be enabled, created, or otherwise supported by user interface modules 44 and 79. User interface 628 may provide a plurality of fields that may enable the user to enter information or upload documents related to receipt input and operations information of a bond issue. For example, user interface 628 may enable a user to input receipts for private payments and expenses associated with maintenance and operations ("M&O") of a bond issue. User interface 628 may include a facility name field 630, a receipt input field 632, an M&O field 648, and/or other fields. User interface 628 may include a contract number field 634 and contract name field 636. Contract number field 634 may enable the user to enter the contract number associated with the payment or M&O. Contract name field 636 may enable the user to input a title, description, or other information to identify the name of the contract associated with the payment or M&O.

In some implementations, user interface 628 may comprise type of activity field 638, name field 640, amount field 642, and date received field 644 and/or other information fields associated with input for receipt input field 632. Type of activity field 638 may enable a user to input information regarding the type of activity to which the payment is related. Name field 640 may enable a user to input the name of a person or entity associated with the payment (e.g., a payor). Amount field 642 may enable a user to enter the amount of the payment. Date field 644 may enable the user to enter the date the payment was received. In some instances, user interface 628 may include a calendar button 646. If the user selects calendar button 646, a calendar may be provided to the user so that the user may select the relevant date from the calendar.

In some implementations, user interface 628 may also include a date field 670, amount field 674, purpose field 676, recipient field 678, and/or other information field associated with M&O field 648. Date field 670 may enable a user to input the date a payment was made associated with respect to M&O. In some instances, user interface 628 may include a calendar button 672 associated with date field 670. If the user selects calendar button 672, a calendar may be provided to the user so that the user may select the relevant date from the calendar. Amount field 674 may enable a user to enter the amount of the payment. Purpose field 676 may enable a user to input a title, description or other information associated with the expense or payment. Recipient field 678 may enable a user to input the name a person or entity receiving the payment.

User interface 628 may also include upload source document field 684. In some instances, the user interface 628 may include upload document button 686. The user may select upload document button 686 which will enable a user to "browse" a file directory to locate one to be selected for uploading. In some instances, the initiation of the upload, and the ensuing upload, may be executed by an upload module.

User interface 628 may include a submit button 688. The user may select the submit button 688 to submit the entered information, uploaded documents, and/or the other information entered via user interface 628. User interface 628 may also include a cancel button 690. The user may select the cancel button 690 to cancel entering the information and/or uploading of a document, for example.

FIG. 29 illustrates an example of a user interface 692 that may enable a user to define a list of users or contacts that are to receive transmissions of files, such as those files managed by issue module 28, 58. User interface 692 may be enabled, created, or otherwise supported by user interface modules 44 and 79. In various implementations, files may be transmitted either manually or automatically in response to the selection of one or more of the transmit buttons presented to the user in the user interface. In some implementations, user interface 692 may include a users identification field 694, select button 696, a list of contacts or users 706, an add user button 700, and a remove or delete user button 702. In some instances, user interface 692 may include a select all button 698, an update contact button 699, and selection fields 704 and 710, and other fields or buttons. User identification field 694 identifies the user interface 692 selected by the user. Select button 696 may enable a user to select one or more contacts from the list of contacts 706. In some instances, a user may select one or more selection fields 704 associated with the correct contact(s) so as to mark the selection field 704 associated with the contact(s) for transmitting information thereto. The user may then select the select button 696 to choose the selected contact(s) for the transmission of files. In an implementation, the user may select the delete button 702 to delete the selected contact(s). Delete button 702 may enable a user to remove a contact from the list of contacts 706. In some instances, a user may select one or more selection fields 710 associated with the correct contact(s) so as to mark the selection field 710 associated with the contact(s) to be deleted. The user may then select delete button 702 to remove the selected contact(s) from the list of contacts 706 on user interface 692. In some instances, the user may select the select all button 698 to select all of the contacts listed in user interface 692. User interface 692 may include a close button 712. The user may select the close button 712 to close the user interface 692 after all approved users are selected, for example.

If a contact is not provided in the list of contacts, the user may select add button 700 which may enable a user to add a contact to the list of contacts 706 in user interface 692. Once the user selects add button 700, the user may be directed to a user interface (not shown) to add the name, contact information (e.g., address, telephone number, e-mail address, etc.) and other information for the new contact or user.

User interface 692 may also include a listed of addresses 708 associated with the list of contacts 706. In some instances, the list of addresses may be email addresses for each of the contacts in the list of contacts 706. Update contact button 699 may enable a user to update the email address or other contact information for a selected user. In some instances, the user may select selection field 704 and then select update contact button 699 to select a contact to update their corresponding contact information.

FIG. 30 illustrates an example of a portion of a user interface 714 that enables the user to define a list of users 718 that are approved to access information, such as uploaded files. User interface 714 may be enabled, created, or otherwise supported by user interface modules 44 and 79. In some implementations, user interface 714 may include a user access identification field 716, a list of users 718, company information 720, settings 722, and/or other information. User identification field 716 identifies the user interface 714 selected by the user. List of users 718 may include a contact list. The contact list may be stored at storage module 18, or it may be stored on client device 16, 56. The contact list may include a contact list that is used globally for all users on system 10, a contact list that is specific to the user, and/or other contact lists. List of users 718 may be implemented by issue module 28, 68 to determine whether to grant access to information to a user that logs on to system 10, 50. The determination may be made, for example, based on the identification of the user by identification and authorization module 30, 70. In some instances, the list of users 718 may include purchasers/holders of bonds issued by the issuer, obligors, issuers (e.g., guarantors) of secondary securities (e.g., demand features) associated with one or more bonds issued by the issuer, dealers, brokers, and/or other parties. In some instances, the list of users 718 may include one or more federal regulators.

In some implementations, the list of approved users may be predefined to include users from whom it would be appropriate to have access to the files related to the bond issued by the issuer. In these implementations, the list of approved users may or may not be predefined with input/cooperation from the issuer. For example, the list of approved users may be maintained by a system administrator to include only certain purchasers/holders (or parties associated therewith). The system administrator may be responsible for updating the list to include only the relevant parties (e.g., adding and deleting parties as employment status changes, as funds are organized and/or dissolved, etc.). This would enable the issuer to provide restricted access to only relevant parties without having to expend resources to maintain the list, and would provide a level of third-party oversight over the dissemination of the confidential information that is related to parties other than the issuer of the security (e.g., information related to a guarantor of the security).

User interface 714 may include a list of company information 720 for each user in the list of users 718. The company information 720 may identify the company or entity with which each corresponding user is associated. User interface 714 also provides a plurality of settings 722. In some instances, the user interface 714 may include a "drop-down" button 724 that may enable a user to choose the access settings associated with each user in the list of users 718. For example, the drop-down button 724 may provide a user with a menu comprising such choices as "none," "read only," and "read and write." If a user selects "none" for a user in the list of users 718, the user may not have access to information associated with a bond issue, such as uploaded files, documents, or information entered into the system 10, 50 relating to a bond issue and managed by issue module 28, 58. If a user selects "read only" for another user, the user may enable that user in the list of users 718 to have limited access to the information associated with a bond issue. For example, the "read only" selection may allow another user to read or view the information associated with a selected bond issue, but may not allow another user to add, change, delete, or upload additional information related to the bond issue. If a user selects "read and write" for yet another user, that user may then have access to read or view the information associated with a selected bond issue, as well as access to add information or upload documents associated with a bond issue.

User interface 714 may also include submit button 726 and cancel button 728. Once the user has selected the settings 722 for each of the associated users in the list of users 718, the user may select the submit button 726 to save any edits or changes that may have been made. Additionally, the user may cancel any edits or changes, for example, by pressing the cancel button 728.

Some advantages of the record and post issuance compliance system may include the ability to keep track of filings and compliance activities for bond issues. The system may assist in reducing the time and expense associated with IRS, SEC, and/or other audits, and/or other examinations, and may further assist in maximizing an allocation of permitted nonqualified bond proceeds.

For example, the record retention and post issuance compliance system provides a user-friendly interface for storing information and/or documents relating to a bond before, upon, and/or after issuance that allows for tracking bonds, information related to the bonds, and compliance calculations in an organized fashion. The record retention and post issuance compliance system may electronically store pertinent information and/or documents that support the tax-exempt status of the obligation through the life of the bond(s) (e.g., private business use records). In some embodiments, the system may store information and/or documents related to bonds after issuance for the entire lifetime of the bond issue plus several years after the final maturity of the last bond of the issue. For example, the record retention and post issuance compliance system may electronically store pertinent bond issue information and/or documents for three years after the final maturity of the bond(s), as per IRS instructions. The system may enable issuers and obligors to track actual facts related to the bond issue to insure post-issuance compliance requirements. For example, the system may assist in storing data entry related to the bond issue information, such as the investment and expenditure of bond proceeds, the use of the bond financed facilities, and other bond issue information (as described herein).

In some implementations, system 10 or 50 may associate data related to a bond issue into one or more data "silos," which may be described as one or more categories of data. In some implementations, when receiving information from a user or other source, one or more interfaces of system 10 or 50 may prompt one or more questions that assist in tracking post-issuance requirements and insure depositing of records in an organized fashion and/or in the correct "silo." An example of the type of data categorized into the one or more silos may include:

1. General Facts About the Bond Issue.
Issue Price ($)
Reserve Fund ($)
Final Maturity Date (xx/xx/xxxx)
Arbitrage Yield (xx.xxxx %)
Date Form 8038 Filed (xx/xx/xxxx)
2. Qualified Expenditures
Description/Asset Number
Expenditure Date (xx/xx/xxxx)
Cost ($)
Asset Life (xx.x yrs)
Bond Proceeds Allocated ($)
Placed in Service Date (xx/xx/xxxx)
Facility (name)
Vendor (name)
Change in Use/Sale Date (xx/xx/xxxx)
Sales Price ($)
Remediated? (Yes/No)
Documents Reflecting Expenditure
3. Costs of Issuance
Expenditure Date (xx/xx/xxxx)
Amount ($)
Bond Proceeds Allocated ($)
Entity/Person Receiving (name)
   Role
Documents Reflecting Expenditure
4. Nonqualified/Mixed Use Expenditures
Description/Asset Number
Expenditure Date (xx/xx/xxxx)

Cost ($)
Asset Life (xx.x yrs)
Bond Proceeds Allocated ($)
Percentage of Private Use
   Year 1 (xx.x %)
   Year 2 (xx.x %)
   etc . . .
Placed in Service Date (xx/xx/xxxx)
Facility (name)
Vendor (name)
Working Capital (Yes/No)
Neutral Cost (Yes/No)
Change/Sale Date
Sales Price
Documents Reflecting Expenditure
5. Miscellaneous Documents
Use Contracts
   Document Name
   Document Date
   Description
   Facility
   Type of Contract
      (e.g. Management/Research/Lease/Incidental/Other)
   Contract Party/Sponsor/Lessee
   Contract Meets Safe Harbor? (Yes/No/NA)
      If Yes (Rev. Proc. 97-13/Rev. Proc. 97-14/Rev. Proc. 2007-47/Other)
   Documents Reflecting Use or Payment of Facility
6. Private Payment Receipts
Receipt Input
   Contract Number
   Contract Name
   Type of Activity
   Payor (name)
   Amount ($)
   Date Received (xx/xx/xxxx)
   Facility
M&O Input
   Date Paid (xx/xx/xxxx)
   Amount Paid ($)
   Purpose of Expense
   Recipient (name)
   Facility (name)
   Contract Number
   Contract Name (name)
Receipt Copies
Expense documentation
7. Principal and Interest Payments
Debt Service Schedule While the principles of the invention have been made clear in the illustrative implementations set forth above, it will be apparent to those skilled in the art that various modifications may be made to the structure, arrangement, proportion, elements, materials, and components used in the practice of the invention. It will thus be seen that the objects of this invention have been fully and effectively accomplished. It will be realized, however, that the foregoing preferred specific implementations have been shown and described for the purpose of illustrating the functional and structural principles of this invention and are subject to change without departure from such principles.

What is claimed is:

1. A computer-implemented system for facilitating post-issuance tax compliance to maintain a tax exempt status for tax-exempt municipal bonds that have initially qualified for the tax-exempt status, the system comprising:

at least one computer memory device that receives and stores at least:
      calculation rules relating to compliance with one or more rules that govern maintenance of a tax-exempt status of a tax-exempt municipal bond issue, wherein compliance with the one or more rules is required to maintain the tax-exempt status after the tax-exempt municipal bond issue has initially qualified for the tax-exempt status; and
   one or more computer microprocessing devices programmed by one or more computer program instructions to:
      obtain information regarding the actual use of proceeds of the tax-exempt municipal bond issue, including a private business use of the proceeds,
      perform one or more calculations, after the tax-exempt municipal bond issue has initially qualified for the tax-exempt status, using at least the calculation rules and the information regarding the actual use of the proceeds, and
      determine and indicate whether the tax-exempt status of the tax-exempt municipal bond issue is maintained based on the one or more calculations.

2. The system of claim 1, wherein the at least one computer memory device further receives and stores bond issuance information, and wherein the one or more computer microprocessing devices are further programmed to:
   provide one or more users with access to one or more of the bond issuance information or the information regarding the actual use of the proceeds of the tax-exempt municipal bond issue; and
   restrict access to at least some of the bond issuance information or the post issuance information regarding the actual use of the proceeds of the tax-exempt municipal bond issue to a subset of the one or more users.

3. The system of claim 1, wherein the information regarding the actual use of the proceeds of the tax-exempt municipal bond issue includes one or more documents evidencing the actual use of the proceeds of the tax-exempt municipal bond issue.

4. The system of claim 3, wherein the one or more computer microprocessing devices are further programmed to receive the one or more documents evidencing the actual use of the proceeds of the tax-exempt municipal bond issue and extract the information regarding the actual use of the proceeds of the tax-exempt municipal bond issue from the one or more documents, wherein the information regarding the actual use of the proceeds is obtained based on the extracted information.

5. The system of claim 1, wherein the one or more processing devices are further programmed to provide an indication regarding whether, according to results of the calculations, the actual use of the proceeds of the tax-exempt municipal bond issue complies with the one or more rules to maintain tax-exempt status.

6. The system of claim 5, wherein the indication comprises an indication that the results of the calculations indicate that the tax-exempt municipal bond issue complies with the one or more rules when the one or more processing devices determine that the results of the calculations indicate that the tax-exempt municipal bond issue complies with the one or more rules.

7. The system of claim 5, wherein the indication further comprises an indication that the results of the calculations indicate that the tax-exempt municipal bond issue does not comply with the one or more rules when the one or more processing devices determine that the results of the calculations indicate that the tax-exempt municipal bond issue does not comply with the one or more rules.

8. The system of claim 7, wherein the indication includes an alert to one or more users that the results of the calculations indicate that the tax-exempt municipal bond issue does not comply with the one or more rules.

9. The system of claim 7, wherein the one or more computer microprocessing devices are further programmed to identify one or more methods to correct noncompliance with the one or more rules.

10. The system of claim 9, wherein the one or more rules relate to the percentage of the private business use of the proceeds from the municipal bond issue and wherein a method to correct noncompliance with the one or more rules include tracking private business use of the tax-exempt municipal bond issue to periodically determine the percentage of the private business use of the proceeds.

11. The system of claim 1, wherein the at least one memory device further stores date determining rules used to determine dates the one or more calculations are due to be performed to determine compliance with the one or more rules relating to the tax-exempt bond issue and wherein the one or more computer microprocessing devices are further programmed to:
determine, using the date determining rules, at least an instance that the one or more calculations are due to be performed to determine compliance with the one or more rules relating to the tax-exempt municipal bond issue, and
obtain information regarding the actual use of the proceeds of the tax-exempt municipal bond issue in association with the instance that the one or more calculations are due; and
perform the one or more calculations in association with the instance that the one or more calculations are due based on the obtained information.

12. The system of claim 1, wherein the one or more computer microprocessing devices are further programmed to:
prepare one or more regulatory filings based at least in part on the one or more calculations, and
transmit the one or more regulatory filings to a regulatory agency in compliance with the one or more rules.

13. The system of claim 1, wherein the one or more computer microprocessing devices are further programmed to:
determine a percentage of the private business use of the proceeds with respect to the use of the proceeds;
determine that the percentage exceeds a threshold limit imposed by the one or more rules based on the one or more calculations; and
determine that the tax-exempt status of the tax-exempt municipal bond issue will not be maintained based on the exceeded threshold limit.

14. The system, of claim 13, wherein the one or more computer microprocessing devices are further programmed to:
generate a reminder to blend down the percentage, wherein the percentage is blended down based on a reduction of an amount of the private business use of the proceeds.

15. The system of claim 13, wherein the one or more computer microprocessing devices are further programmed to:
determine the percentage throughout the lifetime of the bond such that the percentage is periodically monitored; and
generate a reminder to blend down the percentage when the percentage exceeds the threshold limit, wherein the percentage is blended down based on a reduction of an amount of the private business use of the proceeds.

16. The system of claim 1, wherein the one or more rules comprise one or more predetermined government regulations.

17. A computer-implemented method for facilitating post-issuance compliance with one or more rules related to maintenance of tax-exempt status of municipal bond issues, the method being executed by one or more processors programmed to perform operations comprising:
receiving, by one or more computer microprocessing devices programmed by one or more computer program instructions, bond issuance information that includes information to determine compliance with one or more rules, wherein the one or more rules relate to an issuer of the municipal bond issue making one or more secondary market disclosures relating to use of proceeds from the municipal bond issue, including private business use of the proceeds;
receiving, by the one or more computer microprocessing devices, post-issuance information regarding at least the actual use of the proceeds of the municipal bond issue;
performing, by the one or more computer microprocessing devices, one or more calculations, after the municipal bond issue has initially qualified for tax-exempt status, using: (i) at least one or more calculation rules for making the one or more calculations relating to compliance with the one or more rules, (ii) the bond issuance information, (iii) the information regarding the actual use of the proceeds of the municipal bond issue, and (iv) the information relating to the secondary market for the municipal bond issue;
preparing, by the one or more computer microprocessing devices, one or more regulatory filings based at least in part on the result of the one or more calculations; and
transmitting, by the one or more computer microprocessing devices, the one or more regulatory filings to a regulatory agency based on the one or more rules.

18. The method of claim 17, the operations further comprising:
providing one or more users with access to one or more of the bond issuance information or the information regarding the actual use of the proceeds of the municipal bond issue; and
restricting access to at least some of the bond issuance information or the information regarding the actual use of the proceeds of the municipal bond issue to a subset of the one or more users.

19. The method of claim 17, wherein the information regarding the actual use of the proceeds of the municipal bond issue includes one or more documents evidencing the actual use of the proceeds of the municipal bond issue.

20. The method of claim 19, wherein receiving post-issuance information regarding the actual use of the proceeds of the municipal bond issue further comprises receiving the one or more documents evidencing the actual use of the proceeds of the municipal bond issue and extracting the information regarding the actual use of the proceeds of the municipal bond issue from the one or more documents.

21. The method of claim 17, wherein performing one or more calculations further comprises providing an indication regarding whether, based on results of the calculations, the municipal bond issue complies with the one or more rules.

22. The method of claim 21, wherein the indication further comprises an indication that the results of the calculations indicate that the municipal bond issue complies with the one or more rules.

23. The method of claim 21, wherein the indication further comprises an indication that the results of the calculations indicate that the municipal bond issue does not comply with the one or more rules.

24. The method of claim 21, wherein the indication includes an alert to one or more users that the results of the calculations indicate that the municipal bond issue does not comply with the one or more rules.

25. The method of claim 21, wherein the one or more operations further comprise identifying one or more methods to correct noncompliance with the one or more rules.

26. The method of claim 25, wherein the one or more rules relate to the private business use of the proceeds from the municipal bond issue and wherein a method to correct noncompliance with the one or more rules include tracking the private business use for the municipal bond issue to periodically determine the percentage of the private business use of the proceeds.

27. The method of claim 17, wherein performing one or more calculations further comprises:
   determining, using one or more date determining rules, at least an instance that calculations are due for compliance with the one or more rules relating to the municipal bond issue, and
   obtaining information regarding the actual use of the proceeds of the municipal bond issue in association with the instance that calculation are due; and
   performing the one or more calculations in association with the instance that the calculation are due based on the obtained information.

28. The method of claim 17, wherein the one or more rules comprise one or more Internal Revenue Service (IRS) tax regulatory requirements.

29. A computer-implemented system for facilitating post-issuance compliance for municipal bonds subject to one or more rules to maintain tax exempt status, the system comprising:
   at least one computer memory device configured to receive and store at least:
      (i) bond information for a tax-exempt municipal bond issue, the bond information including information to determine compliance with one or more rules relating to an actual use of proceeds from the municipal bond issue, the tax regulations relating to the private business use of the proceeds impacting the ability to maintain the tax-exempt status of the municipal bond issue,
      (ii) calculation rules for making one or more calculations relating to compliance with the one or more rules; and
      (iii) documents related to the actual use of the proceeds from the municipal bond issue; and
   one or more computer microprocessing devices programmed by one or more computer program instructions to:
      (a) receive information regarding the actual use of the proceeds of the municipal bond issue, including private business use of the proceeds,
      (b) perform the one or more calculations, after the municipal bond issue has initially qualified for the tax-exempt status, using at least the calculation rules, the bond information, and information regarding the actual use of the proceeds of the municipal bond issue,
      (c) determine that compliance with the one or more rules is maintained post-issuance based on the one or more calculations, and
      (d) generate an indication of the entitlement to maintaining tax exempt status.

30. The system of claim 29, wherein the computer microprocessing devices are programmed to track private business uses of proceeds of the municipal bond issue over the life of the municipal bond issue, generate tax filing forms based on the results of calculations, generate securities filings, including secondary market disclosures relating to the use of proceeds and store documents supporting the calculations.

* * * * *